(12) United States Patent
Breed et al.

(10) Patent No.: US 6,958,451 B2
(45) Date of Patent: Oct. 25, 2005

(54) APPARATUS AND METHOD FOR MEASURING WEIGHT OF AN OCCUPYING ITEM OF A SEAT

(75) Inventors: David S. Breed, Boonton Township, Morris County, NJ (US); Wilbur E. Du Vall, Kimberling City, MO (US); Wendell C. Johnson, Signal Hill, CA (US)

(73) Assignee: Automotive Technologies International, Inc., Denville, NJ (US)

( * ) Notice: Subject to any disclaimer, the term of this patent is extended or adjusted under 35 U.S.C. 154(b) by 67 days.

(21) Appl. No.: 10/174,803

(22) Filed: Jun. 19, 2002

(65) Prior Publication Data

US 2003/0056997 A1 Mar. 27, 2003

Related U.S. Application Data

(63) Continuation-in-part of application No. 09/901,879, filed on Jul. 9, 2001, now Pat. No. 6,555,766, which is a continuation of application No. 09/849,559, filed on May 4, 2001, which is a continuation-in-part of application No. 09/193,209, filed on Nov. 17, 1998, now Pat. No. 6,242,701, which is a continuation-in-part of application No. 09/128,490, filed on Aug. 4, 1998, now Pat. No. 6,078,854, which is a continuation-in-part of application No. 08/970,822, filed on Nov. 14, 1997, now Pat. No. 6,081,757, and a continuation-in-part of application No. 08/474,783, filed on Jun. 7, 1995, now Pat. No. 5,822,701, application No. 10/174,803, which is a continuation-in-part of application No. 09/849,559, which is a continuation-in-part of application No. 09/193,209, which is a continuation-in-part of application No. 09/128,490, which is a continuation-in-part of application No. 08/970, 822, and a continuation-in-part of application No. 08/474, 783, application No. 10/174,803, which is a continuation-in-part of application No. 09/849,558, filed on May 4, 2001, now Pat. No. 6,653,577, which is a continuation-in-part of application No. 09/193,209, which is a continuation-in-part of application No. 09/128,490, which is a continuation-in-part of application No. 08/970,822, and a continuation-in-part of application No. 08/474,783, application No. 10/174, 803, which is a continuation-in-part of application No. 09/770,974, filed on Jan. 26, 2001, now Pat. No. 6,648,367, and a continuation-in-part of application No. 09/767,020, filed on Jan. 23, 2001, now Pat. No. 6,533,316, and a continuation-in-part of application No. 09/753,186, filed on Jan. 2, 2001, now Pat. No. 6,484,080, application No. 10/174,803, which is a continuation-in-part of application No. 09/500,346, filed on Feb. 8, 2000, now Pat. No. 6,442, 504, which is a continuation-in-part of application No. 09/128,490, which is a continuation-in-part of application No. 08/970,822, and a continuation-in-part of application No. 08/474,783.

(51) Int. Cl.$^7$ ............................................. B60R 21/32
(52) U.S. Cl. ..................... 177/1; 177/144; 702/101; 180/273; 280/735; 701/45
(58) Field of Search ..................... 701/45; 702/101, 702/102; 180/273; 280/735; 177/136, 144, 210 R, 1

(56) References Cited

U.S. PATENT DOCUMENTS

| 3,275,975 A | 9/1966 | King ........................ 180/272 |
| 4,519,652 A | 5/1985 | Kamijo ...................... 180/268 |

(Continued)

FOREIGN PATENT DOCUMENTS

| EP | 950560 | 10/1999 | ................. 177/144 |
| EP | 0990565 | 4/2000 | |

(Continued)

Primary Examiner—Randy W. Gibson
(74) Attorney, Agent, or Firm—Brian Roffe

(57) ABSTRACT

Arrangement and method for determining weight of an occupying item in a seat including one or more weight sensors arranged to obtain a measurement of the force applied to the seat, a forcing function determination arrangement for measuring a forcing function of the seat and a processor coupled to the weight sensor(s) and forcing function determination arrangement for receiving the measurement of the force applied to the weight sensor(s) and the measurement of the forcing function from the forcing function measurement system and determining the weight of the occupying item based thereon. The forcing function determination arrangement may include an accelerometer and measures effects on the seat caused by load of a seatbelt associated with the seat and/or effects on the seat of road roughness, steering maneuvers, and a vehicle suspension system.

39 Claims, 36 Drawing Sheets

U.S. PATENT DOCUMENTS

| | | | |
|---|---|---|---|
| 4,625,320 A | 11/1986 | Butcher | 382/104 |
| 4,639,872 A | 1/1987 | McHale et al. | 364/463 |
| 4,645,233 A | 2/1987 | Bruse et al. | 280/753 |
| 4,698,571 A | 10/1987 | Mizuta et al. | 318/466 |
| 4,811,226 A | 3/1989 | Shinohara | 318/466 |
| 4,907,153 A | 3/1990 | Brodsky | 364/424.05 |
| 5,008,946 A | 4/1991 | Ando | 180/167 |
| 5,071,160 A | 12/1991 | White et al. | 280/735 |
| 5,074,583 A | 12/1991 | Fujita | 280/735 |
| 5,086,652 A | 2/1992 | Kropp | 73/767 |
| 5,090,493 A | 2/1992 | Bergan et al. | 177/211 |
| 5,118,134 A | 6/1992 | Mattes | 280/735 |
| 5,125,686 A | 6/1992 | Yano | 280/801.2 |
| 5,155,685 A | 10/1992 | Kishi et al. | 364/424.05 |
| 5,161,820 A | 11/1992 | Vollmer | 280/730 |
| 5,222,399 A | 6/1993 | Kropp | 73/862.68 |
| 5,232,243 A | 8/1993 | Blackburn et al. | 280/735 |
| 5,254,924 A | 10/1993 | Ogasawara | 364/424.05 |
| 5,330,226 A | 7/1994 | Gentry et al. | 280/735 |
| 5,377,108 A | 12/1994 | Nishio | 701/45 |
| 5,413,378 A | 5/1995 | Steffens, Jr. et al. | 280/735 |
| 5,439,249 A | 8/1995 | Steffens, Jr. et al. | 280/735 |
| 5,454,591 A | 10/1995 | Mazur et al. | 280/735 |
| 5,474,327 A | 12/1995 | Schousek | 280/735 |
| 5,531,472 A | 7/1996 | Semchena et al. | 280/735 |
| 5,573,269 A | 11/1996 | Gentry et al. | 280/735 |
| 5,583,771 A | 12/1996 | Lynch et al. | 701/45 |
| 5,653,462 A | 8/1997 | Breed et al. | 280/735 |
| 5,670,853 A | 9/1997 | Bauer | 318/286 |
| 5,691,693 A | 11/1997 | Kithil | 340/439 |
| 5,694,320 A | 12/1997 | Breed | 364/424.055 |
| 5,702,123 A | 12/1997 | Takahashi et al. | 280/735 |
| 5,714,695 A | 2/1998 | Bruns | 177/211 |
| 5,732,375 A * | 3/1998 | Cashler | 701/45 |
| 5,748,473 A | 5/1998 | Breed et al. | 364/424.055 |
| 5,785,347 A | 7/1998 | Adolph et al. | 280/735 |
| 5,802,479 A | 9/1998 | Kithil et al. | 701/45 |
| 5,821,633 A | 10/1998 | Burke et al. | 307/10.1 |
| 5,822,707 A | 10/1998 | Breed et al. | 701/49 |
| 5,829,782 A | 11/1998 | Breed et al. | 280/735 |
| 5,844,486 A | 12/1998 | Kithil et al. | 340/573 |
| 5,848,802 A | 12/1998 | Breed et al. | 280/735 |
| 5,918,696 A | 7/1999 | Van Voorhies | 180/273 |
| 5,927,427 A | 7/1999 | Sewell et al. | 180/273 |
| 5,942,695 A | 8/1999 | Verma et al. | 73/768 |
| 5,943,295 A | 8/1999 | Varga et al. | 367/99 |
| 5,948,031 A | 9/1999 | Jinno et al. | 701/45 |
| 5,957,491 A | 9/1999 | Cech et al. | 280/735 |
| 5,973,273 A * | 10/1999 | Tal et al. | 177/1 |
| 5,979,585 A | 11/1999 | Van Voorhies | 180/273 |
| 5,984,349 A | 11/1999 | Van Voorhies | 280/735 |
| 5,991,676 A | 11/1999 | Podoloff et al. | 701/45 |
| 6,015,163 A | 1/2000 | Langford et al. | 280/735 |
| 6,021,863 A | 2/2000 | Stanley | 180/273 |
| 6,039,344 A | 3/2000 | Mehney et al. | 280/735 |
| 6,045,155 A | 4/2000 | Cech et al. | 280/735 |
| 6,056,079 A * | 5/2000 | Cech et al. | 180/273 |
| 6,069,325 A | 5/2000 | Aoki | 177/136 |
| 6,076,853 A | 6/2000 | Stanley | 280/735 |
| 6,087,598 A | 7/2000 | Munch | 177/144 |
| 6,104,100 A | 8/2000 | Neuman | 307/10.1 |
| 6,109,117 A | 8/2000 | Stanley et al. | 73/862.325 |
| 6,161,439 A * | 12/2000 | Stanley | 73/862.391 |
| 6,161,891 A | 12/2000 | Blakesley | 296/65.01 |
| 6,218,632 B1 | 4/2001 | McCarthy et al. | 177/144 |
| 6,231,076 B1 | 5/2001 | Blakesley et al. | 280/735 |
| 6,253,134 B1 | 6/2001 | Breed et al. | 701/49 |
| 6,259,042 B1 * | 7/2001 | David | 177/136 |
| 6,259,167 B1 * | 7/2001 | Norton | 307/10.1 |
| 6,260,879 B1 | 7/2001 | Stanley | 280/735 |
| 6,286,861 B1 | 9/2001 | Cech et al. | 280/735 |
| 6,808,200 B2 * | 10/2004 | Drobny et al. | 280/735 |
| 6,808,201 B2 * | 10/2004 | Aoki | 280/735 |

FOREIGN PATENT DOCUMENTS

| | | | |
|---|---|---|---|
| GB | 2289332 | 11/1995 | 280/735 |
| GB | 2333070 | 7/1999 | |
| GB | 2340252 | 2/2002 | |
| WO | 9825112 | 6/1998 | |
| WO | 0112473 | 2/2001 | |
| WO | 0113076 | 2/2001 | |

* cited by examiner

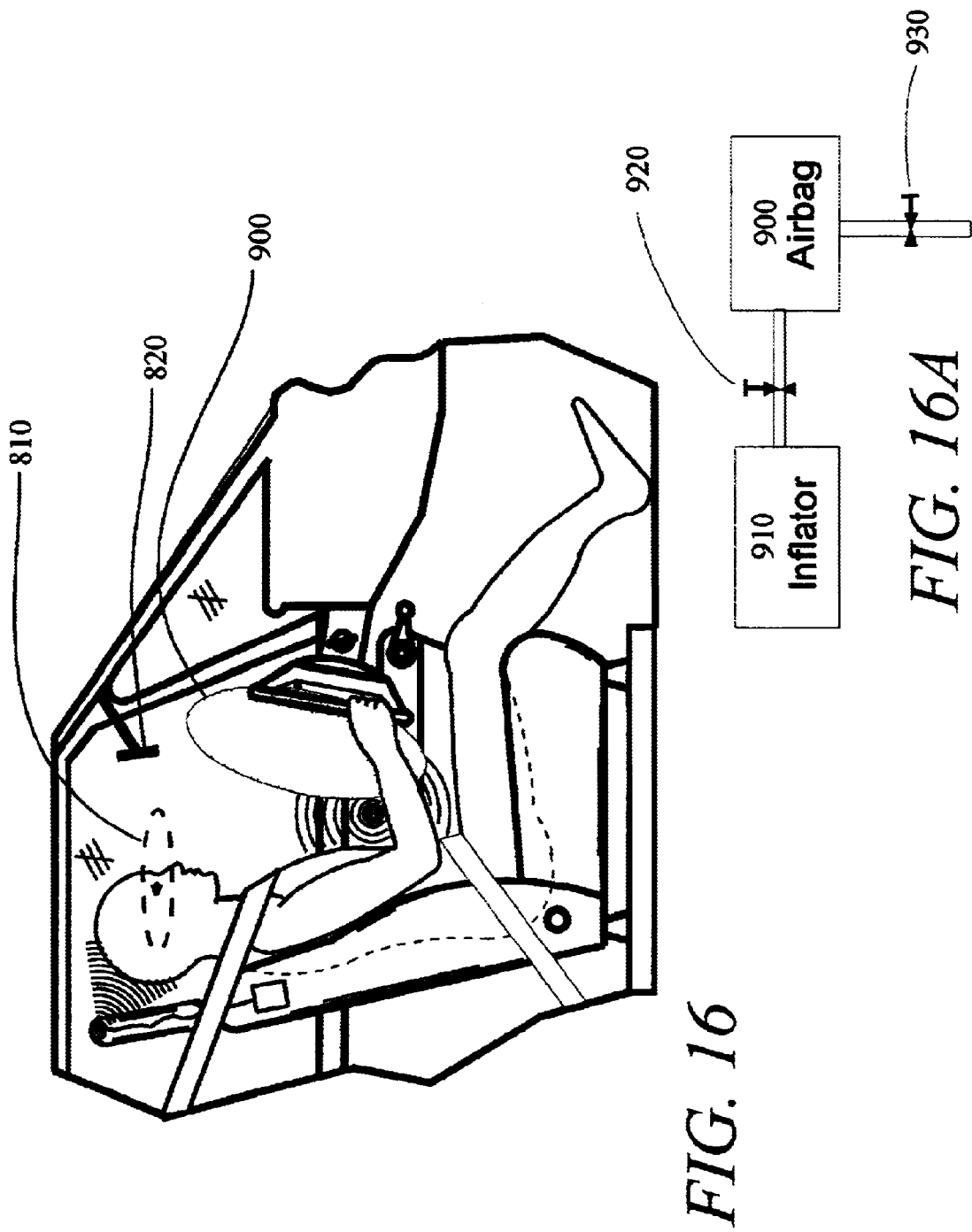

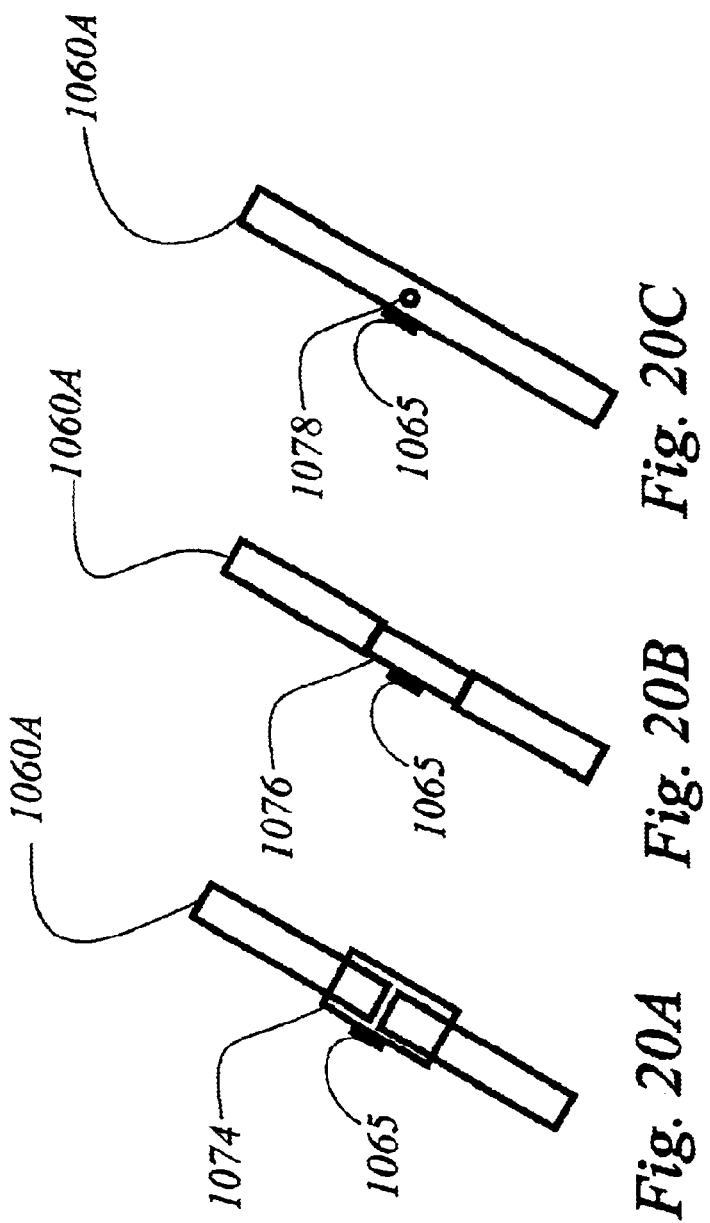

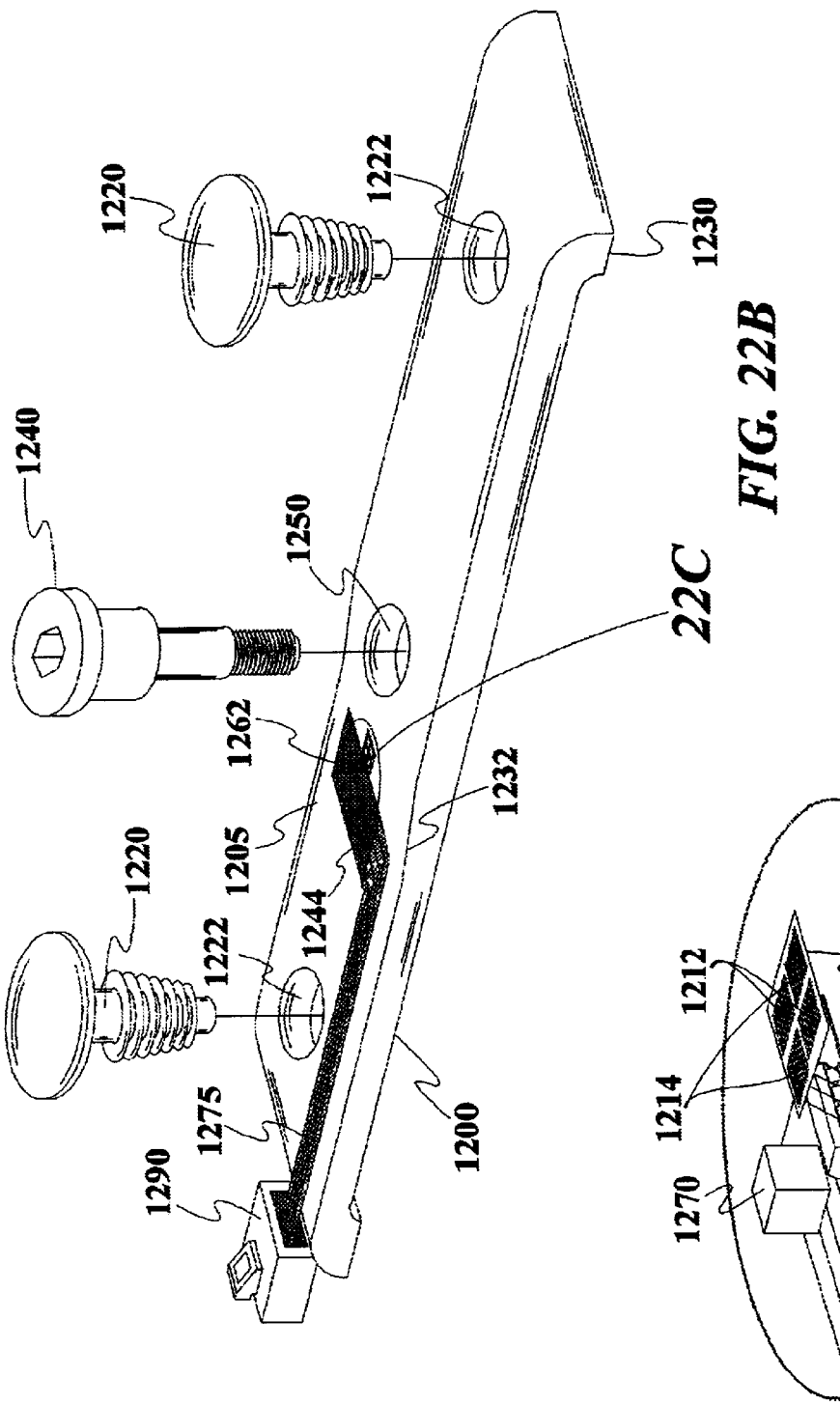

APPARATUS AND METHOD FOR MEASURING WEIGHT OF AN OCCUPYING ITEM OF A SEAT

CROSS REFERENCE TO RELATED APPLICATIONS

This application is a continuation-in-part of:

1) U.S. patent application Ser. No. 09/500,346 filed Feb. 8, 2000 which in turn is a continuation-in-part of U.S. patent application Ser. No. 09/128,490, filed Aug. 4, 1998, now U.S. Pat. No. 6,078,854, which in turn is a continuation-in-part of both U.S. patent application Ser. No. 08/474,783 filed Jun. 7, 1995, now U.S. Pat. No. 5,822,707, and U.S. patent application Ser. No. 08/970,822 filed Nov. 14, 1997, now U.S. Pat. No. 6,081,757;

2) U.S. patent application Ser. No. 09/849,558 filed May 4, 2001 now U.S. Pat. No. 6,653,577 which in turn is a continuation-in-part of U.S. patent application Ser. No. 09/193,209 filed Nov. 17, 1998, now U.S. Pat. No. 6,242,701, which in turn is a continuation-in-part of U.S. patent application Ser. No. 09/128,490 filed Aug. 4, 1998, now U.S. Pat. No. 6,078,854, which in turn is a continuation-in-part of both U.S. patent application Ser. No. 08/474,783 filed Jun. 7, 1995, now U.S. Pat. No. 5,822,707, and U.S. patent application Ser. No. 08/970,822 filed Nov. 14, 1997, now U.S. Pat. No. 6,081,757;

3) U.S. patent application Ser. No. 09/849,559 filed May 4, 2001 which in turn is a continuation-in-part of U.S. patent application Ser. No. 09/193,209 filed Nov. 17, 1998, now U.S. Pat. No. 6,242,701, which in turn is a continuation-in-part of U.S. patent application Ser. No. 09/128,490 filed Aug. 4, 1998, now U.S. Pat. No. 6,078,854, which in turn is a continuation-in-part of both U.S. patent application Ser. No. 08/474,783 filed Jun. 7, 1995, now U.S. Pat. No. 5,822,707, and U.S. patent application Ser. No.08/970,822 filed Nov. 14, 1997, now U.S. Pat. No. 6,081,757;

4) U.S. patent application Ser. No. 09/901,879 filed Jul. 9, 2001 which in turn is a continuation of U.S. patent application Ser. No. 09/849,559 filed May 4, 2001 which in turn is a continuation-in-part of U.S. patent application Ser. No.09/193,209 filed Nov. 17, 1998, now U.S. Pat. No. 6,242,701, which in turn is a continuation-in-part of U.S. patent application Ser. No. 09/128,490 filed Aug. 4, 1998, now U.S. Pat. No. 6,078,854, which in turn is a continuation-in-part of both U.S. patent application Ser. No. 08/474,783 filed Jun. 7, 1995, now U.S. Pat. No. 5,822,707, and U.S. patent application Ser. No. 08/970,822 filed Nov. 14, 1997, now U.S. Pat. No. 6,081,757;

5) U.S. patent application Ser. No.09/753,186 filed Jan. 2, 2001; now U.S. Pat. No. 6,484,080

6) U.S. patent application Ser. No. 09/767,020 filed Jan. 23, 2001 now U.S. Pat. No. 6,533,316; and 7) U.S. patent application Ser. No. 09/770,974 filed Jan. 26, 2001 now U.S. Pat. No. 6,648,367.

FIELD OF THE INVENTION

The present invention relates to methods and apparatus for measuring the weight of an occupying item of a seat, in particular, a seat in an automotive vehicle.

The present invention also relates to apparatus and methods for adjusting a vehicle component, system or subsystem in which the occupancy of a seat, also referred to as the "seated state" herein, is evaluated using at least a weight measuring apparatus and the component, system or subsystem may then be adjusted based on the evaluated occupancy thereof. The vehicle component, system or subsystem, hereinafter referred to simply as a component, may be any adjustable component of the vehicle including, but not limited to, the bottom portion and backrest of the seat, the rear view and side mirrors, the brake, clutch and accelerator pedals, the steering wheel, the steering column, a seat armrest, a cup holder, the mounting unit for a cellular telephone or another communications or computing device and the visors. Further, the component may be a system such an as airbag system, the deployment or suppression of which is controlled based on the seated-state of the seat. The component may also be an adjustable portion of a system the operation of which might be advantageously adjusted based on the seated-state of the seat, such as a device for regulating the inflation or deflation of an airbag that is associated with an airbag system.

The present invention also relates to apparatus and method for automatically adjusting a vehicle component to a selected or optimum position for an occupant of a seat based on at least two measured morphological characteristics of the occupant, one of which is the weight of the occupant. Other morphological characteristics include the height of the occupant, the length of the occupant's arms, the length of the occupant's legs, the occupant's head diameter, facial features and the inclination of the occupant's back relative to the seat bottom. Other morphological characteristics are also envisioned for use in the invention including iris pattern properties from an iris scan, voice print and finger and hand prints.

BACKGROUND OF THE INVENTION

Automobiles equipped with airbags are well known in the prior art. In such airbag systems, the car crash is sensed and the airbags rapidly inflated thereby insuring the safety of an occupation in a car crash. Many lives have now been saved by such airbag systems. However, depending on the seated state of an occupant, there are cases where his or her life cannot be saved even by present airbag systems. For example, when a passenger is seated on the front passenger seat in a position other than a forward facing, normal state, e.g., when the passenger is out of position and near the deployment door of the airbag, there will be cases when the occupant will be seriously injured or even killed by the deployment of the airbag.

Also, sometimes a child seat is placed on the passenger seat in a rear facing position and there are cases where a child sitting in such a seat has been seriously injured or killed by the deployment of the airbag.

Furthermore, in the case of a vacant seat, there is no need to deploy an airbag, and in such a case, deploying the airbag is undesirable due to a high replacement cost and possible release of toxic gases into the passenger compartment. Nevertheless, most airbag systems will deploy the airbag in a vehicle crash even if the seat is unoccupied.

For these reasons, there has been proposed a seated-state detecting unit such as disclosed in the following U.S. patents, which are incorporated herein by reference in their entirety to the extent the disclosure of these patents is necessary, assigned to the current assignee of the present application: Breed et al. (U.S. Pat. No. 5,563,462); Breed et al. (U.S. Pat. No. 5,829,782); Breed et al. (U.S. Pat. No. 5,822,707): Breed et al. (U.S. Pat. No. 5,694,320); Breed et al. (U.S. Pat. No. 5,748,473); and Varga et al. (U.S. Pat. No. 5,943,295). Typically, in some of these designs as many as three or four sensors or sets of sensors are installed at three or four points in a vehicle passenger compartment for transmitting ultrasonic or electromagnetic waves toward the passenger or driver's seat and receiving the reflected waves. Using appropriate hardware and software, the approximate configuration of the occupancy of either the passenger or driver seat can be determined thereby identifying and categorizing the occupancy of the relevant seat.

However, in the aforementioned literature using ultrasonics, the pattern of reflected ultrasonic waves from an adult occupant who may be out of position is sometimes similar to the pattern of reflected waves from a rear facing child seat. Also, it is sometimes difficult to discriminate the wave pattern of a normally seated child with the seat in a rear facing position from an empty seat with the seat in a more forward position. In other cases, the reflected wave pattern from a thin slouching adult with raised knees can be similar to that from a rear facing child seat. In still other cases, the reflected pattern from a passenger seat which is in a forward position can be similar to the reflected wave pattern from a seat containing a forward facing child seat or a child sitting on the passenger seat. In each of these cases, the prior art ultrasonic systems can suppress the deployment of an airbag when deployment is desired or, alternately, can enable deployment when deployment is not desired. Similar confusing situations can occur also for capacitive, electric field and optical occupant sensing systems.

If the discrimination between these cases can be improved, then the reliability of the seated-state detecting unit can be improved and more people saved from death or serious injury, In addition, the unnecessary deployment of an airbag can be prevented.

With respect to the adjustment of a vehicular seat, the adjustment of an automobile seat occupied by a driver of the vehicle is now accomplished by the use of either electrical switches and motors or by mechanical levers. As a result, the driver's seat is rarely placed at the proper driving position which is defined as the seat location which places the eyes of the driver in the so-called "eye ellipse" and permits him or her to comfortably reach the pedals and steering wheel. The "eye ellipse" is the optimum eye position relative to the windshield and rear view mirror of the vehicle.

The eye ellipse, which is actually an ellipsoid, is rarely achieved by the actions of the driver for a variety of reasons. One specific reason is the poor design of most seat adjustment systems particularly the so-called "4-way-seat". It is known that there are three degrees of freedom of a seat bottom, namely vertical, longitudinal, and rotation about the lateral or pitch axis. The 4-way-seat provides four motions to control the seat: (1) raising or lowering the front of the seat, (2) raising or lowering the back of the seat, (3) raising or lowering the entire seat, (4) moving the seat fore and aft. Such a seat adjustment system causes confusion since there are four control motions for three degrees of freedom. As a result, vehicle occupants are easily frustrated by such events as when the control to raise the seat is exercised, the seat not only is raised but is also rotated. Occupants thus find it difficult to place the seat in the optimum location using this system and frequently give up trying leaving the seat in an improper driving position Many vehicles today are equipped with a lumbar support system that is never used by most occupants. One reason is that the lumbar support cannot be preset since the shape of the lumbar for different occupants differs significantly, i.e., a tall person has significantly different lumbar support requirements than a short person. Without knowledge of the size of the occupant, the lumbar support cannot be automatically adjusted.

As discussed in the above referenced '320 patent, in approximately 95% of the cases where an occupant suffers a whiplash injury, the headrest is not properly located to protect him or her in a rear impact collision. Also, the stiffness and damping characteristics of a seat are fixed and no attempt is made in any production vehicle to adjust the stiffness and damping of the seat in relation to either the size or weight of an occupant, or to the environmental conditions such as road roughness. All of these adjustments, if they are to be done automatically, require knowledge of the morphology of the seat occupant.

Systems are now being used to attempt to identify the vehicle occupant based on a coded key or other object carried by the occupant. This requires special sensors within the vehicle to recognize the coded object. Also, the system only works if the coded object is used by the particular person for whom the vehicle was programmed. If the vehicle is used by a son or daughter, for example, who use their mother's key then the wrong seat adjustments are made. Also, these systems preserve the choice of seat position without any regard for the correctness of the seat position. With the problems associated with the 4-way seats, it is unlikely that the occupant ever properly adjusts the seat. Therefore, the error will be repeated every time the occupant uses the vehicle.

Moreover, these coded systems are a crude attempt to identify the occupant. An improvement can be made if the morphological characteristics of the occupant can be measured as described below. Such measurements can be made of the height and weight, for example, and used not only to adjust a vehicular component to a proper position but also to remember that position, as fine tuned by the occupant, for re-positioning the component the next time the occupant occupies the seat. For the purposes herein, a morphological characteristic will mean any measurable property of a human such as height, weight, leg or arm length, head diameter, facial features, iris patterns, voice, finger or hand prints etc.

As discussed more fully below, in a preferred implementation, once at least one and preferably two of the morphological characteristics of a driver are determined, e.g., by measuring his or her height and weight, the component such as the seat can be adjusted and other features or components can be incorporated into the system including, for example, the automatic adjustment of the rear view and/or side mirrors based on seat position and occupant height. In addition, a determination of an out-of-position occupant can be made and based thereon, airbag deployment suppressed if the occupant is more likely to be injured by the airbag than by the accident without the protection of the airbag. Furthermore, the characteristics of the airbag including the amount of gas produced by the inflator and the size of the airbag exit orifices can be adjusted to provide better protection for small lightweight occupants as well as large, heavy people. Even the direction of the airbag deployment can, in some cases, be controlled.

Still other features or components can now be adjusted based on the measured occupant morphology as well as the fact that the occupant can now be identified. Some of these features or components include the adjustment of seat armrest, cup holder, steering wheel (angle and telescoping), pedals, visors phone location and for that matter the adjustment of all things in the vehicle which a person must reach or interact with. Some items that depend on personal preferences can also be automatically adjusted including the radio station, temperature, ride and others.

"Pattern recognition" as used herein will generally mean any system which processes a signal that is generated by an object (e.g., representative of a pattern of returned or received impulses, waves or other physical property specific to and/or characteristic of and/or representative of that object) or is modified by interacting with an object, in order to determine to which one of a set of classes that the object belongs. Such a system might determine only that the object is or is not a member of one specified class, or it might attempt to assign the object to one of a larger set of specified classes, or find that it is not a member of any of the classes in the set. The signals processed are generally a series of electrical signals coming from transducers that are sensitive to acoustic (ultrasonic) or electromagnetic radiation (e.g., visible light, infrared radiation, radar, or any other frequency), although other sources of information are frequently included.

A trainable or a trained pattern recognition system as used herein generally means a pattern recognition system which is taught to recognize various patterns constituted within the signals by subjecting the system to a variety of examples. The most successful such system is the neural network or modular neural network. Thus, to generate the pattern recognition algorithm, test data is first obtained which constitutes a plurality of sets of returned waves, or wave patterns or other data, from an object (or from the space in which the object will be situated in the passenger compartment, i.e., the space above the seat) and an indication of the identity of that object, (e.g., a number of different objects are tested to obtain the unique wave patterns from each object). As such, the algorithm is generated, and stored in a computer processor, and which can later be applied to provide the identity of an object based on the wave or other pattern being received during use by a receiver connected to the processor and other information. For the purposes here, the identity of an object sometimes applies to not only the object itself but also to its location and/or orientation in the passenger compartment. For example, a rear facing child seat is a different object than a forward facing child seat and an out-of-position adult is a different object than a normally seated adult.

Other means of pattern recognition exist where the training is done by the researcher including Fuzzy Logic and Sensor Fusion systems.

To "identify" as used herein will generally mean to determine that the object belongs to a particular set or class. The class may be one containing, for example, all rear facing child seats, one containing all human occupants, or all human occupants not sitting in a rear facing child seat depending on the purpose of the system. In the case where a particular person is to be recognized, the set or class will contain only a single element, i.e., the person to be recognized.

To "ascertain the identity of" as used herein with reference to an object will generally mean to determine the type or nature of the object (obtain information as to what the object is), i.e., that the object is an adult, an occupied rear facing child seat, an occupied front facing child seat, an unoccupied rear facing child seat, an unoccupied front facing child seat, a child, a dog, a bag of groceries, etc.

An "object" or "occupying item" of a seat may be a living occupant such as a human or a dog, another living organism such as a plant, or an inanimate object such as a box or bag of groceries or an empty child seat.

"Out-of-position" as used for an occupant will generally mean that the occupant, either the driver or a passenger, is sufficiently close to the occupant protection apparatus (airbag) prior to deployment that he or she is likely to be more seriously injured by the deployment event itself than by the accident. It may also mean that the occupant is not positioned appropriately in order to attain the beneficial, restraining effects of the deployment of the airbag. As for the occupant being too close to the airbag, this typically occurs when the occupant's head or chest is closer than some distance such as about 5 inches from the deployment door of the airbag module. The actual distance value where airbag deployment should be suppressed depends on the design of the airbag module and is typically farther for the passenger airbag than for the driver airbag.

"Transducer" as used herein will generally mean the combination of a transmitter and a receiver. In some cases, the same device will serve both as the transmitter and receiver while in others two separate devices adjacent to each other will be used. In some cases, a transmitter is not used and in such cases transducer will mean only a receiver. Transducers include, for example, capacitive, inductive, ultrasonic, electromagnetic (antenna, CCD, CMOS arrays), weight measuring or sensing devices.

"Adaptation" as used here represents the method by which a particular occupant sensing system is designed and arranged for a particular vehicle model. It includes such things as the process by which the number, kind and location of various transducers is determined. For pattern recognition systems, it includes the process by which the pattern recognition system is taught to recognize the desired patterns. In this connection, it will usually include (1) the method of training, (2) the makeup of the databases used for training, testing and validating the particular system, or, in the case of a neural network, the particular network architecture chosen, (3) the process by which environmental influences are incorporated into the system, and (4) any process for determining the pre-processing of the data or the post processing of the results of the pattern recognition system. The above list is illustrative and not exhaustive. Basically, adaptation includes all of the steps that are undertaken to adapt transducers and other sources of information to a particular vehicle to create the system that accurately identifies and determines the location of an occupant or other object in a vehicle.

Heretofore, various methods have been proposed for measuring the weight of an occupying item of a vehicular seat. The methods include pads, sheets or films that have placed in the seat cushion which attempt to measure the pressure distribution of the occupying item. Prior to its first disclosure in U.S. Pat. No. 5,822,707 referenced above, systems for measuring occupant weight based on the strain in the seat structure had not been considered. Prior art weight measurement systems have been notoriously inaccurate. Thus, a more accurate weight measuring system is desirable. The strain and bladder weight measurement systems described herein, substantially eliminate the inaccuracy problems of prior art systems and permit an accurate determination of the weight of the occupying item of the vehicle seat. Additionally, as disclosed herein, in many cases, sufficient information can be obtained for the control of a vehicle component without the necessity of determining the entire weight of the occupant. For example, the force that the occupant exerts on one of the three support members may be sufficient.

A "vehicle" as used herein will generally mean a self-propelled land vehicle such as a car, truck or bus, but can also encompass airplanes, trains (locomotives and non-self-propelled cars), boats and non-self-propelled and vehicles such as truck trailers.

Most, if not all, of the problems discussed above are difficult to solve or unsolvable using conventional technology.

OBJECTS OF THE INVENTION

Accordingly, it is a principal object of the present invention to provide new and improved apparatus and methods for measuring the weight of an occupying item on a vehicle seat which apparatus and methods may be integrated into vehicular component adjustment apparatus and methods which evaluate the occupancy of the seat and adjust the location and/or orientation relative to the occupant and/or operation of a part of the component or the component in its entirety based on the evaluated occupancy of the seat.

It is another object of the present invention to provide new and improved vehicular seats including a weight measuring feature and weight measuring methods for implementation in connection with vehicular seats.

It is another object of the present invention to obtain a measurement of the weight of an occupying item in a seat of a vehicle while compensating for effects caused by a seatbelt, road roughness, steering maneuvers and a vehicle suspension system.

It is yet another object of the present invention to classify an occupying item in a seat based on dynamic forces measured by a weight sensor associated with the seat, with an optional compensation for effects caused by the seatbelt, road roughness, etc.

It is still another object of the present invention to determine whether an occupying item is belted based on dynamic forces measured by a weight sensor associated with the seat, with an optional compensation for effects caused by the seatbelt, road roughness, etc.

It is still another object of the present invention to determine whether an occupying item in the seat is alive or inanimate based on dynamic forces measured by a weight sensor associated with the seat, with an optional compensation for effects caused by the seatbelt, road roughness, etc.

It is yet another object of the invention to determine the location of the occupying item on a seat based on dynamic forces measured by a weight sensor associated with the seat, with an optional compensation for effects caused by the seatbelt, road roughness, etc.

Additional objects and advantages of this invention include:

1. to provide new and improved vehicular seats in which the weight applied by an occupying item to the seat is measured based on capacitance between conductive and/or metallic members underlying the seat cushion.

2. to provide new and improved adjustment apparatus and methods that evaluate the occupancy of the seat and adjust the location and/or orientation relative to the occupant and/or operation of a part of the component or the component in its entirety based on the evaluated occupancy of the seat and on a measurement of the occupant's weight or a measurement of a force exerted by the occupant on the seat.

3. to provide new and improved adjustment apparatus and methods that evaluate the occupancy of the seat by a combination of ultrasonic sensors and additional sensors and adjust the location and/or orientation relative to the occupant and/or operation of a part of the component or the component in its entirety based on the evaluated occupancy of the seat.

4. to provide new and improved adjustment apparatus and methods that reliably discriminate between a normally seated passenger and a forward facing child seat, between an abnormally seated passenger and a rear facing child seat, and whether or not the seat is empty and adjust the location and/or orientation relative to the occupant and/or operation of a part of the component or the component in its entirety based thereon.

5. to provide an improved weight measurement system and thereby improve the accuracy of another apparatus or system which utilizes measured weight as input, e.g., a component adjustment apparatus.

6. to provide new and improved adjustment apparatus and methods that evaluate the occupancy of the seat without the problems mentioned above.

7. to provide a system for passively and automatically adjusting the position of a vehicle component to a near optimum location based on the size of an occupant.

8. to provide a system for recognizing a particular occupant of a vehicle and thereafter adjusting various components of the vehicle in accordance with the preferences of the recognized occupant.

9. to provide systems for approximately locating the eyes of a vehicle driver to thereby permit the placement of the driver's eyes at a particular location in the vehicle.

10. to provide a pattern recognition system to permit more accurate location of an occupant's head and the parts thereof and to use this information to adjust a vehicle component.

11. to provide a method of determining whether a seat is occupied and, if not, leaving the seat at a neutral position.

12. to provide a system for automatically adjusting the position of various components of the vehicle to permit safer and more effective operation of the vehicle including the location of the pedals and steering wheel.

13. to determine whether an occupant is out-of-position relative to the airbag and if so, to suppress deployment of the airbag in a situation in which the airbag would otherwise be deployed.

14. to adjust the flow of gas into and/or out of the airbag based on the morphology and position of the occupant to improve the performance of the airbag in reducing occupant injury.

15. to provide a system where the morphological characteristics of an occupant are measured by sensors located within the seat.

16. to provide a system and method wherein the weight of an occupant is determined utilizing sensors located on the seat structure.

17. to provide a system and method wherein other morphological properties are used to identify an individual including facial features, iris patterns, voiceprints, fingerprints and handprints.

Further objects of the present invention will become apparent from the following discussion of the preferred embodiments of the invention.

SUMMARY OF THE INVENTION

Accordingly, to achieve at least one of the above objects, an arrangement for determining weight of an occupying item in a seat comprises at least one weight sensor arranged to obtain a measurement of the force applied to the seat, a forcing function determination arrangement for measuring a forcing function of the seat and a processor coupled to the weight sensor(s) and forcing function determination arrangement for receiving the measurement of the force applied to the weight sensor(s) and the measurement of the forcing function from the forcing function measurement system and determining the weight of the occupying item based thereon.

The forcing function determination arrangement may comprise at least one accelerometer, for example, a vertical accelerometer. The forcing function determination arrangement may be arranged to measure effects on the seat caused by load of a seatbelt associated with the seat whereby the forcing function is dependent on the load caused by the seatbelt. Also, the forcing function determination arrangement can measure effects on the seat of road roughness, steering maneuvers, and a vehicle suspension system whereby the forcing function is dependent on the road roughness, steering maneuvers and the vehicle suspension system.

The weight sensors may be of various, different types including a bladder having at least one chamber and at least one transducer for measuring the pressure in a respective chamber.

The processor can be designed or programmed to determine whether the occupying item is belted by analyzing the measurements from by the weight sensor(s) over time and the forcing function of the seat from the forcing function determination arrangement over time. Also, the processor can be designed or programmed to differentiate between animate and inanimate objects by analyzing measurements from the weight sensor(s) over time and the forcing function of the seat from the forcing function determination arrangement over time. In addition, the processor can be designed or programmed to determine the position of the occupying item on the seat by analyzing the measurements from the weight sensor(s) over time and the forcing function of the seat from the forcing function determination arrangement over time Another arrangement for determining weight of an occupying item in a seat comprises at least one weight sensor arranged to obtain a measurement of the force applied to the seat by the occupying item, a measuring system for measuring dynamic forces being applied to the seat and a processor coupled to the weight sensor(s) and measuring system for receiving the measurement of the force applied to the seat from the weight sensor(s) and the dynamic forces from the measuring system and determining the weight of the occupying item based thereon.

The measuring system may comprise at least one accelerometer, for example, a vertical accelerometer. It also may be arranged to measure effects on the seat caused by load of a seatbelt associated with the seat and/or effects on the seat of road roughness, steering maneuvers, and a vehicle suspension system.

The weight sensors may be of various, different types including a bladder having at least one chamber and at least one transducer for measuring the pressure in a respective chamber.

The processor can be designed or programmed to determine whether the occupying item is belted by analyzing the measurements from by the weight sensor(s) over time and the dynamic forces applied to the seat by the measuring system over time. Also, the processor can be designed or programmed to differentiate between animate and inanimate objects by analyzing measurements from the weight sensor(s) over time and the dynamic forces applied to the seat by the measuring system over time. In addition, the processor can be designed or programmed to determine the position of the occupying item on the seat by analyzing the measurements from the weight sensor(s) over time and the dynamic forces applied to the seat by the measuring system over time An arrangement for classifying an occupying item in a seat in accordance with the invention comprises at least one weight sensor arranged to measure the force applied to the seat at time intervals and a processor coupled to the weight sensor(s) for receiving the force measurements therefrom. The processor analyzes the force measurements from the weight sensor(s) over time to discern patterns providing classification information about the occupying item. More particularly, the processor may be trained to discern patterns providing information about the occupying item by conducting tests in which different occupying items are placed in the seat and measurements of the force applied to the seat are obtained by the weight sensor(s), before, during and after placement of the occupying item in the seat.

A forcing function determination arrangement may be provided and coupled to the processor for measuring a forcing function of the seat. The processor then considers the forcing function in the discerning of the patterns providing classification information about the occupying item.

A measuring system can also be coupled to the processor for measuring dynamic forces applied to the seat. The processor would then consider the dynamic forces applied to the seat in the discerning of the patterns providing classification information about the occupying item.

To achieve one or more objects of the invention, a method for determining weight of an occupying item in a seat of a vehicle comprises the steps of measuring the force applied to the seat, measuring a forcing function of the seat, and determining the weight of the occupying item based on the measured force applied to the seat and the measured forcing function. The features of the arrangements described above can be used in connection with this method.

Another method for determining weight of an occupying item in a seat comprises the steps of measuring the force applied to the seat, measuring dynamic forces applied to the seat and determining the weight of the occupying item based on the measured force applied to the seat and the measured dynamic forces applied to the seat. The features of the arrangements described above can be used in connection with this method.

A method for classifying an occupying item in a seat in accordance with the invention comprises the steps of measuring the force applied to the seat at time intervals and identifying patterns indicative of a classification of particular occupying items based on the measurements of the force applied to the seat over time. Identification of such patterns may entail utilizing a pattern recognition algorithm to identify patterns from the measurements of the force applied to the seat over time. For example, the pattern recognition algorithm can be trained by conducting tests in which different occupying items are placed in the seat and measuring the force applied to the seat before, during and after placement of the occupying item in the seat. Further, a forcing function of the seat can be measured so that identification of patterns would additionally entail identifying patterns based on the measurements of the force applied to the seat and the forcing function. Also, dynamic forces applied to the seat may be measured so that identification of patterns might entail identifying patterns based on the measurements of the force applied to the seat and the measurements of the dynamic forces applied to the seat.

BRIEF DESCRIPTION OF THE DRAWINGS

The following drawings are illustrative of embodiments of the invention and are not meant to limit the scope of the invention as encompassed by the claims.

FIG. 16 is a view similar to FIG. 8 showing an inflated airbag and an arrangement for controlling both the flow of gas into and the flow of gas out of the airbag during the crash where the determination is made based on a height sensor located in the headrest and a weight sensor in the seat.

FIGS. 20A, 20B and 20C illustrate three alternate methods of mounting strain transducers of an apparatus for measuring the weight of an occupying item of a seat in accordance with the invention onto a tubular seat support structural member.

FIG. 22B is a perspective view of a simply supported beam type load cell for use with the weight measurement system of this invention as an alternate to the cantilevered load cell of FIG. 22A.

FIG. 22C is an enlarged view of the portion designated 22C in FIG. 22B.

DETAILED DESCRIPTION OF THE PREFERRED EMBODIMENTS

Figure 1:
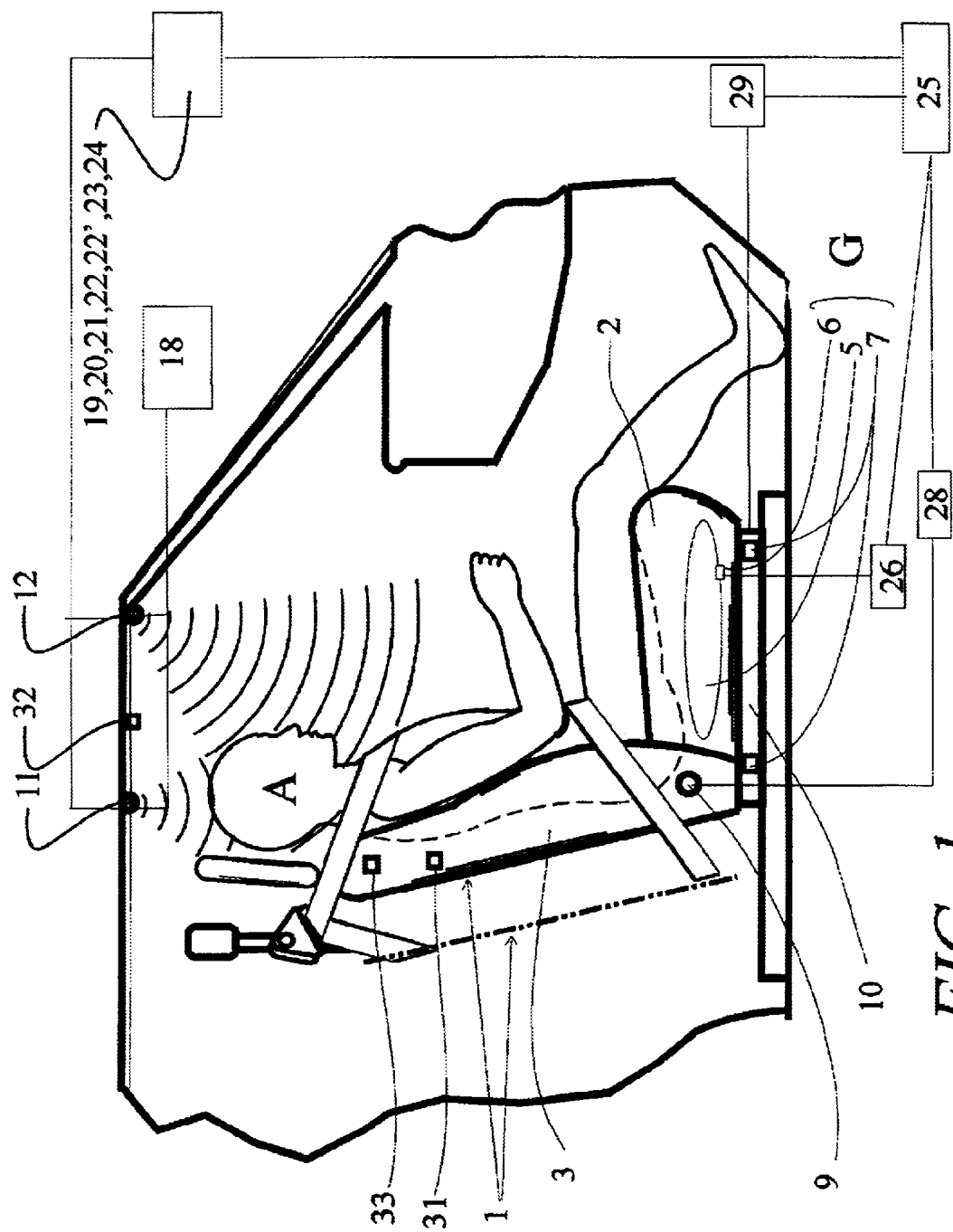
FIG. 1 shows a seated-state detecting unit in accordance with the present invention and the connections between ultrasonic or electromagnetic sensors, a weight sensor, a reclining angle detecting sensor, a seat track position detecting sensor, a heartbeat sensor, a motion sensor, a neural network circuit, and an airbag system installed within a vehicle compartment.

Referring to the accompanying drawings wherein like reference numbers designate the same or similar elements, FIG. 1 shows a passenger seat 1 to which an adjustment apparatus including a seated-state detecting unit according to the present invention may be applied. The seat 1 includes a horizontally situated bottom seat portion 2 and a vertically oriented back portion 3. The seat portion 2 is provided with one or more weight sensors 6 and 7 that determine the weight of the object occupying the seat. The coupled portion between the seated portion 2 and the back portion 3 is provided with a reclining angle detecting sensor 9, which detects the tilted angle of the back portion 3 relative to the seat portion 2. The seat portion 2 is provided with a seat track position-detecting sensor 10. The seat track position detecting sensor 10 fulfills a role of detecting the quantity of movement of the seat 1 which is moved from a back reference position, indicated by the dotted chain line. Embedded within the seatback is a heartbeat sensor 31 and a motion sensor 33. Attached to the headliner is a capacitance sensor 32. The seat 1 may be the driver seat, the front passenger seat or any other seat in a motor vehicle as well as other seats in transportation vehicles or seats in non-transportation applications.

Weight measuring means such as the sensors 6 and 7 are associated with the seat, e.g., mounted into or below the seat portion 2 or on the seat structure, for measuring the weight applied onto the seat. The weight may be zero if no occupying item is present. Sensors 6 and 7 may represent a plurality of different sensors which measure the weight applied onto the seat at different portions thereof or for redundancy purposes, e.g., such as by means of an airbag 7 in the seat portion 2. Such sensors may be in the form of strain, force or pressure sensors which measure the force or pressure on the seat or seat back, displacement measuring sensors which measure the displacement of the seat surface or the entire seat such as through the use of strain gages mounted on the seat structural members, such as 7, or other appropriate locations, or systems which convert displacement into a pressure wherein a pressure sensor can be used as a measure of weight and/or weight distribution.

Many practical problems have arisen during the development stages of bladder and strain gage based weight systems. Some of these problems relate to bladder sensors and in particular to gas filled bladder sensors and are effectively dealt with in U.S. Pat. Nos. 5,918,696, 5,927,427, 5,957,491, 5,979,585, 5,984,349, 6,021,863, 6,056,079, 6,076,853, 6,260,879 and 6,286,861, all of which are incorporated herein by reference. Other problems relate to seatbelt usage and to unanticipated stresses and strains that occur in seat mounting structures.

As to the latter issue, when an occupant or object is strapped into the seat using a seatbelt, it can cause an artificial load on a bladder type weight sensor and/or strain gage type weight sensors when the seatbelt anchorage points are not on the seat. The effects of seatbelt load can be separated from the effects of object or occupant weight, as disclosed in U.S. Pat. No. 6,242,701, cross-referenced above, if the time varying signals are considered rather than merely using averaging to obtain the static load. If a vehicle-mounted vertical accelerometer is present, then the forcing function on the seat caused by road roughness, steering maneuvers, and the vehicle suspension system can be compared with the response of the seat as measured by the bladder or strain gage weight sensors. Through mathematical analysis, the magnitude of the bladder pressure or strain caused by seat belt loads can be separated from pressure and strain caused by occupant or object mass. Also, since animated objects such as people cannot sit still indefinitely, such occupants can be distinguished from inanimate objects by similarly observing the change in pressure and strain distribution over time.

A serious problem that has plagued researchers attempting to adapt strain gage technology to seat weight sensing arises from fact that a typical automobile seat is an over-determined structure containing indeterminate stresses and strains in the supporting structure. This arises from a variety of causes such as the connection between the seat structure and the slide mechanisms below the seat or between the slide mechanisms and the floor which induces twisting and bending moments in the seat structural members. Similarly, since most seats have four attachment points and since only three points are necessary to determine a plane, there can be an unexpected distribution of compression and tensile stresses in the support structure. To complicate the situation, these indeterminable stresses and strains can vary as a function of seat position and temperature. The combination of all of these effects produces a significant error in the calculation of the weight of an occupying item and the distribution of this weight.

This problem can be solved by looking at changes in pressure and strain readings in addition to the absolute values. The dynamic response of an occupied seat is a function of the mass of the occupying item. As the car travels down the road, a forcing function is provided to the seat which can be measured by the vertical acceleration component and other acceleration components. This provides a method of measuring the response of the seat as well as the forcing function and thereby determining the mass of occupying item.

For example, when an occupant first enters the vehicle and sits on a seat, the change in pressure and/or strain measurements will provide an accurate measurement of the occupant's weight. This accuracy deteriorates as soon as the occupant attaches a seatbelt and/or moves the seat to a new position. Nevertheless, the change in occupancy of the seat is a significant event that can be easily detected and if the change in pressure and strain measurements are used as the measurement of the occupant weight, then the weight can be accurately determined. Similarly, the sequence of events for attaching a child seat to a vehicle is one that can be easily discerned since the seat is first placed into the vehicle and the seat belt cinched followed by placing the child in the seat or, alternately, the child and seat are placed in the vehicle followed by a cinching of the seatbelt. Either of these event sequences gives a high probability of the occupancy being a child in a child seat. This decision can be confirmed by dynamical measurements as described above.

A control system for controlling a component of the vehicle based on occupancy of the seat in accordance with the invention may comprise a plurality of strain gages, or bladder chambers, mounted in connection with the seat, each measuring strain or pressure of a respective location caused by occupancy of the seat, and a processor coupled to the strain or pressure gages and arranged to determine the weight of an occupying item based on the strain or pressure measurements from the strain or pressure gages over a period of time, i.e., dynamic measurements. The processor controls the vehicle component based at least in part on the determined weight of the occupying item of the seat. The processor can also determine motion of the occupying item of the seat based on the strain or pressure measurements from the strain or pressure gages over the period of time. One or more accelerometers may be mounted on the vehicle for measuring acceleration in which case, the processor may control the component based at least in part on the determined weight of the occupying item of the seat and the acceleration measured by the accelerometer(s). (See the discussion below in reference to FIG. 23.)

By comparing the output of various sensors in the vehicle, it is possible to determine activities that are affecting parts of the vehicle while not affecting other parts. For example, by monitoring the vertical accelerations of various parts of the vehicle and comparing these accelerations with the output of strain gage load cells placed on the seat support structure, or bladder sensors, a characterization can be made of the occupancy of the seat. Not only can the weight of an object occupying the seat be determined, but also the gross motion of such an object can be ascertained and thereby an assessment can be made as to whether the object is a life form such as a human being and whether the seatbelt is engaged. Strain gage weight sensors are disclosed, for example, in U.S. Pat. No. 6,242,701, which is incorporated herein by reference in its entirety as if the entire patent were printed herein. In particular, the inventors contemplate the combination of all of the ideas expressed in the '701 patent with those expressed in the current invention.

Thus, the combination of the outputs from these accelerometer sensors and the output of strain gage or bladder weight sensors in a vehicle seat, or in or on a support structure of the seat, can be used to make an accurate assessment of the occupancy of the seat and differentiate between animate and inanimate occupants as well as determining where in the seat the occupants are sitting and whether the seatbelt is engaged. This can be done by observing the acceleration signals from the sensors of FIG. 23 and simultaneously the dynamic strain gage measurements from seat-mounted strain or pressure gages or pressure measurements of bladder weight sensors. The accelerometers provide the input function to the seat and the strain gages measure the reaction of the occupying item to the vehicle acceleration and thereby provide a method of determining dynamically the mass of the occupying item and its location. This is particularly important during occupant position sensing during a crash event. By combining the outputs of the accelerometers and the strain gages and appropriately processing the same, the mass and weight of an object occupying the seat can be determined as well as the gross motion of such an object so that an assessment can be made as to whether the object is a life form such as a human being and whether a seatbelt is used and if so how tightly it is cinched.

Figure 2:
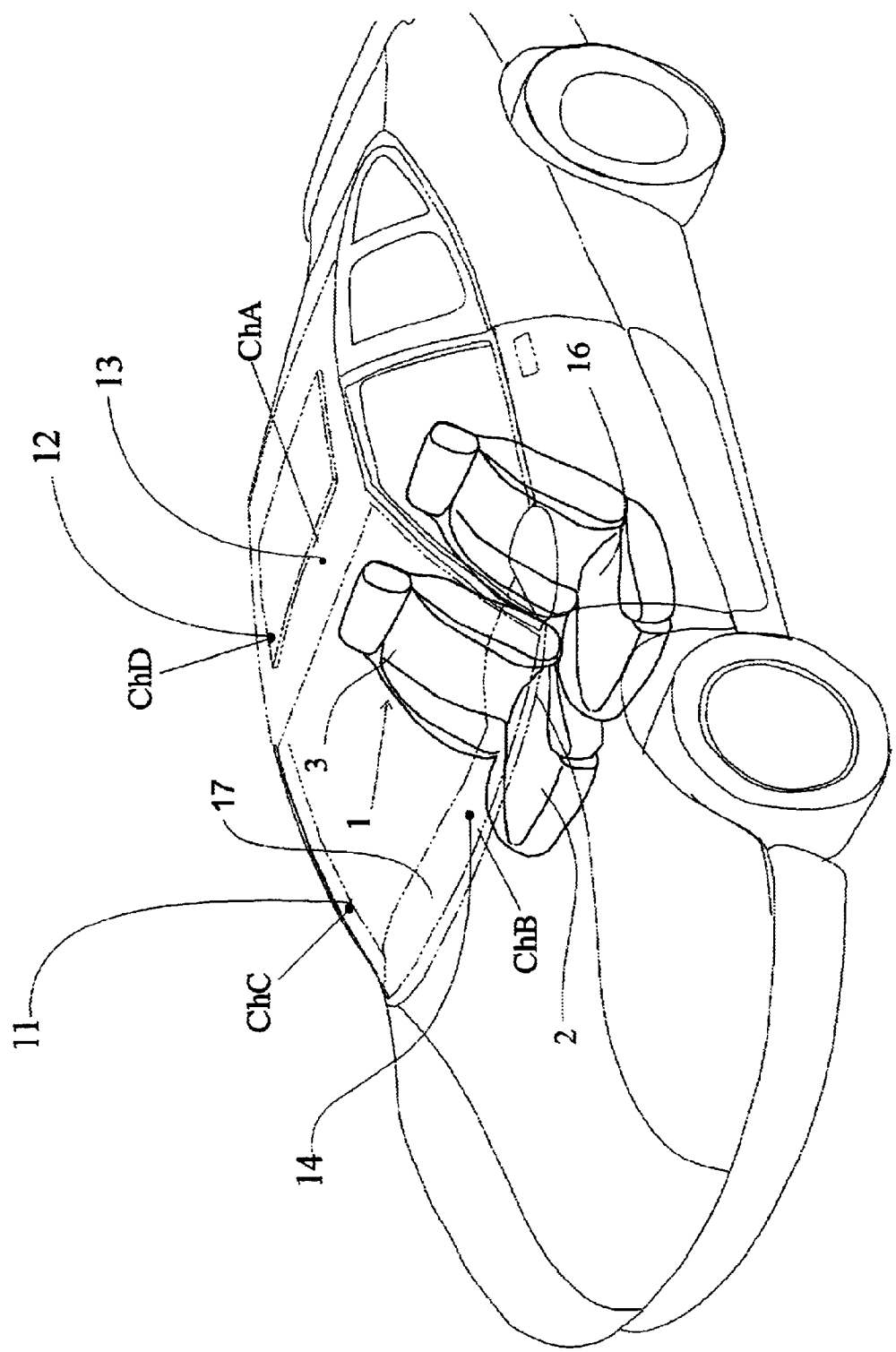
FIG. 2 is a perspective view of a vehicle showing the position of the ultrasonic or electromagnetic sensors relative to the driver and front passenger seats.

As shown in FIG. 2, there are provided four sets of wave-receiving sensor systems 11–14 mounted within the passenger compartment. Each set of sensor systems 11–14 comprises a transmitter and a receiver, which may be integrated into a single unit or individual components separated from one another. In this embodiment, the sensor system 11 is mounted on the upper portion of the front pillar, A-Pillar, of the vehicle. The sensor system 12 is mounted on the upper portion of the intermediate pillar, B-Pillar. The sensor system 13 is mounted on the roof ceiling portion or the headliner (FIG. 2). The sensor system 14 is mounted near the middle of an instrument panel 17 in front of the driver's seat 16 (FIG. 2). The sensor systems are preferably ultrasonic or electromagnetic. Although sensor systems 11–14 are described as being ultrasonic or electromagnetic sensors, the invention is equally applicable for other types of sensors (other than ultrasonic or electromagnetic) which will detect the presence of an occupant from a distance including capacitive, electric field or other electromagnetic sensors. Also, if the sensor systems 11–14 are passive infrared sensors, then they may only comprise a wave-receiver.

Figure 3:
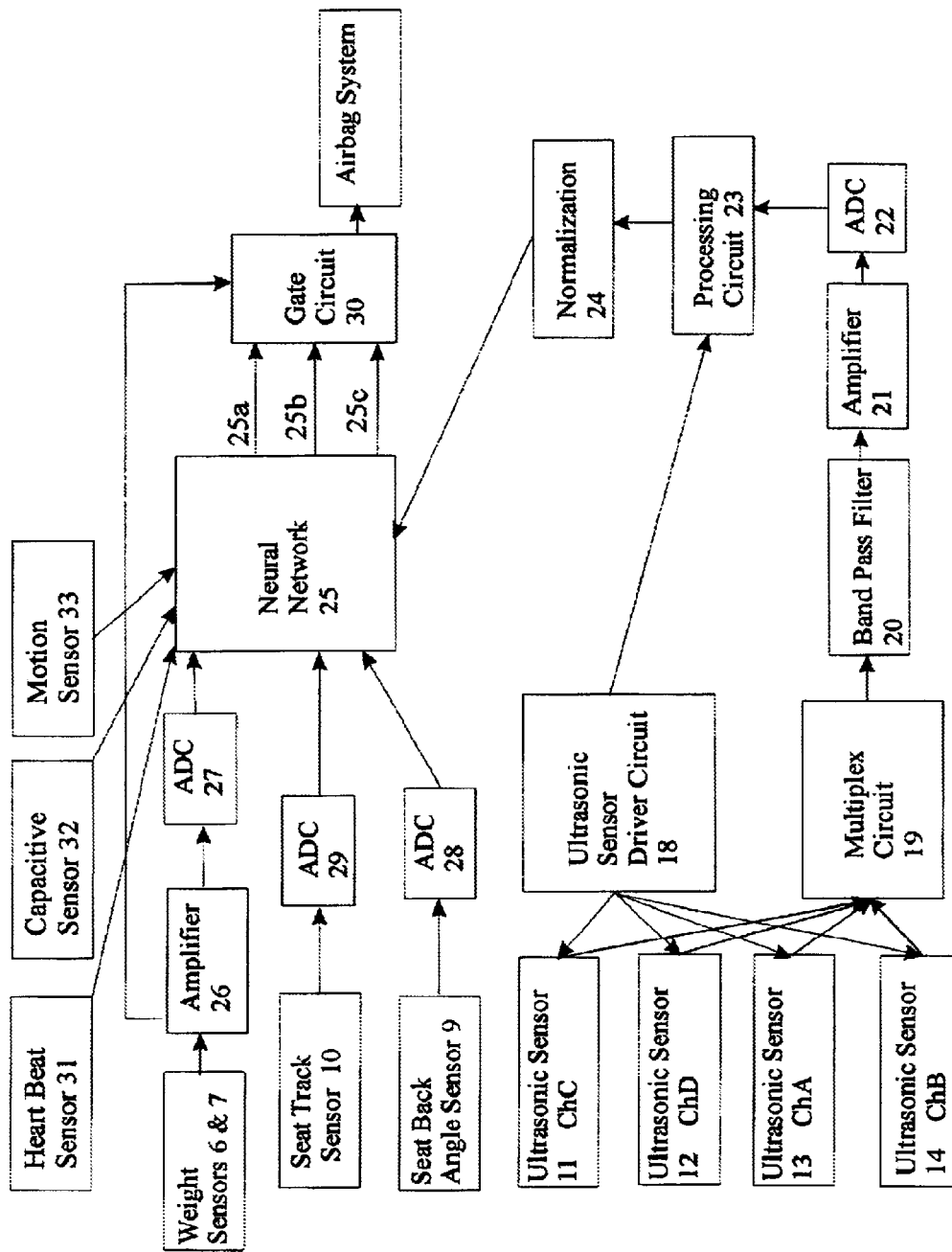
FIG. 3 is a circuit diagram of the seated-state detecting unit of the present invention.

The ultrasonic or electromagnetic sensor systems 11–14 are controlled or driven, one at a time or simultaneously, by an appropriate driver circuit such as ultrasonic or electromagnetic sensor driver circuit 18 shown in FIG. 3. The transmitters of the ultrasonic or electromagnetic sensor systems 11–14 transmit respective ultrasonic or electromagnetic waves toward the seat 1 and transmit pulses (see FIG. 4(c)) in sequence at times t1, t2, t3 and t4 (t4>t3>t2>t1) or simultaneously (t1=t2=t3=t4) The reflected waves of the ultrasonic or electromagnetic waves are received by the receivers ChA–ChD of the ultrasonic or electromagnetic sensors 11–14. The receiver ChA is associated with the ultrasonic or electromagnetic sensor system 13, the receiver ChB is associated with the ultrasonic or electromagnetic sensor system 14, the receiver ChD is associated with the ultrasonic or electromagnetic sensor system 11, and the receiver ChD is associated with the ultrasonic or electromagnetic sensor system 12.

Figures 4A, 4B, 4C:
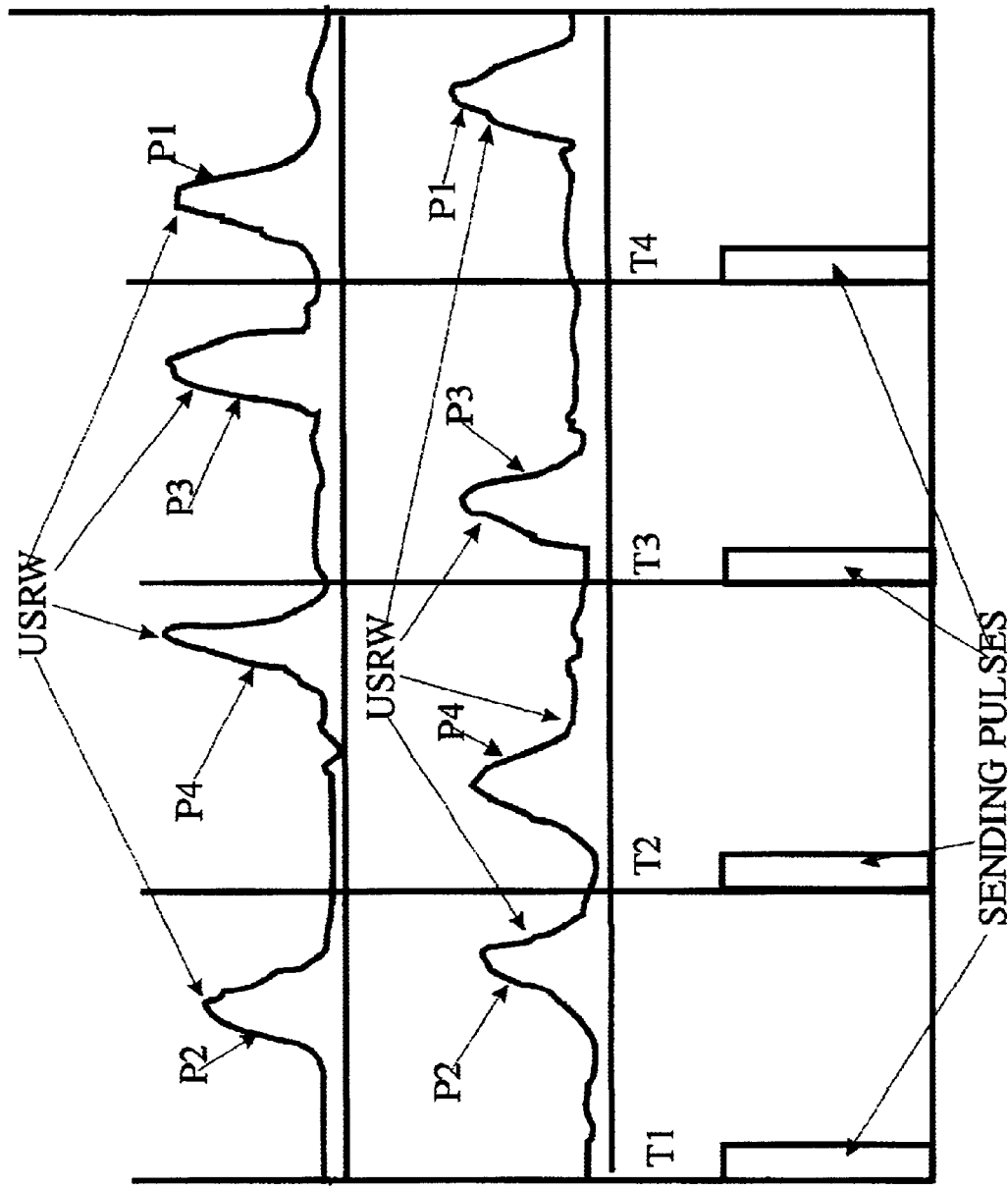
FIGS. 4(a), 4(b) and 4(c) are each a diagram showing the configuration of the reflected waves of an ultrasonic wave transmitted from each transmitter of the ultrasonic sensors toward the passenger seat, obtained within the time that the reflected wave arrives at a receiver, FIG. 4(a) showing an example of the reflected waves obtained when a passenger is in a normal seated-state, FIG. 4(b) showing an example of the reflected waves obtained when a passenger is in an abnormal seated-state (where the passenger is seated too close to the instrument panel), and FIG. 4(c) showing a transmit pulse.

The following discussion will apply to the case where ultrasonic sensors are used although a similar discussion can be presented relative to the use of electromagnetic sensors such as active infrared sensors, taking into account the differences in the technologies. Also, the following discussion will relate to an embodiment wherein the seat 1 is the front passenger seat. FIGS. 4(a) and 4(b) show examples of the reflected ultrasonic waves USRW that are received by receivers ChA–ChD. FIG. 4(a) shows an example of the reflected wave USRW that is obtained when an adult sits in a normally seated space on the passenger seat 1, while FIG. 4(b) shows an example of the reflected wave USRW that are obtained when an adult sits in a slouching state (one of the abnormal seated-states) in the passenger seat 1.

In the case of a normally seated passenger, as shown in FIG. 2, the location of the ultrasonic sensor system 12 is closest to the passenger A. Therefore, the reflected wave pulse P1 is received earliest after transmission by the receiver ChD as shown in FIG. 4(a), and the width of the reflected wave pulse P1 is larger. Next, the distance from the ultrasonic sensor 13 is closer to the passenger A, so a reflected wave pulse P2 is received earlier by the receiver ChA compared with the remaining reflected wave pulses P3 and P4. Since the reflected wave pauses P3 and P4 take more time than the reflected wave pulses P1 and P2 to arrive at the receivers ChC and ChB, the reflected wave pulses P3 and P4 are received as the timings shown in FIG. 4(a). More specifically, since it is believed that the distance from the ultrasonic sensor system 11 to the passenger A is slightly shorter than the distance from the ultrasonic sensor system 14 to the passenger A, the reflected wave pulse P3 is received slightly earlier by the receiver ChC than the reflected wave pulse P4 is received by the receiver ChB.

In the case where the passenger A is sitting in a slouching state in the passenger seat 1, the distance between the ultrasonic sensor system 11 and the passenger A is shortest.

Therefore, the time from transmission at time t3 to reception is shortest, and the reflected wave pulse P3 is received by the receiver ChC, as shown in FIG. 4(b). Next, the distances between the ultrasonic sensor system 14 and the passenger A becomes shorter, so the reflected wave pulse P4 is received earlier by the receiver ChB than the remaining reflected wave pulses P2 and P1. When the distance from the ultrasonic sensor system 13 to the passenger A is compared with that from the ultrasonic sensor system 12 to the passenger A, the distance from the ultrasonic sensor system 13 to the passenger A becomes shorter, so the reflected wave pulse P2 is received by the receiver ChA first and the reflected wave pulse 1 is thus received last by the receiver ChD.

The configurations of the reflected wave pulses P1–P4, the times that the reflected wave pulses P1–P4 are received, the sizes of the reflected wave pulses P1–P4 are varied depending upon the configuration and position of an object such as a passenger situated on the front passenger seat 1. FIGS. 4(a) and (b) merely show examples for the purpose of description and therefore it is a matter of course that the present invention is not limited to these examples.

The outputs of the receivers ChA–ChD, as shown in FIG. 3, are input to a band pass filter 20 through a multiplex circuit 19 which is switched in synchronization with a timing signal from the ultrasonic sensor drive circuit 18. The band pass filter 20 removes a low frequency wave component from the output signal based on each of the reflected wave USRW and also removes some of the noise. The output signal based on each of the reflected wave USRW is passed through the band pass filter 20, then is amplified by an amplifier 21. The amplifier also removes the high frequency carrier wave component in each of the reflected USRW and generates an envelope wave signal. This envelope wave signal is input to an analog/digital converter (ADC) 22 and digitized as measured data. The measured data is input to a processing circuit 23, which is controlled by the timing signal which is in turn output from the ultrasonic sensor drive circuit 18.

The processing circuit 23 collects measured data at intervals of 7 ms, and 47 data points are generated for each of the ultrasonic sensor systems 11–14. For each of these reflected waves USRW, the initial reflected wave portion T1 and the last reflected wave portion T2 are cut off. The reason for this will be described when the training procedure of a neural network circuit is described later, and the description is omitted for now. With this, 32 data points, 31 data points, 37 data points, and 38 data points will be sampled by the ultrasonic sensor systems 11, 12, 13 and 14, respectively. The reason why the number of data points differs for each of the ultrasonic sensor systems 11–14 is that the distance from the passenger seat 1 to the ultrasonic sensor systems 11–14 differ from one another.

Each of the measured data is input to a normalization circuit 24 and normalized. The normalized measured data is input to the neural network circuit 25 as wave data.

The output of the weight sensor(s) 6 and 7 is amplified by an amplifier 26 coupled to the weight sensor(s) 6 and 7 and the amplified output is input to the analog/digital converter 27.

The reclining angle detecting sensor 9 and the seat track position-detecting sensor 10, which each may comprise a variable resistor, and can be connected to constant-current circuits, respectively. A constant-current can be supplied from the constant-current circuit to the reclining angle detecting sensor 9, and the reclining angle detecting sensor 9 converts a change in the resistance value on the tilt of the back portion 3 to a specific voltage. This output voltage is input to an analog/digital converter 28 as angle data, i.e., representative of the angle between the back portion 3 and the seat portion 2. Similarly, a constant current can be supplied from the constant-current circuit to the seat track position-detecting sensor 10 and the seat track position detecting sensor 10 converts a change in the resistance value based on the track position of the seat portion 2 to a specific voltage. This output voltage is input to an analog/digital converter 29 as seat track data. Thus, the outputs of the reclining angle-detecting sensor 9 and the seat track position-detecting sensor 10 are input to the analog/digital converters 28 and 29, respectively. Each digital data value from the ADCs 28,29 is input to the neural network circuit 25. Although the digitized data of the weight sensor(s) 6 and 7 is input to the neural network circuit 25, the output of the amplifier 26 is also input to a comparison circuit. The comparison circuit, which is incorporated in the gate circuit algorithm, determines whether or not the weight of an object on the passenger seat 1 is more than a predetermined weight, such as 60 lbs., for example. When the weight is more than 60 lbs., the comparison circuit outputs a logic 1 to the gate circuit to be described later. When the weight of the object is less than 60 lbs., a logic 0 is output to the gate circuit.

A heartbeat sensor 31 is arranged to detect a heartbeat, and the magnitude thereof, of a human occupant of the seat, if such a human occupant is present. The output of the heartbeat sensor 31 is input to the neural network circuit 25. The heartbeat sensor 31 may be of the type as disclosed in McEwan (U.S. Pat. Nos. 5,573,012 and 5,766,208 which are incorporated herein in their entirety by reference) ) or based on noise radar technology. The heartbeat sensor 31 can be positioned at any convenient position relative the seat 1 where occupancy is being monitored. A preferred location is within the vehicle seatback for an MIR and in the headliner for a noise radar type device.

A capacitive or electric field sensor 32 is arranged to detect the presence of an occupying item on the seat 1 and the output thereof is input to the neural network circuit 25. Capacitor or electric field sensors appropriate for this function are disclosed in Kithil (U.S. Pat. No. 5,602,734, which is incorporated herein by reference) and Jinno et al (U.S. Pat. No. 5,948,031, which is incorporated herein by reference). Capacitive sensors can in general be mounted at locations 11–14 in FIG. 2 or in the vehicle seat or seatback although by their nature they can occupy considerably more space than shown in the drawings.

A motion sensor 33 is arranged to detect motion of an occupying item on the seat 1 and the output thereof is input to the neural network circuit 25. Motion sensors can utilize a micro-power impulse radar (MIR) system as disclosed, for example, in McEwan (U.S. Pat. No. 5,361,070, which is incorporated herein by reference), as well as many other patents by the same inventor or by noise radar. Motion sensing is accomplished by monitoring a particular range from the sensor as disclosed in that patent. MIR is one form of radar which has applicability to occupant sensing and can be mounted at locations such as 11–14 in FIG. 2. It has an advantage over ultrasonic sensors in that data can be acquired at a higher speed and thus the motion of an occupant can be more easily tracked. The ability to obtain returns over the entire occupancy range is somewhat more difficult than with ultrasound resulting in a more expensive system overall. MIR or noise radar has additional advantages in lack of sensitivity to temperature variation and can have a comparable resolution to about 40 kHz ultrasound.

Resolution comparable to higher frequency is also feasible. Additionally, multiple MIR sensors can be used when high speed tracking of the motion of an occupant during a crash is required since they can be individually pulsed without interfering with each other through time or code division multiplexing.

The neural network circuit 25 recognizes the seated-state of a passenger A by training as described in several books on Neural Networks referenced in the above referenced patents and patent applications. Then, after training the seated-state of the passenger A and developing the neural network weights, the system is tested. The training procedure and the test procedure of the neural network circuit 25 will hereafter be described with a flowchart shown in FIG. 6.

Figure 6:
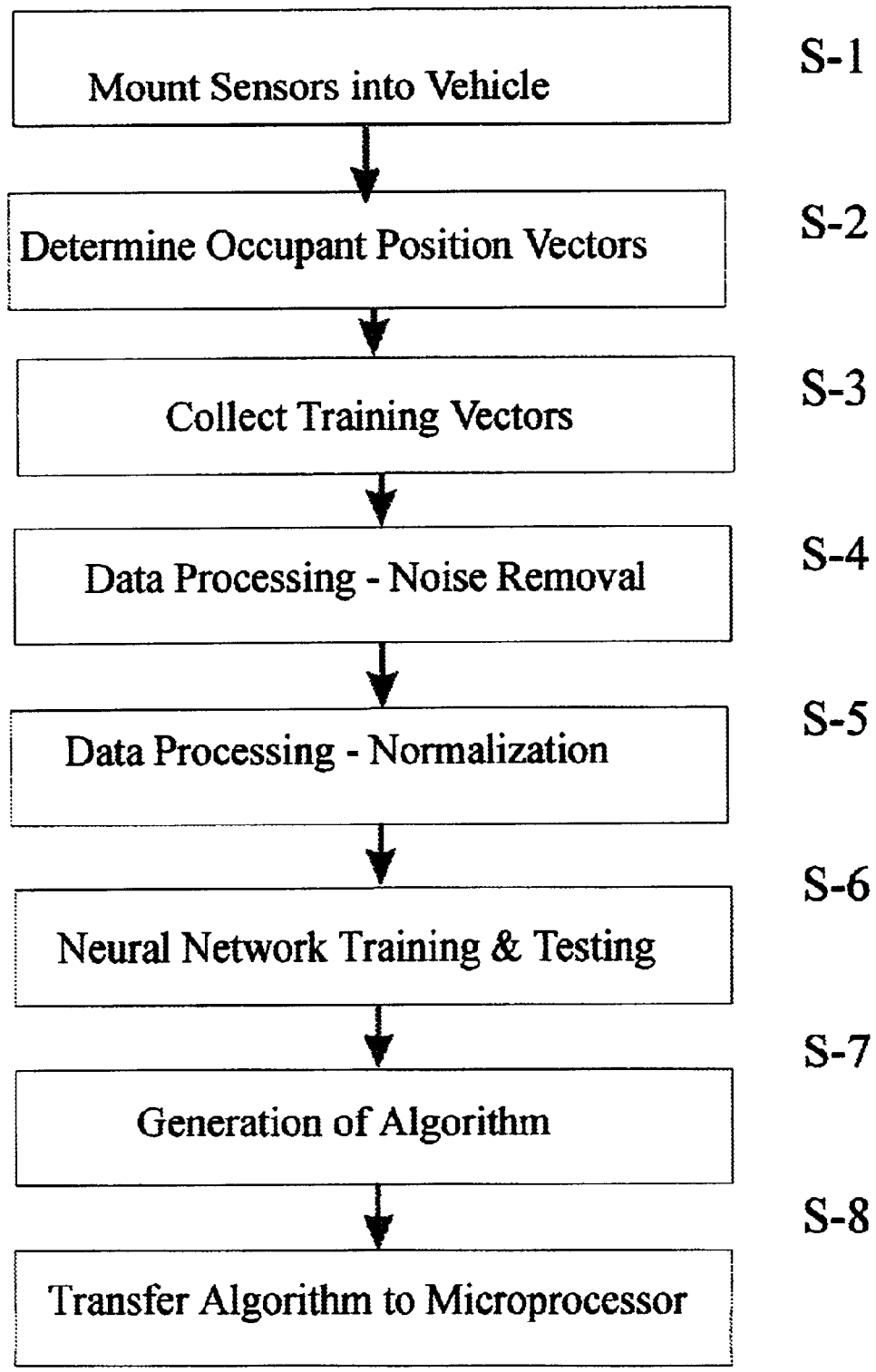
FIG. 6 is a flowchart showing the training steps of a neural network circuit.

As diagrammed in FIG. 6, the first step is to mount the four sets of ultrasonic sensor systems 11–14, the weight sensors 6 and 7, the reclining angle detecting sensor 9, and the seat track position detecting sensor 10 into a vehicle (step S1). Next, in order to provide data for the neural network circuit 25 to learn the patterns of seated states, data is recorded for patterns of all possible seated states and a list is maintained recording the seated states for which data was acquired. The data from the sensors/transducers 6, 7, 9–14 and 31–33, for a particular occupancy of the passenger seat is called a vector (step S2). It should be pointed out that the use of the reclining angle detecting sensor 9, seat track position detecting sensor 10, heartbeat sensor 31, capacitive sensor 32 and motion sensor 33 are not essential to the detecting apparatus and method in accordance with the invention. However, each of these sensors, in combination with any one or more of the other sensors enhances the evaluation of the seated-state of the seat.

For the vectors of data, adults and children each with different postures, states of windows etc. within the passenger compartment, and occupied and unoccupied child seats were selected. The selected adults include people with a variety of different physiques such as fat, lean, small, large, tall, short, and glasses wearing persons. The selected children ranged from an infant to a large child (for example, about 14 year old). In addition, the selected postures include, for example, a sitting state with legs crossed on a seat, a sitting state with legs on an instrument panel, a sitting state while reading a newspaper, a book, or a map, a sitting state while holding a cup of coffee, a cellular telephone or a dictation machine, and a slouching state with and without raised knees. Furthermore, the selected compartment states include variations in the seat track position, the window-opening amount, headrest position, and varying positions of a sun-visor. Moreover, a multitude of different models of child seats are used in the forward facing position and, where appropriate, in a rear facing position. In this example, the range of weights and the corresponding normalized values are as follows:

| Class | Weight Range | Normalized Value |
| --- | --- | --- |
| Empty Seat | 0 to 2.2 lbs. | 0 to 0.01 |
| Rear Facing Child Seat | 2.2 to 60 lbs. | 0.01 to 0.27 |
| Forward Facing Child Seat | 2.2 to 60 lbs. | 0.01 to 0.27 |
| Normal Position Adult | 60 lbs and greater | 0.27 to 1 |

Obviously, other weight ranges may also be used in accordance with the invention and each weight range may be tailored to specific conditions, such as different vehicles. The output of the weight sensors may not correspond directly to be weight ranges in the above table. If for example strain measuring sensors are placed on each of the vehicle seat supports, such sensors will also respond to the weight of the seat itself That weight must therefore the remove so that only the additional weight of an occupying item is measured. Similarly it may be desirable to place strain-sensing devices on only some of the vehicle seat support structures. In such cases the weight of the occupying item can be in inferred from the output of the strain sensing sensors. This will be described in greater detail below.

Various vehicle setups were prepared by a combination of these variations and, for in this embodiment, almost 500,000 or more vectors should be prepared for the patterns to be used as data for the neural network training.

Figure 5:
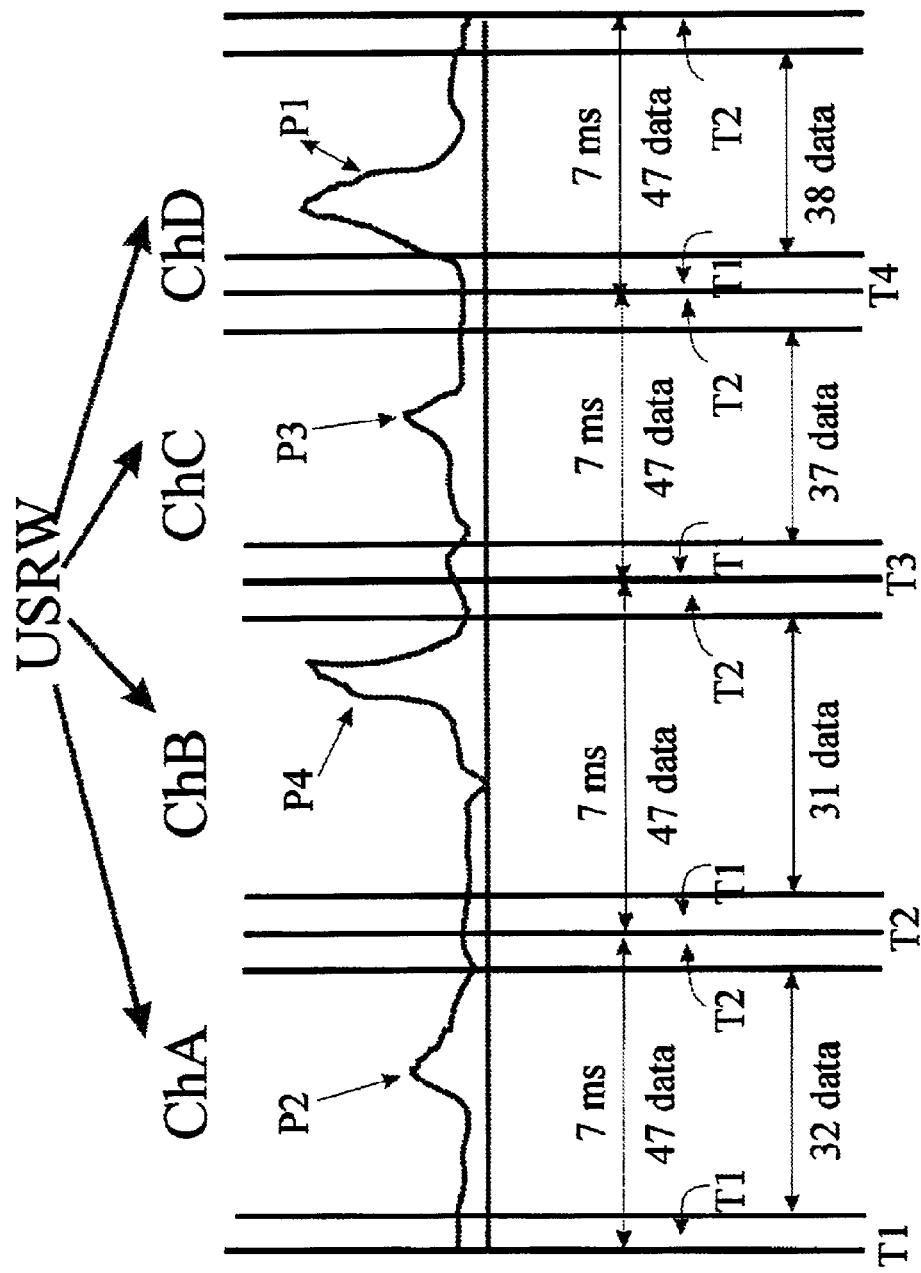
FIG. 5 is a diagram of the data processing of the reflected waves from the ultrasonic or electromagnetic sensors.

Next, based on the training data from the reflected waves of the ultrasonic sensor systems 11–14 and the other sensors 6, 7, 31–33, the vector data is collected (step S3). Next, the reflected waves P1–P4 are modified by removing the initial reflected waves with a short reflection time from an object (range gating) (period T1 in FIG. 5) and the last portion of the reflected waves with a long reflection time from an object (period P2 in FIG. 5) (step S4). It is believed that the reflected waves with a short reflection time from an object is a due to cross-talk, that is, waves from the transmitters which leaks into each of their associated receivers ChA–ChD. It is also believed that the reflected waves with a long reflection time are reflected waves from an object far away from the passenger seat or from multipath reflections. If these two reflected wave portions are used as data, they will add noise to the training process. Therefore, these reflected wave portions are eliminated from the data.

Figure 7:
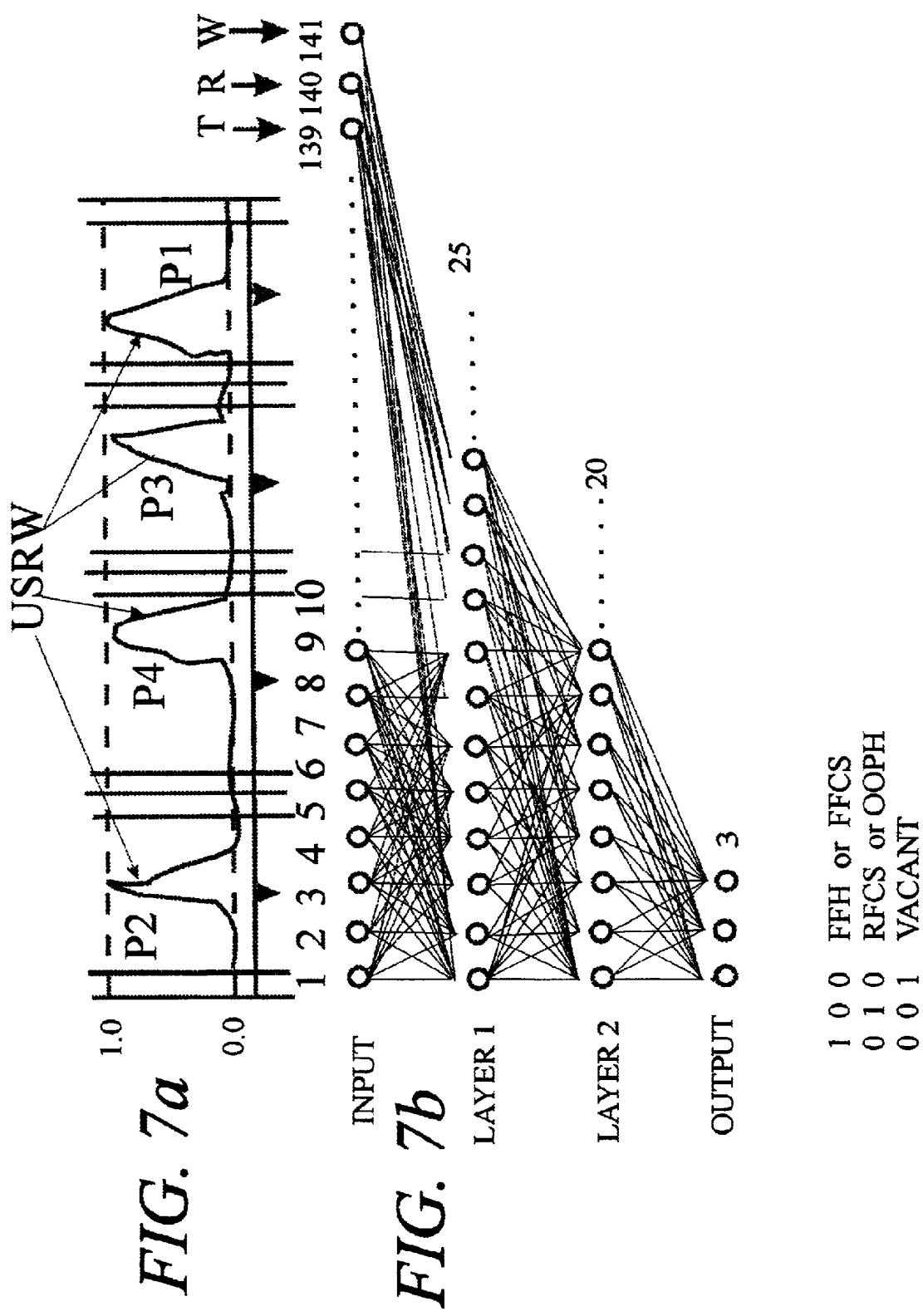
FIG. 7(a) is an explanatory diagram of a process for normalizing the reflected wave and shows normalized reflected waves.
FIG. 7(b) is a diagram similar to FIG. 7(a) showing a step of extracting data based on the normalized reflected waves and a step of weighting the extracted data by employing the data of the seat track position detecting sensor, the data of the reclining angle detecting sensor, and the data of the weight sensor.

As shown in FIG. 7(a), measured data is normalized by making the peaks of the reflected wave pulses P1–P4 equal (step S5). This eliminates the effects of different reflectivities of different objects and people depending on the characteristics of their surfaces such as their clothing Data from the weight sensor, seat track position sensor and seat recling angle sensor are also frequently normalized based typically on fixed normalization parameters.

The data from the transducers are now also preferably fed through a logaritmic or equivalent compression circuit that substantially reduces the magnitude of reflected signals from high reflectivity targets compared to those of low reflectivity. Additionally, a time gain circuit is used to compensate for the difference in sonic strength received by the transducer based on the distance of the reflecting object from the transducer.

Therefore, the normalized data from the ultrasonic transducers the seat track position detecting sensor 10, the reclining angle detecting sensor 9, from the weight sensor(s) 6 and 7, from the heartbeat sensor 31, the capacitive sensor 32 and the motion sensor 33 are input to the neural network circuit 25, and the neural network circuit 25 is then trained on this data. More specifically, the neural network circuit 25 adds up the normalized data from the ultrasonic transducers, from the seat track position detecting sensor 10, from the reclining angle detecting sensor 9, from the weight sensor(s) 6 and 7, from the heartbeat sensor 31, from the capacitive sensor 32 and from the motion sensor 33 with each data point multiplied by a associated weight according to the conventional neural network process to determine correlation function (step S6).

In this embodiment, 144 data points are appropriately interconnected at 25 connecting points of layer 1, and each data point is mutually correlated through the neural network training and weight determination process. The 144 data points consist of 138 measured data points from the ultrasonic transducers, the data (139th) from the seat track position detecting sensor 10, the data (140th) from the reclining angle detecting sensor 9, the data (141st) from the weight sensor(s) 6, the data ($142^{nd}$) from the heartbeat sensor 31, the data ($143^{rd}$) from the capacitive sensor and the data ($144^{th}$) from the motion sensor. Each of the connecting points of the layer 1 has an appropriate threshold value, and if the sum of measured data exceeds the threshold value, each of the connecting points will output a signal to the connecting points of layer 2. Although the weight sensor input is shown as a single input, in general there will be a separate input from each weight sensor used. For example, if the seat has four seat supports and if a strained measuring element is used on each support, what will be four data inputs to neural network.

The connecting points of the layer 2 comprises 20 points, and the 25 connecting points of the layer 1 are appropriately interconnected as the connecting points of the layer 2. Similarly, each data is mutually correlated through the training process and weight determination as described above and in the above referenced neural network texts. Each of the 20 connecting points of the layer 2 has an appropriate threshold value, and if the sum of measured data exceeds the threshold value, each of the connecting points will output a signal to the connecting points of layer 3.

The connecting points of the layer 3 comprises 3 points, and the connecting points of the layer 2 are interconnected at the connecting points of the layer 3 so that each data is mutually correlated as described above. If the sum of the outputs of the connecting points of layer 2 exceeds a threshold value, the connecting points of the latter 3 will output Logic values (100), (010), and (001) respectively, for example.

The threshold value of each connecting point is determined by multiplying weight coefficients and summing up the results in sequence, and the aforementioned training process is to determine a weight coefficient Wj so that the threshold value (ai) is a previously determined output.

$$ai=\Sigma Wj \cdot Xj \ (j=1 \text{ to } N)$$

wherein Wj is the weight coefficient,

Xj is the data and

N is the number of samples.

Based on this result of the training, the neural network circuit 25 generates the weights for the coefficients of the correlation function or the algorithm (step S 7).

At the time the neural network circuit 25 has learned a suitable number of patterns of the training data, the result of the training is tested by the test data. In the case where the rate of correct answers of the seated-state detecting unit based on this test data is unsatisfactory, the neural network circuit is further trained and the test is repeated. In this embodiment, the test was performed based on about 600,000 test patterns. When the rate of correct test result answers was at about 98%, the training was ended.

The neural network circuit 25 has outputs 25a, 25b and 25c. Each of the outputs 25a, 25b and 25c outputs a signal of logic 0 or 1 to a gate circuit or algorithm 30. Based on the signals from the outputs 25a, 25b and 25c, any one of these combination (100), (010) and (001) is obtained. In another preferred embodiment, all data for the empty seat was removed from the training set and the empty seat case was determined based on the output of the weight sensor alone. This simplifies the neural network and improves its accuracy.

In this embodiment, the output (001) correspond to a vacant seat, a seat occupied by an inanimate object or a seat occupied by a pet (VACANT), the output (010) corresponds to a rear facing child seat (RFCS) or an abnormally seated passenger (ASP), and the output (100) corresponds to a normally seated passenger (NSP) or a forward facing child seat (FFCS).

The gate circuit (seated-state evaluation circuit) 30 can be implemented by an electronic circuit or by a computer algorithm by those skilled in the art and the details will not be presented here. The function of the gate circuit 30 is to remove the ambiguity that sometimes results when ultrasonic sensors and seat position sensors alone are used. This ambiguity is that it is sometimes difficult to differentiate between a rear facing child seat (RFCS) and an abnormally seated passenger (ASP), or between a normally seated passenger (NSP) and a forward facing child seat (FFCS). By the addition of one or more weight sensors in the function of acting as a switch when the weight is above or below 60 lbs., it has been found that this ambiguity can be eliminated. The gate circuit therefore takes into account the output of the neural network and also the weight from the weight sensor(s) as being above or below 60 lbs. and thereby separates the two cases just described and results in five discrete outputs.

Thus, the gate circuit 30 fulfills a role of outputting five kinds of seated-state evaluation signals, based on a combination of three kinds of evaluation signals from the neural network 25 and superimposed information from the weight sensor(s). The five seated-state evaluation signals are input to an airbag deployment determining circuit that is part of the airbag system and will not be described here. Naturally, as disclosed in the above reference patents and patent applications, the output of this system can also be used to activate a variety of lights or alarms to indicate to the operator of the vehicle the seated state of the passenger. Naturally, the system that has been here described for the passenger side is also applicable for the most part for the driver side.

An alternate and preferred method of accomplishing the function performed by the gate circuit is to use a modular neural network. In this case, the first level neural network is trained on determining whether the seat is occupied or vacant. The input to this neural network consists of all of the data points described above. Since the only function of this neural network is to ascertain occupancy, the accuracy of this neural network is very high. If this neural network determines that the seat is not vacant, then the second level neural network determines the occupancy state of the seat.

In this embodiment, although the neural network circuit 25 has been employed as an evaluation circuit, the mapping data of the coefficients of a correlation function may also be implemented or transferred to a microcomputer to constitute the valuation circuit (see Step S 8 in FIG. 6).

According to the seated-state detecting unit of the present invention, the identification of a vacant seat (VACANT), a rear facing child seat (RFCS), a forward facing child seat (FFCS), a normally seated adult passenger (NSP), an abnormally seated adult passenger (ASP), can be reliably performed. Based on this identification, it is possible to control a component, system or subsystem in the vehicle. For example, a regulation valve which controls the inflation or deflation of an airbag may be controlled based on the evaluated identification of the occupant of the seat. This regulation valve may be of the digital or analog type. A digital regulation valve is one that is in either of two states, open or closed. The control of the flow is then accomplished by varying the time that the valve is open and closed, i.e., the duty cycle.

Moreover, the seated-state detecting unit described above may be used in a component adjustment system and method described below when the presence of a human being occupying the seat is detected.

The component adjustment system and methods in accordance with the invention automatically and passively adjust the component based on the morphology of the occupant of the seat. As noted above, the adjustment system may include the seated-state detecting unit described above so that it will be activated if the seated-state detecting unit detects that an adult or child occupant is seated on the seat, i.e., the adjustment system will not operate if the seat is occupied by a child seat, pet or inanimate objects. Obviously, the same system can be used for any seat in the vehicle including the driver seat and the passenger seat(s). This adjustment system may incorporated the same components as the seated-state detecting unit described above, i.e., the same components may constitute a part of both the seated-state detecting unit and the adjustment system, e.g., the weight measuring means.

The adjustment system described herein, although improved over the prior art, will at best be approximate since two people, even if they are identical in all other respects, may have a different preferred driving position or other preferred adjusted component location or orientation. A system that automatically adjusts the component, therefore, must learn from its errors. Thus, when a new occupant sits in the vehicle, for example, the system automatically estimates the best location of the component for that occupant and moves the component to that location, assuming it is not already at the best location. If the occupant changes the location, the system must remember that change and incorporate it into the adjustment the next time that person enters the vehicle and is seated in the same seat. Therefore, the system need not make a perfect selection the first time but it must remember the person and the position the component was in for that person. The system, therefore, makes one, two or three measurements of morphological characteristics of the occupant and then adjusts the component based on an algorithm. The occupant will correct the adjustment and the next time that the system measures the same measurements for those measurement characteristics, it will set the component to the corrected position. As such, preferred components for which the system in accordance with the invention is most useful are those which affect a driver of the vehicle and relate to the sensory abilities of the driver, i.e., the mirrors, the seat, the steering wheel and steering column and accelerator, clutch and brake pedals.

The first characteristic used is a measurement of the height of the occupant from the vehicle seat. This can be done by a sensor in the ceiling of the vehicle but this becomes difficult since, even for the same seat location, the head of the occupant will not be at the same angle with respect to the seat and therefore the angle to a ceiling mounted sensor is in general unknown at least as long as only one ceiling mounted sensor is used. This problem can be solved if two or three sensors are used as described in more detail below. An alternate implementation is to place the sensor in the seat. In the '320 patent mentioned above, a rear impact occupant protection apparatus is disclosed which uses sensors mounted within the headrest. This same system can also be used to measure the height of the occupant from the seat and thus, for no additional cost assuming the rear impact occupant protection system described in the '320 patent is provided, the first measure of the occupant's morphology can be achieved. For some applications, this may be sufficient since it is unlikely that two operators will use the vehicle who have the same height. For other implementations, one or more additional measurements are used. Naturally, a face, fingerprint or iris recognition system will have the least problem identifying a previous occupant.

Figure 8:
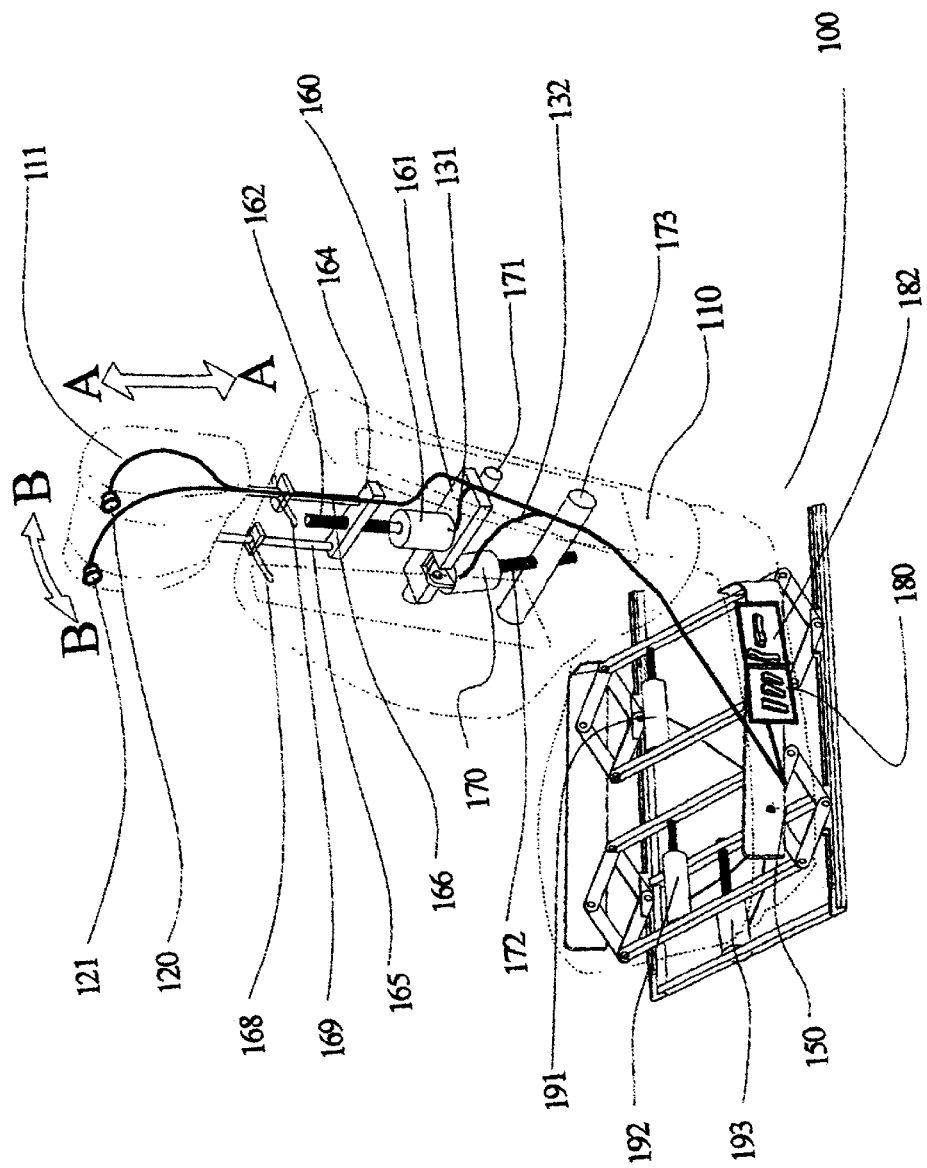
FIG. 8 is a perspective view of an automatic seat adjustment system, with the seat shown in phantom, with a movable headrest and sensors for measuring the height of the occupant from the vehicle seat showing motors for moving the seat and a control circuit connected to the sensors and motors.

Referring now to FIG. 8, an automatic adjustment system for adjusting a seat (which is being used only as an example of a vehicle component) is shown generally at 100 with a movable headrest 111 and ultrasonic sensor 120 and ultrasonic receiver 121 for measuring the height of the occupant of the seat. Power means such as motors 191, 192, and 193 connected to the seat for moving the base of the seat, control means such as a control circuit, system or module 150 connected to the motors and a headrest actuation mechanism using motors 160 and 170, which may be servomotors, are also illustrated. The seat 110 and headrest 111 are shown in phantom. Vertical motion of the headrest 111 is accomplished when a signal is sent from control module 150 to servomotor 160 through a wire 131. Servomotor 160 rotates lead screw 162 which engages with a threaded hole in member 164 causing it to move up or down depending on the direction of rotation of the lead screw 162. Headrest support rods 165 and 166 are attached to member 164 and cause the headrest 111 to translate up or down with member 164. In this manner, the vertical position of the headrest can be controlled as depicted by arrow A—A. Ultrasonic transmitter and receiver 120,121 may be replaced by other appropriate wave-generating and receiving devices, such as electromagnetic, active infrared transmitters and receivers.

Wire 132 leads from control module 150 to servomotor 170 which rotates lead screw 172. Lead screw 172 engages with a threaded hole in shaft 173 which is attached to supporting structures within the seat shown in phantom. The rotation of lead screw 172 rotates servomotor support 161, upon which servomotor 160 is situated, which in turn rotates headrest support rods 165 and 166 in slots 168 and the seat 110. Rotation of the servomotor support 161 is facilitated by a rod 171 upon which the servomotor support 161 is positioned. In this manner, the headrest 111 is caused to move in the fore and aft direction as depicted by arrow B—B. Naturally there are other designs which accomplish the same effect in moving the headrest up and down and fore and aft.

The operation of the system is as follows. When an adult or child occupant is seated on a seat containing the headrest and control system described above as determined by the neural network circuit 25, the ultrasonic transmitter 120 emits ultrasonic energy which reflects off of the head of the occupant and is received by receiver 121. An electronic circuit in control module 150 contains a microprocessor which determines the distance from the head of the occupant based on the time between the transmission and reception of an ultrasonic pulse. Control module 150 may be within the same microprocessor as neural network circuit 25 or separate therefrom. The headrest 111 moves up and down until it finds the top of the head and then the vertical position closest to the head of the occupant and then remains at that position. Based on the time delay between transmission and reception of an ultrasonic pulse, the system can also determine the longitudinal distance from the headrest to the occupant's head. Since the head may not be located precisely in line with the ultrasonic sensors, or the occupant may be wearing a hat, coat with a high collar, or may have a large hairdo, there may be some error in this longitudinal measurement.

When an occupant sits on seat 110, the headrest 111 moves to find the top of the occupant's head as discussed above. This is accomplished using an algorithm and a microprocessor which is part of control circuit 150. The headrest 111 then moves to the optimum location for rear impact protection as described in the above referenced '320 patent. Once the height of the occupant has been measured, another algorithm in the microprocessor in control circuit 150 compares the occupant's measured height with a table representing the population as a whole and from this table, the appropriate positions for the seat corresponding to the occupant's height is selected. For example, if the occupant measured 33 inches from the top of the seat bottom, this might correspond to a 85% human, depending on the particular seat and statistical tables of human measurements.

Careful study of each particular vehicle model provides the data for the table of the location of the seat to properly position the eyes of the occupant within the "eye-ellipse", the steering wheel within a comfortable reach of the occupant's hands and the pedals within a comfortable reach of the occupant's feet, based on his or her size, etc.

Once the proper position has been determined by control circuit 150, signals are sent to motors 191, 192, and 193 to move the seat to that position. If during some set time period after the seat has been positioned, the operator changes these adjustments, the new positions of the seat are stored in association with an occupant height class in a second table within control circuit 150. When the occupant again occupies the seat and his or her height has once again been determined, the control circuit will find an entry in the second table which takes precedence over the basic, original table and the seat returns to the adjusted position. When the occupant leaves the vehicle, or even when the engine is shut off and the door opened, the seat can be returned to a neutral position which provides for easy entry and exit from the vehicle.

Figure 17A:
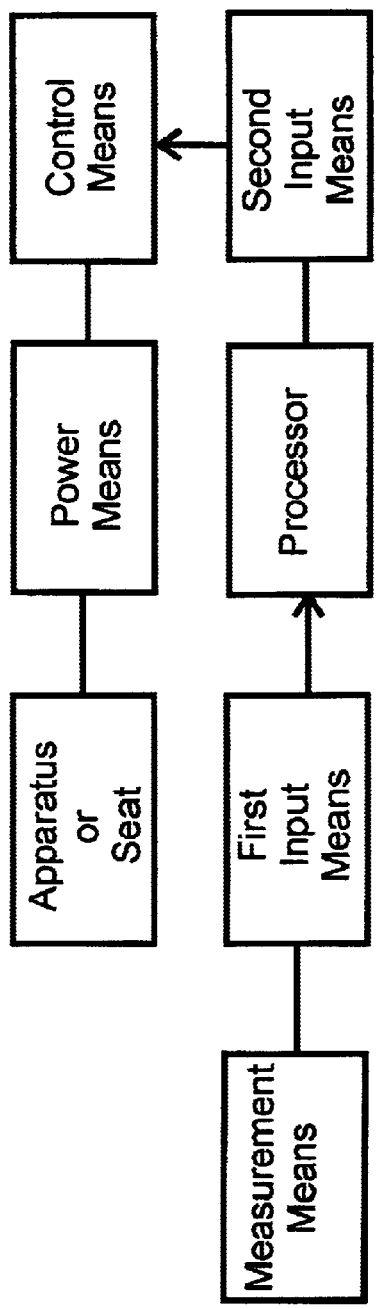
FIG. 17A is a schematic drawing of the basic embodiment of the adjustment system in accordance with the invention.
Figure 17B:
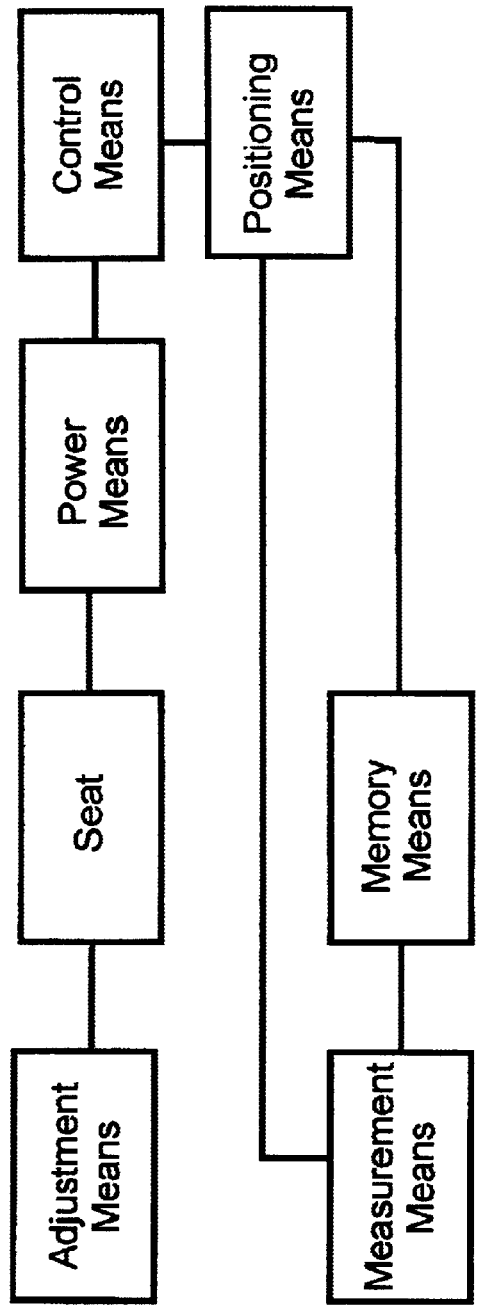
FIG. 17B is a schematic drawing of another basic embodiment of the adjustment system in accordance with the invention.

The seat 110 also contains two control switch assemblies 180 and 182 for manually controlling the position of the seat 110 and headrest 111. The seat control switches 180 permit the occupant to adjust the position of the seat if he or she is dissatisfied with the position selected by the algorithm. The headrest control switches 182 permit the occupant to adjust the position of the headrest in the event that the calculated position is uncomfortably close to or far from the occupant's head. A woman with a large hairdo might find that the headrest automatically adjusts so as to contact her hairdo. This adjustment she might find annoying and could then position the headrest further from her head. For those vehicles which have a seat memory system for associating the seat position with a particular occupant, which has been assumed above, the position of the headrest relative to the occupant's head could also be recorded. Later, when the occupant enters the vehicle, and the seat automatically adjusts to the recorded preference, the headrest will similarly automatically adjust (FIG. 17B).

Figure 9:
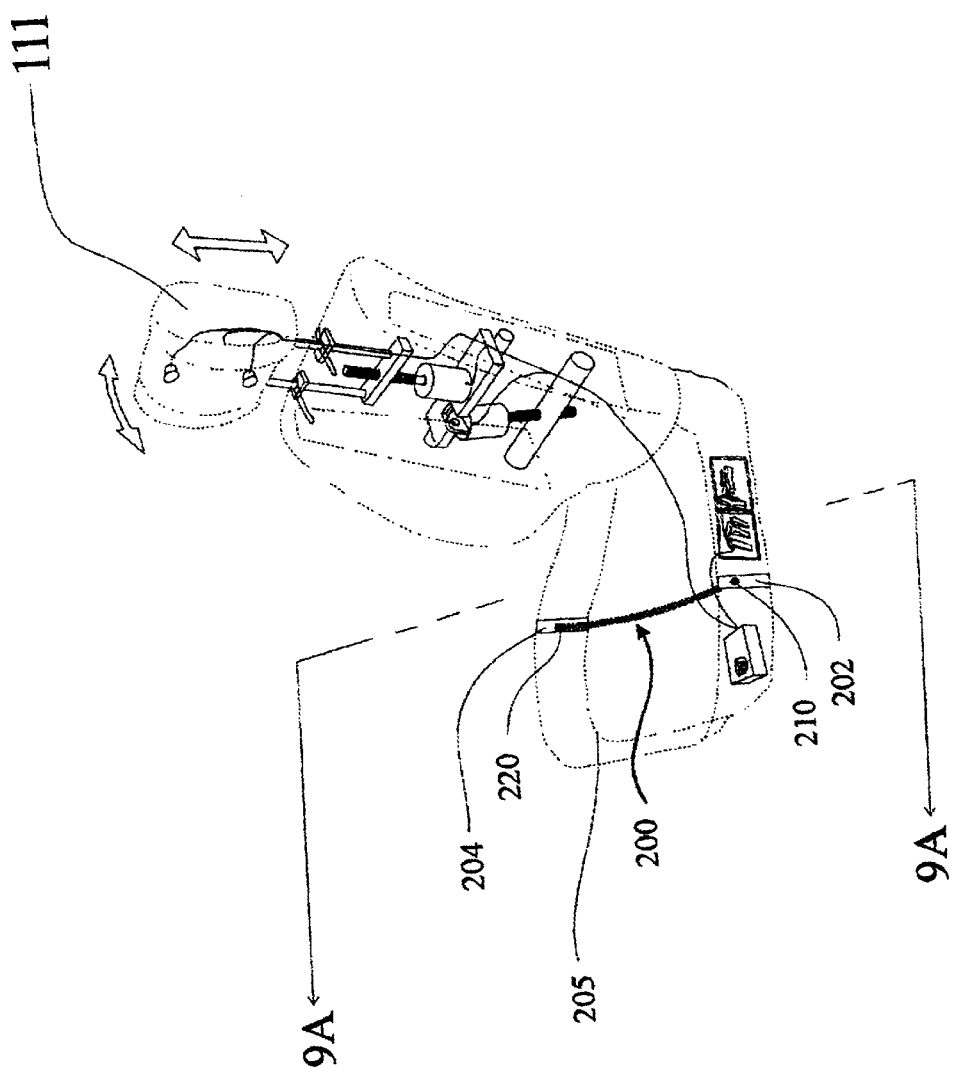
FIG. 9 is a perspective view of the seat shown in FIG. 8 with the addition of a weight sensor shown mounted onto the seat.

The height of the occupant, although probably the best initial morphological characteristic, may not be sufficient especially for distinguishing one driver from another when they are approximately the same height. A second characteristic, the occupant's weight, can also be readily determined from sensors mounted within the seat in a variety of ways as shown in FIG. 9 which is a perspective view of the seat shown in FIG. 8 with a displacement or weight sensor 200 shown mounted onto the seat. Displacement sensor 200 is supported from supports 202 and 204. In general, displacement sensor 200, or another non-displacement sensor, measures a physical state of a component affected by the occupancy of the seat. An occupying item of the seat will cause a force to be exerted downward and the magnitude of this force is representative of the weight of the occupying item. Thus, by measuring this force, information about the weight of the occupying item can be obtained. A physical state may be any force changed by the occupancy of the seat and which is reflected in the component, e.g., strain of a component, compression of a component, tension of a component.

Figure 9A:
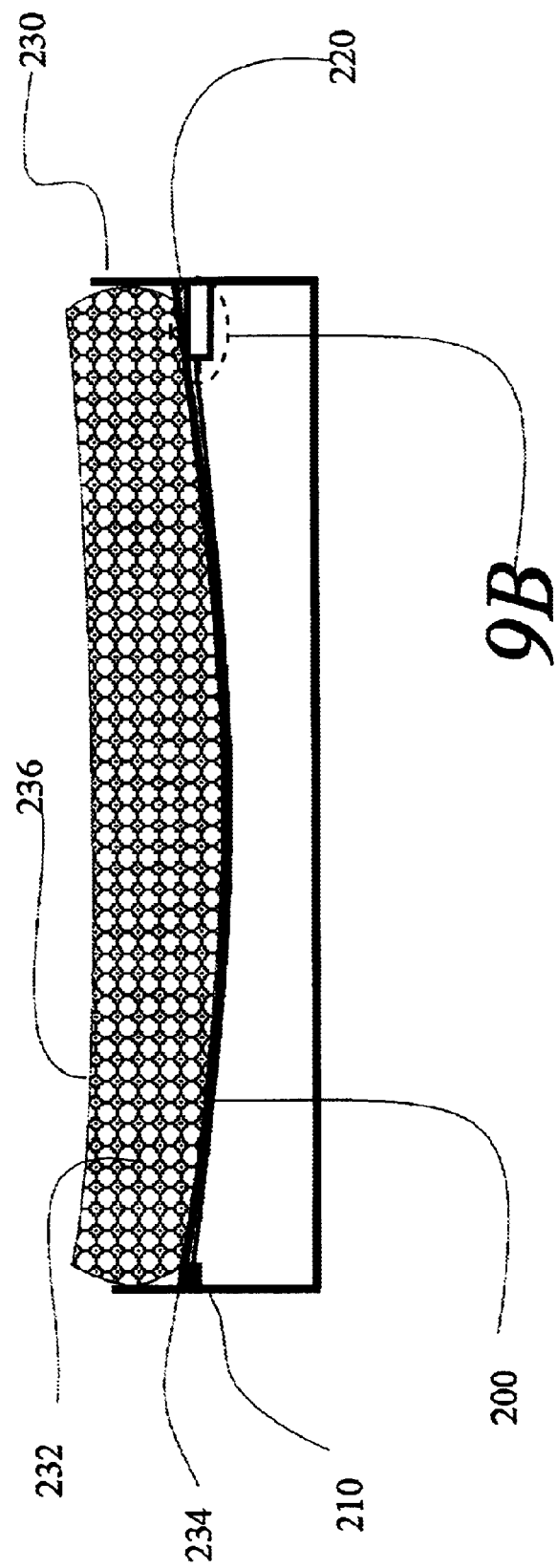
FIG. 9A is a view taken along line 9A—9A in FIG. 9.
Figure 9B:
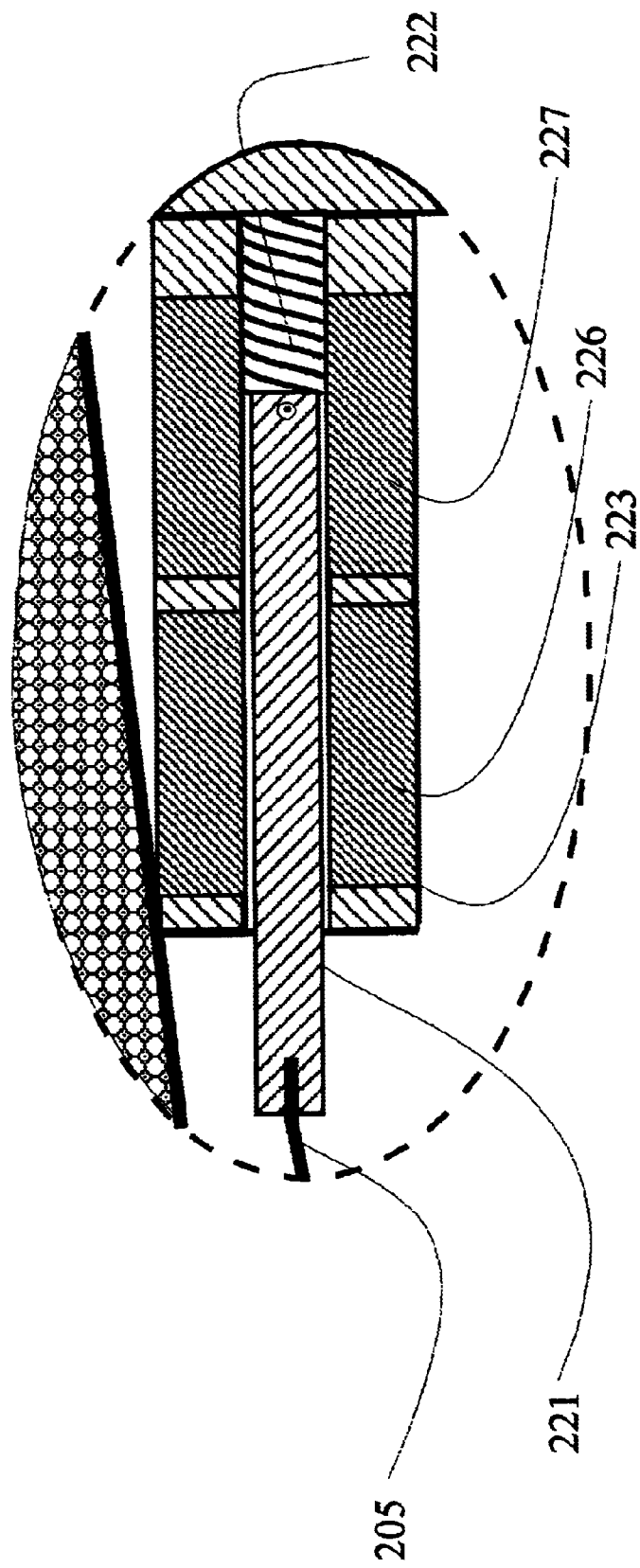
FIG. 9B is an enlarged view of the section designated 9B in FIG. 9A.
Figure 9C:
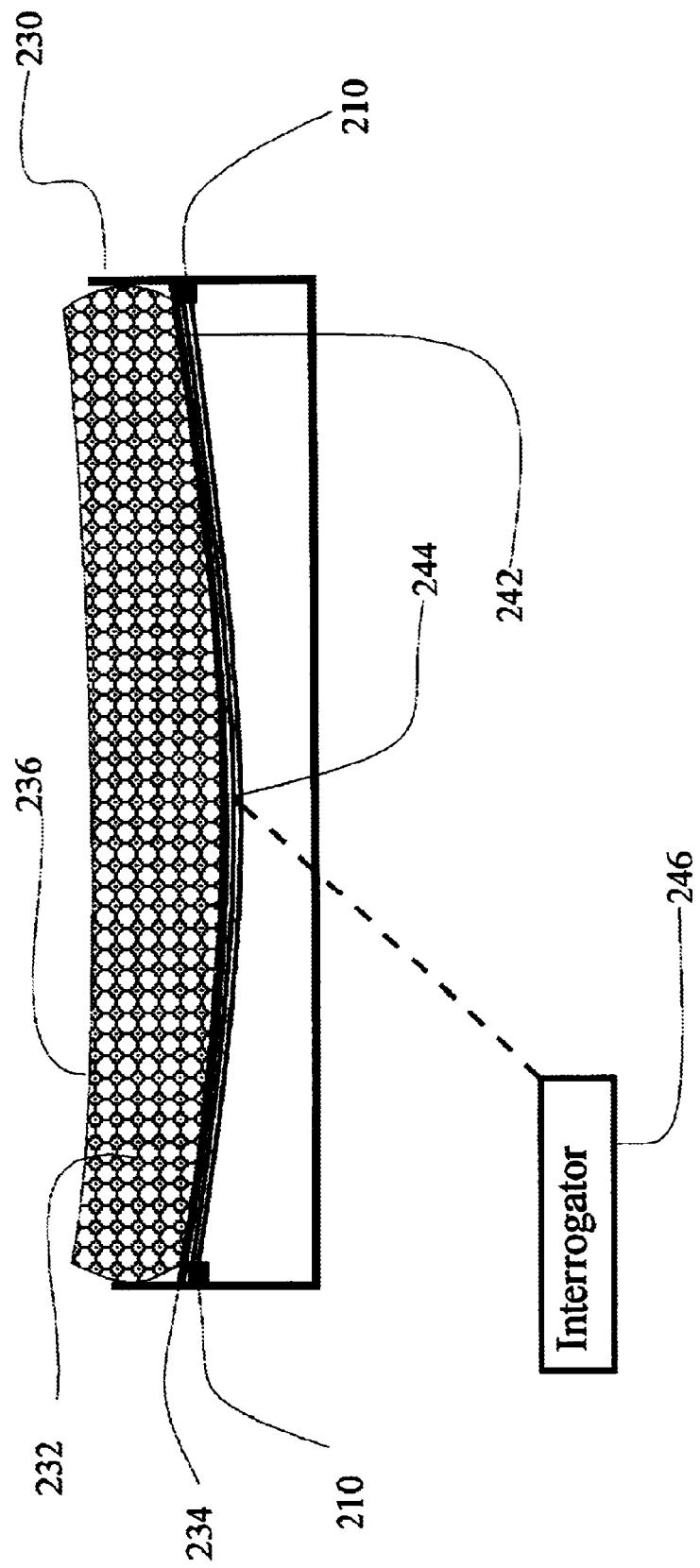
FIG. 9C is a view of another embodiment of a seat with a weight sensor similar to the view shown in FIG. 9A.

Referring now to FIG. 9A, which is a view of the apparatus of FIG. 9 taken along line 9A—9A, seat 230 is constructed from a cushion or foam layer 232 which is supported by a spring system 234 which is in contact and/or association with the displacement sensor 200. As shown, displacement sensor 200 is underneath the spring system 234 but this relative positioning is not a required feature of the invention. The displacement sensor 200 comprises an elongate cable 205 retained at one end by support 210 and a displacement sensor 220 situated at an opposite end. This displacement sensor 220 can be any of a variety of such devices including, but not limited to, a linear rheostat, a linear variable differential transformer (LVDT), a linear variable capacitor, or any other length measuring device. Alternately, as shown in FIG. 9C, the cable can be replaced with one or more springs 242 retained between supports 210 and the tension in the spring measured using a strain gage (conventional wire or foil or a SAW strain gage) or other force measuring device 244 or the strain in the seat support structure can be measured by appropriately placing strain gages on one or more of the seat supports as described in more detail below. The strain gage or other force measuring device could be arranged in association with the spring system 234 and could measure the deflection of the bottom surface of the cushion or foam layer 232.

When a SAW strain gage 244 is used as part of weight sensor 200, an interrogator 246 could be placed on the vehicle to enable wireless communication and/or power transfer to the SAW strain gage 244. As such, when it is desired to obtain the force being applied by the occupying item on the seat, the interrogator 246 sends a radio signal to the SAW strain gage causing it to transmit a return signal with the measured strain of the spring 242. Interrogator 246 is coupled to the processor used to determine the control of the vehicle component.

Figure 9D:
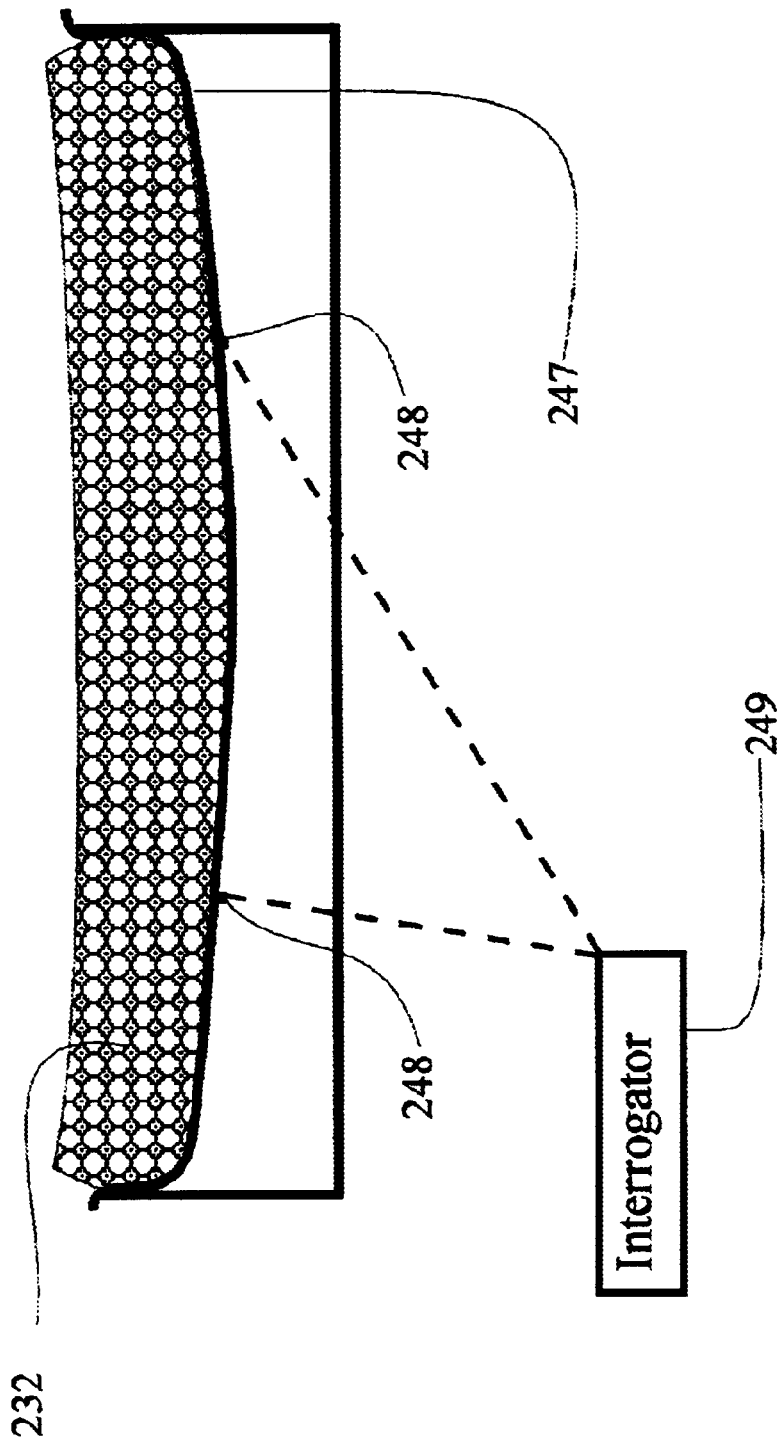
FIG. 9D is a view of another embodiment of a seat with a weight sensor in which a SAW strain gage is placed on the bottom surface of the cushion.

As shown in FIG. 9D, one or more SAW strain gages 248 could also be placed on the bottom surface of a seat support pan 247 for those vehicles using this construction in order to measure the deflection of the bottom surface of support pan 247 which is representative of the weight of the occupying item to the seat. An interrogator 249 could also be used in this embodiment.

One seat design is illustrated in FIG. 9. Similar weight measurement systems can be designed for other seat designs. Also, some products are available which can approximately measure weight based on pressure measurements made at or near the upper seat surface 236. It should be noted that the weight measured here will not be the entire weight of the occupant since some of the occupant's weight will be supported by his or her feet which are resting on the floor or pedals. As noted above, the weight may also be measured by the weight sensor(s) 6 and 7 described above in the seated-state detecting unit.

As weight is placed on the seat surface 236, it is supported by spring 234 which deflects downward causing cable 205 of the sensor 200 to begin to stretch axially. Using a LVDT as an example of length measuring device 220, the cable 205 pulls on rod 221 tending to remove rod 221 from cylinder 223 (FIG. 9B). The movement of rod 221 out of cylinder 223 is resisted by a spring 222 which returns the rod 221 into the cylinder 223 when the weight is removed from the seat surface 236. The amount which the rod 221 is removed from the cylinder 223 is measured by the amount of coupling between the windings 226 and 227 of the transformer as is well understood by those skilled in the art. LVDT's are commercially available devices. In this matter, the deflection of the seat can be measured which is a measurement of the weight on the seat. The exact relationship between weight and LVDT output is generally determined experimentally for this application. An alternative weight measuring apparatus will be discussed below.

SAW strain gages could also be used to determine the downward deflection of the spring 234 and the deflection of the cable 205.

By use of a combination of weight and height, the driver of the vehicle can in general be positively identified among the class of drivers who operate the vehicle. Thus, when a particular driver first uses the vehicle, the seat will be automatically adjusted to the proper position. If the driver changes that position within a prescribed time period, the new seat position will be stored in the second table for the particular driver's height and weight. When the driver reenters the vehicle and his or her height and weight are again measured, the seat will go to the location specified in the second table if one exists. Otherwise, the location specified in the first table will be used.

The system described above is based on the assumption that the occupant will be satisfied with one seat position throughout an extended driving trip. Studies have shown that for extended travel periods that the comfort of the driver can be improved through variations in the seat position. This variability can be handled in several ways. For example, the amount and type of variation preferred by an occupant of the particular morphology can be determined through case studies and focus groups. If it is found, for example, that the 50 percentile male driver prefers the seatback angle to vary by 5 degrees sinusodially with a one-hour period, this can be programmed to the system. Since the system knows the morphology of the driver, it can decide from a lookup table or algorithm (trained or not) what is the best variability for the average driver of that morphology. The driver then can select from several preferred possibilities if, for example, he or she wishes to have the seatback not move at all or follow an excursion of 10 degrees over two hours.

This system provides an identification of the driver based on two morphological characteristics which is adequate for most cases. As additional features of the vehicle interior identification and monitoring system described in the above referenced patent applications are implemented, it will be possible to obtain additional morphological measurements of the driver which will provide even greater accuracy in driver identification. Two characteristics may not be sufficient to rely on for theft and security purposes, however, many other driver preferences can still be added to seat position with this level of occupant recognition accuracy. These include the automatic selection of a preferred radio station, vehicle temperature, steering wheel and steering column position, etc.

One advantage of using only the height and weight is that it avoids the necessity of the seat manufacturer from having to interact with the headliner manufacturer, or other component suppliers, since all of the measuring transducers are in the seat. This two characteristic system is generally sufficient to distinguish drivers that normally drive a particular vehicle. This system costs little more than the memory systems now in use and is passive, i.e., it does not require action on the part of the occupant after his initial adjustment has been made.

Instead of measuring the height and weight of the occupant, it is also possible to measure a combination of any two morphological characteristics and during a training phase, derive a relationship between the occupancy of the seat, e.g., adult occupant, child occupant, etc., and the data of the two morphological characteristic. This relationship may be embodied within a neural network so that during use, by measuring the two morphological characteristics, the occupancy of the seat can be determined.

Figure 10:
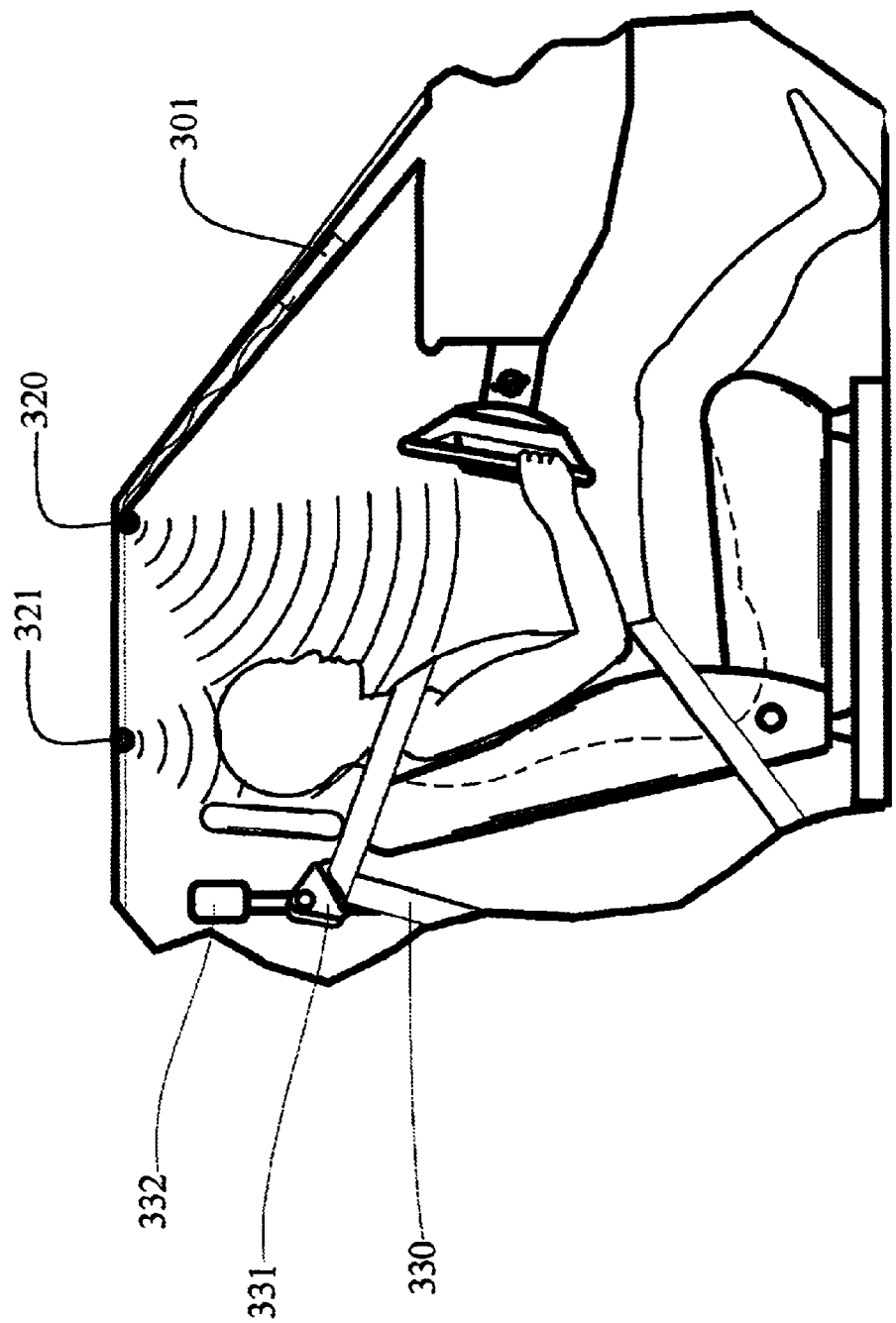
FIG. 10 is a side plan view of the interior of an automobile, with portions cut away and removed, with two occupant height measuring sensors, one mounted into the headliner above the occupant's head and the other mounted onto the A-pillar and also showing a seatbelt associated with the seat wherein the seatbelt has an adjustable upper anchorage point which is automatically adjusted based on the height of the occupant.

Naturally, there are other methods of measuring the height of the driver such as placing the transducers at other locations in the vehicle. Some alternatives are shown in FIG. 10 which is a side plan view wherein two height measuring sensors 320, 321 are shown, sensor 321 being mounted into the headliner above the occupant's head and the other sensor 320 being mounted onto the A-pillar. A sensor as used herein is the combination of two transducers (a transmitter and a receiver) or one transducer which can both transmit and receive. The headliner is the trim which provides the interior surface to the roof of the vehicle and the A-pillar is the roof-supporting member which is on either side of the windshield and on which the front doors are hinged. These transducers may already be present because of other implementations of the vehicle interior identification and monitoring system described in the above referenced patent applications. In this case, the use of both transducers provides a more accurate determination of location of the head of the driver. Using transducer 321 alone, the exact position of the head is ambiguous since the transducer measures the distance to the head regardless of what direction the head is. By knowing the distance from the head to transducer 320, the ambiguity is substantially reduced. This argument is of course dependent on the use of ultrasonic transducers. Optical transducers using CCD or CMOS arrays are now becoming price competitive and, as pointed out in the above referenced patent applications, will be the technology of choice for interior vehicle monitoring. A single CCD array of 160 by 160 pixels, for example, coupled with the appropriate pattern recognition software, can be used to form an image of the head of an occupant and accurately locate the head for the purposes of this invention. It can also be used with a face recognition algorithm to positively identify the occupant.

FIG. 10 also illustrates a system where the seatbelt 330 has an adjustable upper anchorage point 331 which is automatically adjusted by a motor 332 to a location optimized based on the height of the occupant. The calculations for this feature and the appropriate control circuitry can also be located in control module 301 or elsewhere if appropriate.

Figure 11:
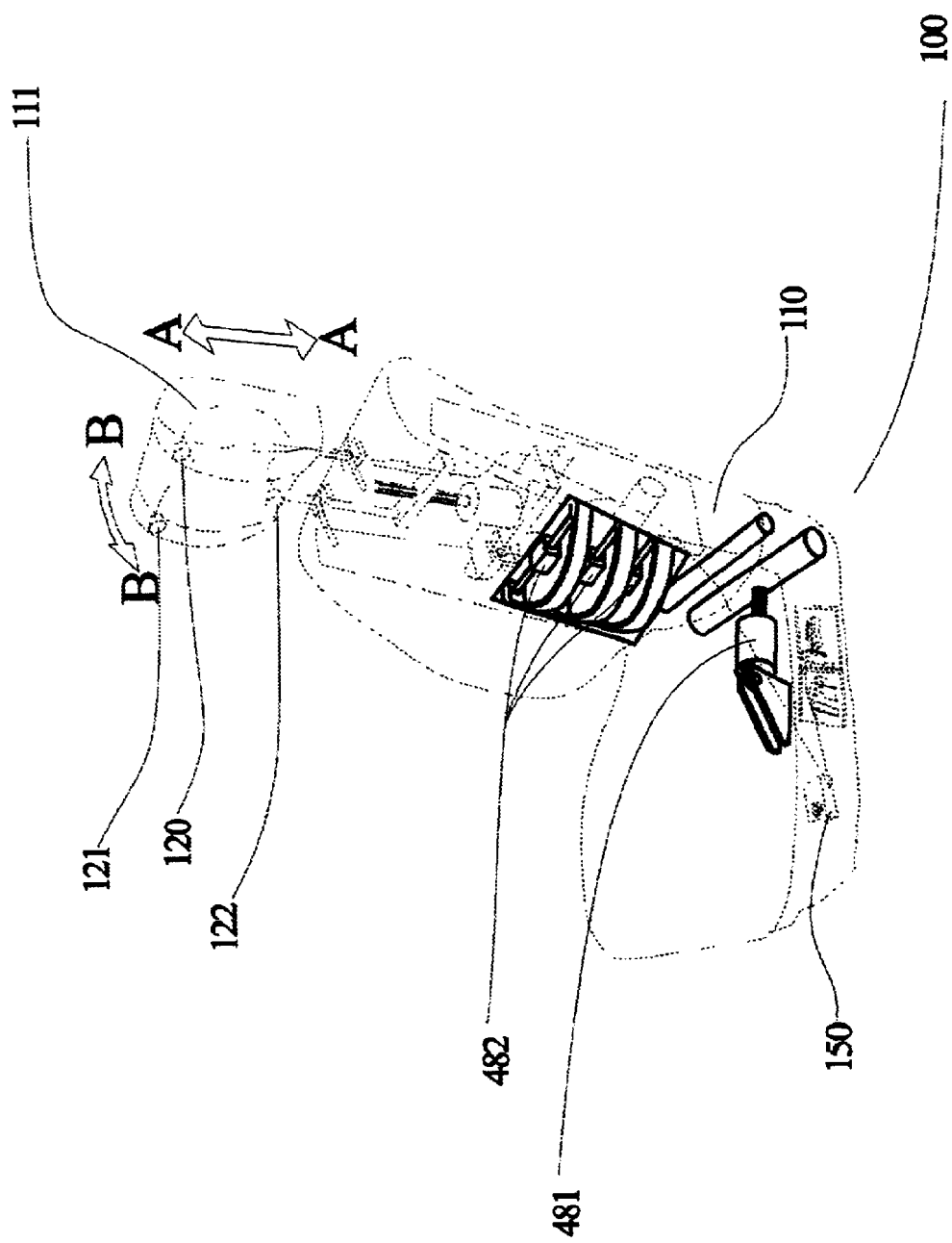
FIG. 11 is a view of the seat of FIG. 8 showing motors for changing the tilt of seat back and the lumbar support.

Many luxury automobiles today have the ability to control the angle of the seat back as well as a lumbar support. These additional motions of the seat can also be controlled by the seat adjustment system in accordance with the invention. FIG. 11 is a view of the seat of FIG. 8 showing motors 481 and 482 for changing the tilt of the seat back and the lumbar support. Three motors 482 are used to adjust the lumbar support in this implementation. The same procedure is used for these additional motions as described for FIG. 8 above.

An initial table is provided based on the optimum positions for various segments of the population. For example, for some applications the table may contain a setting value for each five percentile of the population for each of the 6 possible seat motions, fore and aft, up and down, total seat tilt, seat back angle, lumbar position, and headrest position for a total of 120 table entries. The second table similarly would contain the personal preference modified values of the 6 positions desired by a particular driver.

In FIG. 8, the ultrasonic transducers 120 and 121 were described as one being a transmitter and the other being a receiver. For some applications, it is desirable to use both transducers as both transducers and receivers. Similarly, a third combination transmitter and receiver 122 may also be utilized as shown in FIG. 11. This arrangement permits many of the advantages of a phased array system to be achieved.

The angular resolution of a transducer is proportional to the ratio of the wavelength to the diameter of the transmitter. Once three transmitters and receivers are used, the approximate equivalent single transmitter and receiver is one which has a diameter approximately equal to the shortest distance between any pair of transducers. In this case, the equivalent diameter is equal to the distance between transmitter 120 or 121 and 122. This provides far greater resolution and, by controlling the phase between signals sent by the transmitters, the direction of the equivalent ultrasonic beam can be controlled. Thus, the head of the driver can be scanned with great accuracy and a map made of the occupant's head. Using this technology plus an appropriate pattern recognition algorithm, such as a neural network, an accurate location of the driver's head can be found even when the driver's head is partially obscured by a hat, coat, or hairdo. This also provides at least one other identification morphological characteristic which can be used to further identify the occupant, namely the diameter of the driver's head.

With knowledge of the weight of an occupant, additional improvements can be made to automobile and truck seat designs. In particular, the stiffness of the seat can be adjusted so as to provide the same level of comfort for light and for heavy occupants. The damping of occupant motions, which heretofore has been largely neglected, can also be readily adjusted as shown on FIG. 12 which is a view of the seat of FIG. 8 showing one of several possible arrangements for changing the stiffness and the damping of the seat. In the seat bottom 520, there is a container 515, the conventional foam and spring design has been replaced by an inflated rectangular container very much like an air mattress which contains a cylindrical inner container 518 which is filled with an open cell urethane foam. An adjustable orifice 525 connects the two container 515,518 so that air can flow in a controlled manner therebetween. The amount of opening of orifice 525 is controlled by control circuit 150. A small air compressor 555 controls the pressure in container 515 under control of the control circuit 150. A pressure transducer 560 monitors the pressure within container 515 and inputs this information into control circuit 150.

The operation of the system is as follows. When an occupant sits on the seat, pressure initially builds up in the seat container 515 which gives an accurate measurement of the weight of the occupant. Control circuit 150, using an algorithm and a microprocessor, then determines an appropriate stiffness for the seat and adds pressure to achieve that stiffness. The pressure equalizes between the two containers 515 and 518 through the flow of air through orifice 525. Control circuit 150 also determines an appropriate damping for the occupant and adjusts the orifice 525 to achieve that damping. As the vehicle travels down the road and the road roughness causes the seat to move up and down, the inertial force on the seat by the occupant causes the air pressure to rise and fall in container 518 and also, but, much less so, in container 515 since the occupant sits mainly above container 518 and container 515 is much larger than container 518. The major deflection in the seat takes place first in container 518 which pressurizes and transfers air to container 515 through orifice 525. The size of the orifice opening determines the flow rate between the two containers and therefore the damping of the motion of the occupant. Since this opening is controlled by control circuit 150, the amount of damping can thereby also be controlled. Thus, in this simple structure, both the stiffness and damping can be controlled to optimize the seat for a particular driver. Naturally, if the driver does not like the settings made by control circuit 150, he or she can change them to provide a stiffer or softer ride.

The stiffness of a seat is the change in force divided by the change in deflection. This is important for many reasons, one of which is that it controls the natural vibration frequency of the seat occupant combination. It is important that this be different from the frequency of vibrations which are transmitted to the seat from the vehicle in order to minimize the up and down motions of the occupant. The damping is a force which opposes the motion of the occupant and which is dependent on the velocity of relative motion between the occupant and the seat bottom. It thus removes energy and minimizes the oscillatory motion of the occupant. These factors are especially important in trucks where the vibratory motions of the driver's seat, and thus the driver, have caused many serious back injuries among truck drivers.

Figure 12:
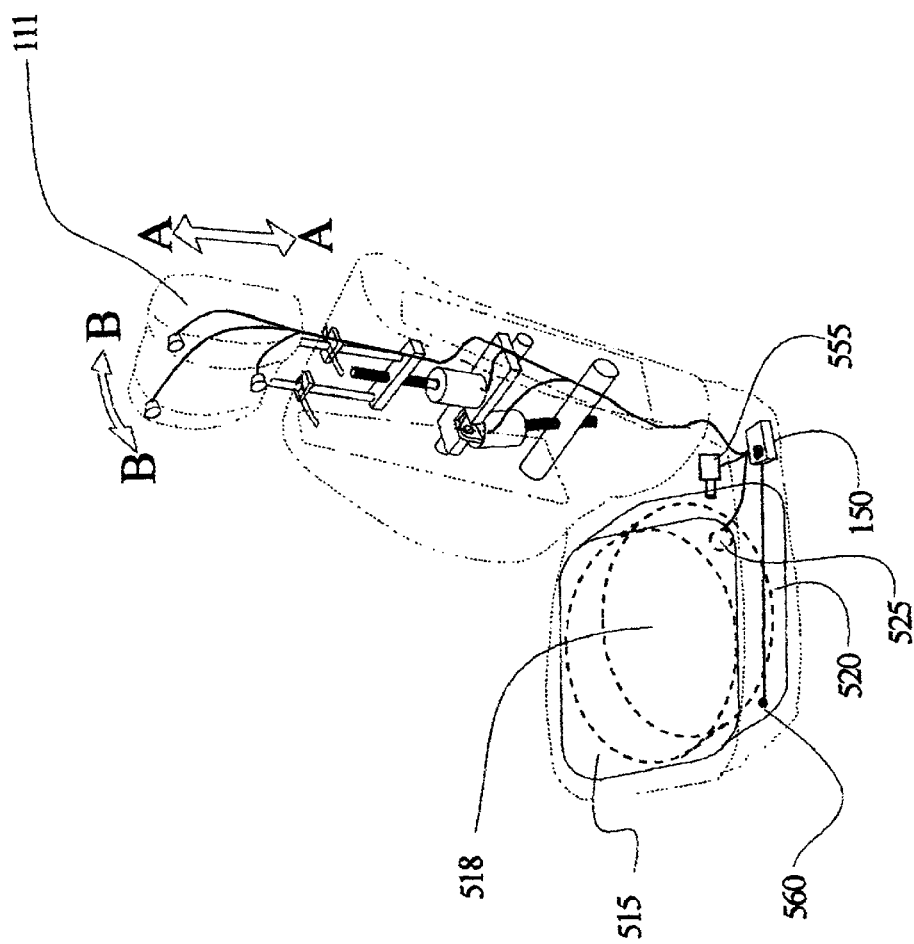
FIG. 12 is a view of the seat of FIG. 8 showing a system for changing the stiffness and the damping of the seat.
Figure 12A:
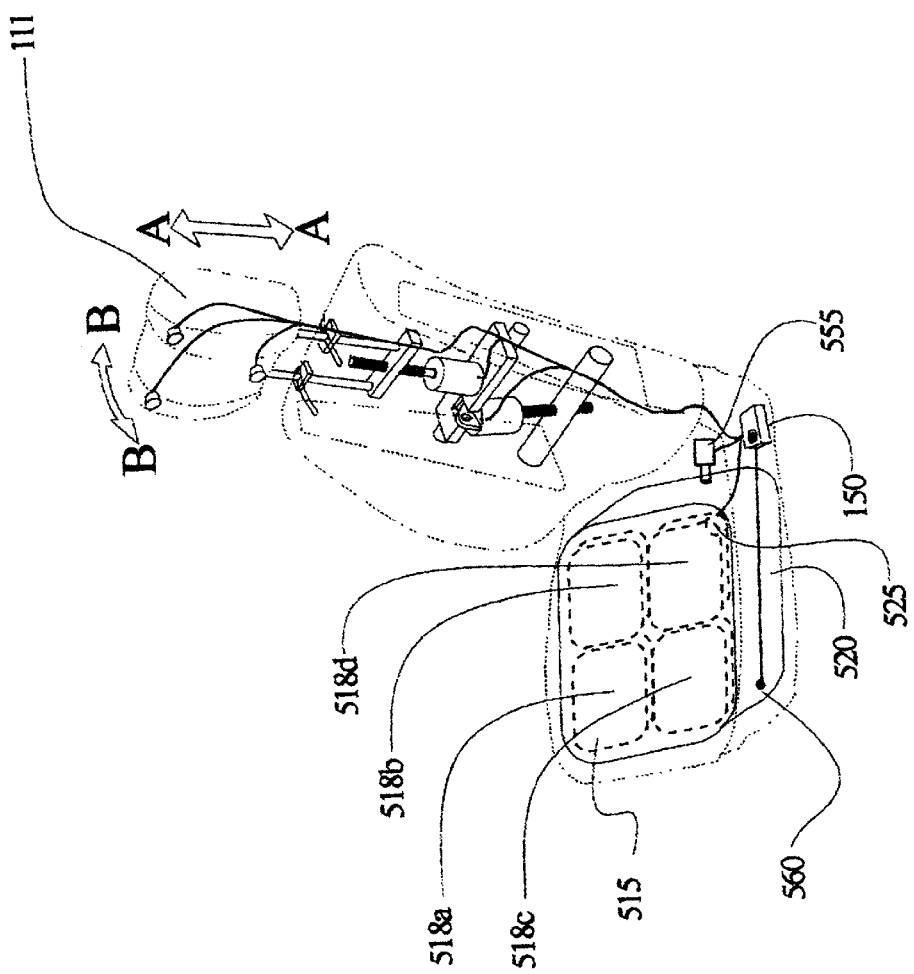
FIG. 12A is a view of the seat of FIG. 8 wherein the bladder contains a plurality of chambers.

In FIG. 12, the airbag or bladder 515 which interacts with the occupant is shown with a single chamber. Naturally, bladder 515 can be composed of multiple chambers 515a, 515b, 515c, and 515d as shown in FIG. 12A. The use of multiple chambers permits the weight distribution of the occupant to be determined if a separate pressure transducer is used in each cell of the bladder. Such a scheme gives the opportunity of determining to some extent the position of the occupant on the seat or at least the position of the center of gravity of the occupant. Naturally, more than four cells could be used.

In the description above, the air was use as the fluid to fill the bladder 515. In some cases, especially where damping and natural frequency control is not needed, another fluid such as a liquid or jell could be used to fill the bladder.

Figure 13:
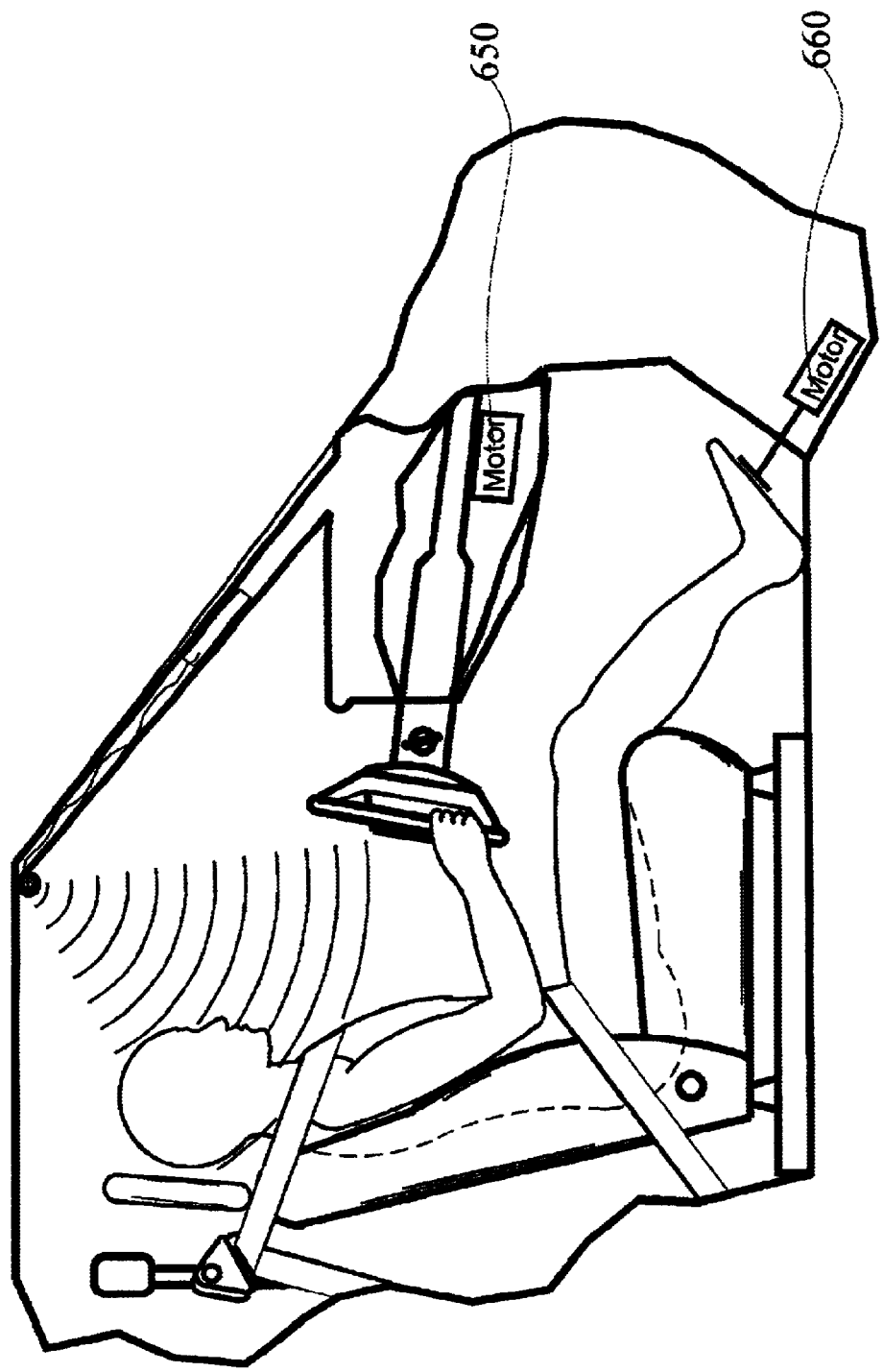
FIG. 13 is a view as in FIG. 10 showing a driver and driver seat with an automatically adjustable steering column and pedal system which is adjusted based on the morphology of the driver.

In an automobile, there is an approximately fixed vertical distance between the optimum location of the occupant's eyes and the location of the pedals. The distant from a driver's eyes to his or her feet, on the other hand, is not the same for all people. An individual driver now compensates for this discrepancy by moving the seat and by changing the angle between his or hers legs and body. For both small and large drivers, this discrepancy cannot be fully compensated for and as a result, their eyes are not appropriately placed. A similar problem exists with the steering wheel. To help correct these problems, the pedals and steering column should be movable as illustrated in FIG. 13 which is a plan view similar to that of FIG. 10 showing a driver and driver seat with an automatically adjustable steering column and pedal system which is adjusted based on the morphology of the driver. In FIG. 13, a motor 650 is connected to and controls the position of the steering column and another motor 660 is connected to and controls the position of the pedals. Both motors 650,660 are coupled to and controlled by control circuit 150 wherein now the basic table of settings includes values for both the pedals and steering column locations.

Figure 14:
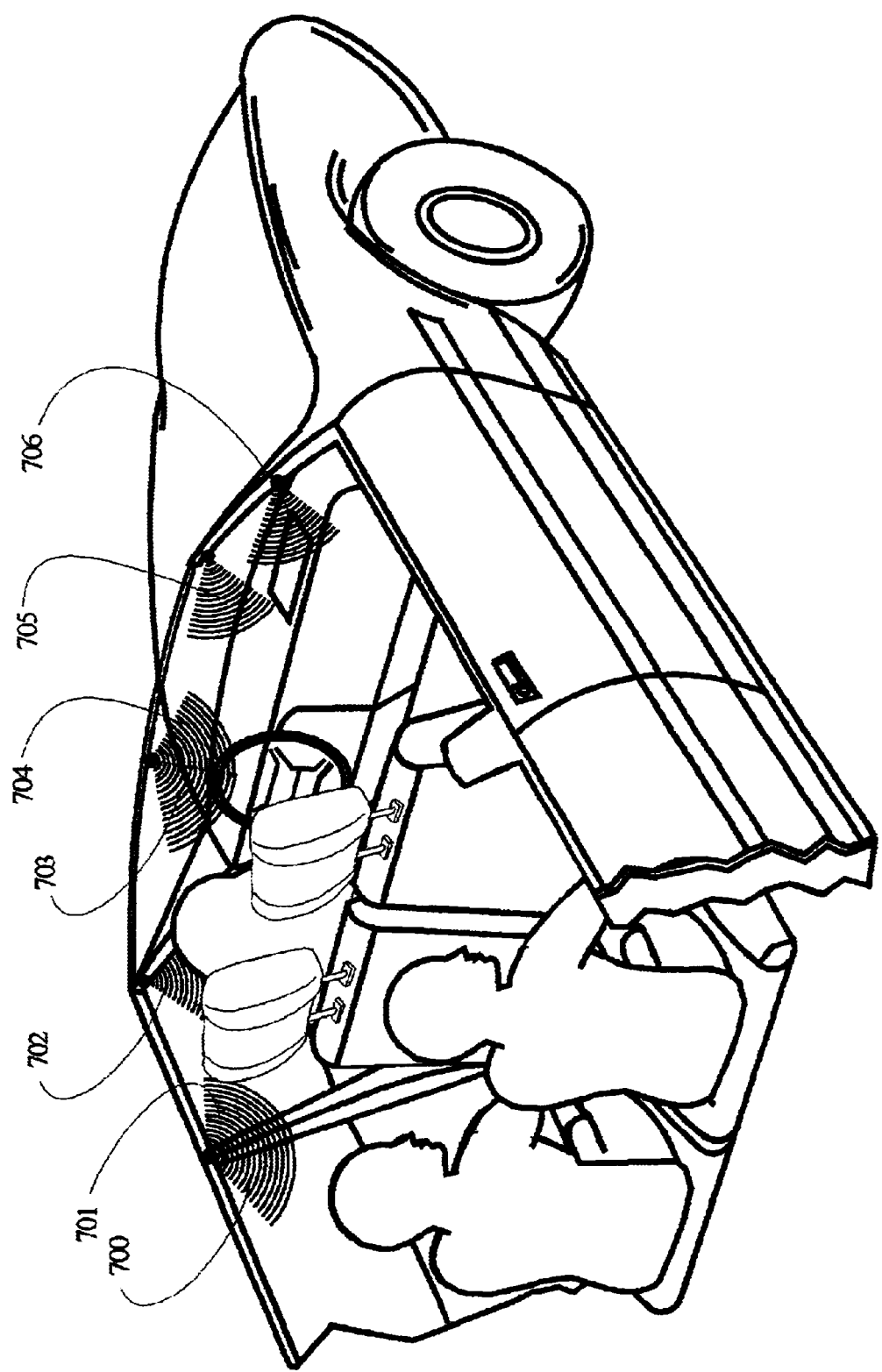
FIG. 14 is a perspective view of the interior of the passenger compartment of an automobile, with parts cut away and removed, showing a variety of transmitters that can be used in a phased array system.

As various parts of the vehicle interior identification and monitoring system described in the above reference patent applications are implemented, a variety of transmitting and receiving transducers will be present in the vehicle passenger compartment. If several of these transducers are ultrasonic transmitters and receivers, they can be operated in a phased array manner, as described above for the headrest, to permit precise distance measurements and mapping of the components of the passenger compartment. This is illustrated in FIG. 14 which is a perspective view of the interior of the passenger compartment showing a variety of transmitters and receivers, 700–706 which can be used in a phased array system. In addition, information can be transmitted between the transducers using coded signals in a ultrasonic network through the vehicle compartment airspace. If one of these sensors is an optical CCD or CMOS array, the location of the driver's eyes can be accurately determined and the results sent to the seat ultrasonically. Obviously, many other possibilities exist.

Figure 15:
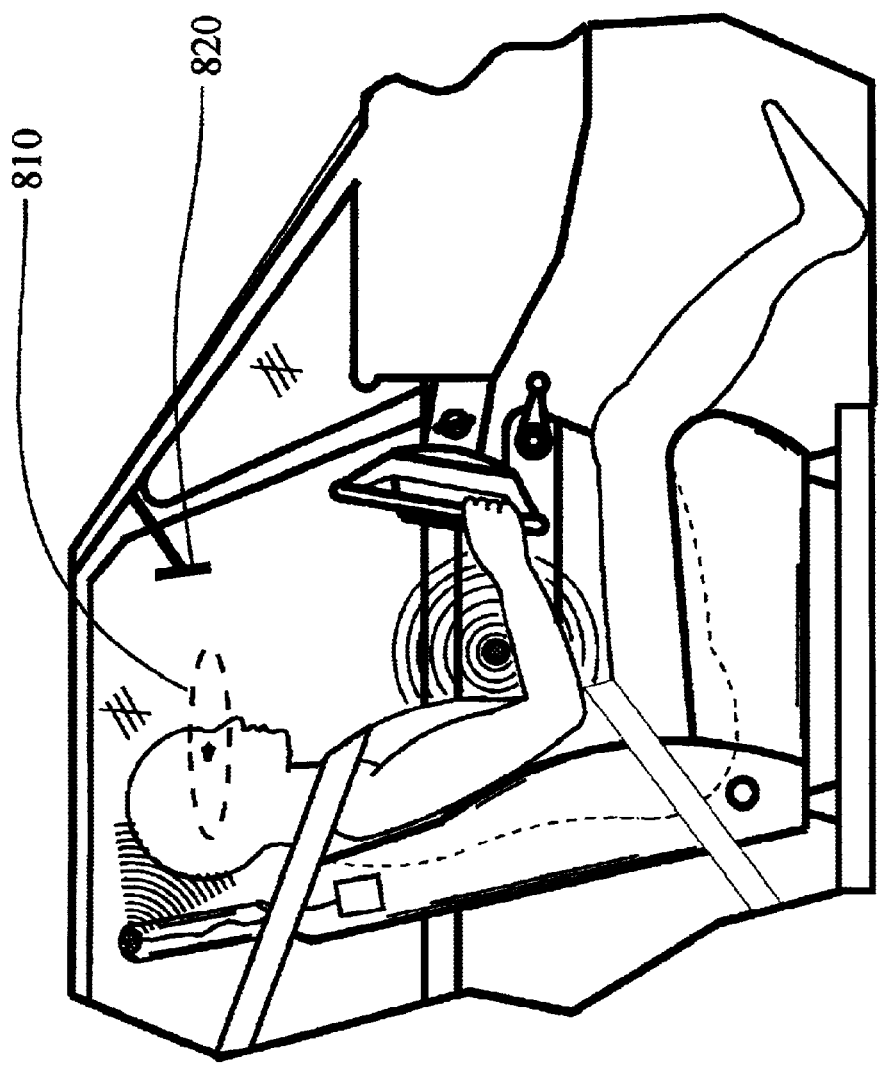
FIG. 15 is a view similar to FIG. 8 showing the occupant's eyes and the seat adjusted to place the eyes at a particular vertical position for proper viewing through the windshield and rear view mirror.

The eye ellipse discussed above is illustrated at 810 in FIG. 15, which is a view similar to FIG. 1, showing the occupant's eyes and the seat adjusted to place the eyes at a particular vertical position for proper viewing through the windshield and rear view mirror. Many systems are now under development to improve vehicle safety and driving ease. For example, right vision systems are being tested which project an enhanced image of the road ahead of the vehicle onto the windshield in a "heads-up display". The main problem with the systems now being tested is that the projected image does not precisely overlap the image as seen through the windshield. This parallax causes confusion in the driver and can only be corrected if the location of the driver's eyes is accurately known. One method of solving this problem is to use the passive seat adjustment system described herein to place the occupant's eyes at the optimum location as described above. Once this has been accomplished, in addition to solving the parallax problem, the eyes are properly located with respect to the rear view mirror 820 and little if any adjustment is required in order for the driver to have the proper view of what is behind the vehicle.

Several systems are in development for determining the location of an occupant and modifying the deployment of the airbag based of his or her position. These systems are called "smart airbags". The passive seat control system in accordance with this invention can also be used for this purpose as illustrated in FIG. 16. This figure is a view similar to FIG. 8 showing an inflated airbag 900 and an arrangement for controlling both the flow of gas into and out of the airbag during a crash. The determination is made based on height sensors 120, 121 and 122 located in the headrest, a weight sensor 200 in the seat and the location of the seat which is known by control circuit 150 (See, FIGS. 8, 9 and 9A). Other smart airbags systems rely only on the position of the occupant determined from various position sensors using ultrasonics or optical sensors.

The weight sensor coupled with the height sensor and the occupant's velocity relative to the vehicle, as determined by the occupant position sensors, provides information as to the amount of energy which the airbag will need to absorb during the impact of the occupant with the airbag. This, along with the location of the occupant relative to the airbag, is then used to determine the amount of gas which is to be injected into the airbag during deployment and the size of the exit orifices which control the rate of energy dissipation as the occupant is interacting with the airbag during the crash. For example, if an occupant is particularly heavy then it is desirable to increase the amount of gas, and thus the initial pressure, in the airbag to accommodate the larger force which will be required to arrest the relative motion of the occupant. Also, the size of the exit orifices should be reduced, since there will be a larger pressure tending to force the gas out of the orifices, in order to prevent the bag from bottoming out before the occupant's relative velocity is arrested. Similarly, for a small occupant the initial pressure would be reduced and the size of the exit orifices increased. If, on the other hand, the occupant is already close to the airbag then the amount of gas injected into the airbag needs to be reduced.

There are many ways of varying the amount of gas injected into the airbag some of which are covered in the patent literature and include, for example, inflators where the amount of gas generated and the rate of generation is controllable. For example, in a particular hybrid inflator manufactured by the Allied Signal Corporation (now Breed Technologies), two pyrotechnic charges are available to heat the stored gas in the inflator. Either or both of the pyrotechnic charges can be ignited and the timing between the ignitions can be controlled to significantly vary the rate of gas flow to the airbag.

The flow of gas out of the airbag is traditionally done through fixed diameter orifices placed in the bag fabric. Some attempts have been made to provide a measure of control through such measures as blowout patches applied to the exterior of the airbag. Other systems were disclosed in U.S. patent application Ser. No. 07/541,464 filed Feb. 9, 1989, now abandoned. FIG. 16A illustrates schematically an inflator 910 generating gas to fill airbag 900 through control valve 920. The flow of gas out of airbag 900 is controlled by exit control valve 930. The valve 930 can be implemented in many different ways including, for example, a motor operated valve located adjacent the inflator and in fluid communication with the airbag or a digital flow control valve as discussed above. When control circuit 150 determines the size and weight of the occupant, the seat position and the relative velocity of the occupant, it then determines the appropriate opening for the exit valve 930, which is coupled to the control circuit 150. A signal is then sent from control circuit 150 to the motor controlling this valve which provides the proper opening.

In a like manner, other parameters can also be adjusted, such as the direction of the airbag, by properly positioning the angle and location of the steering wheel relative to the driver. If seatbelt pretensioners are used, the amount of tension in the seatbelt or the force at which the seatbelt spools out, for the case of force limiters, could also be adjusted based on the occupant morphological characteristics determined by the system of this invention.

Once the morphology of the driver and the seat position is known, many other objects in the vehicle can be automatically adjusted to conform to the occupant. An automatically adjustable seat armrest, a cup holder, the cellular phone, directional microphone, visor or any other objects with which the driver interacts can be now moved to accommodate the driver. This is in addition to the personal preference items such as the radio station, temperature, etc. discussed above.

Once the system of this invention is implemented, additional features become possible such as a seat which automatically makes slight adjustments to help alleviate fatigue or to account for a change of position of the driver in the seat, or a seat which automatically changes position slightly based on the time of day. Many people prefer to sit more upright when driving at night, for example. Other similar improvements based on knowledge of the occupant morphology will now become obvious to those skilled in the art.

In the above-described component adjustment systems and methods, one of the characteristics of the occupying item that may be measured is the weight. Several non-limiting examples of weight measuring apparatus will now be described which may be used in the above-described systems and methods.

Figure 18:
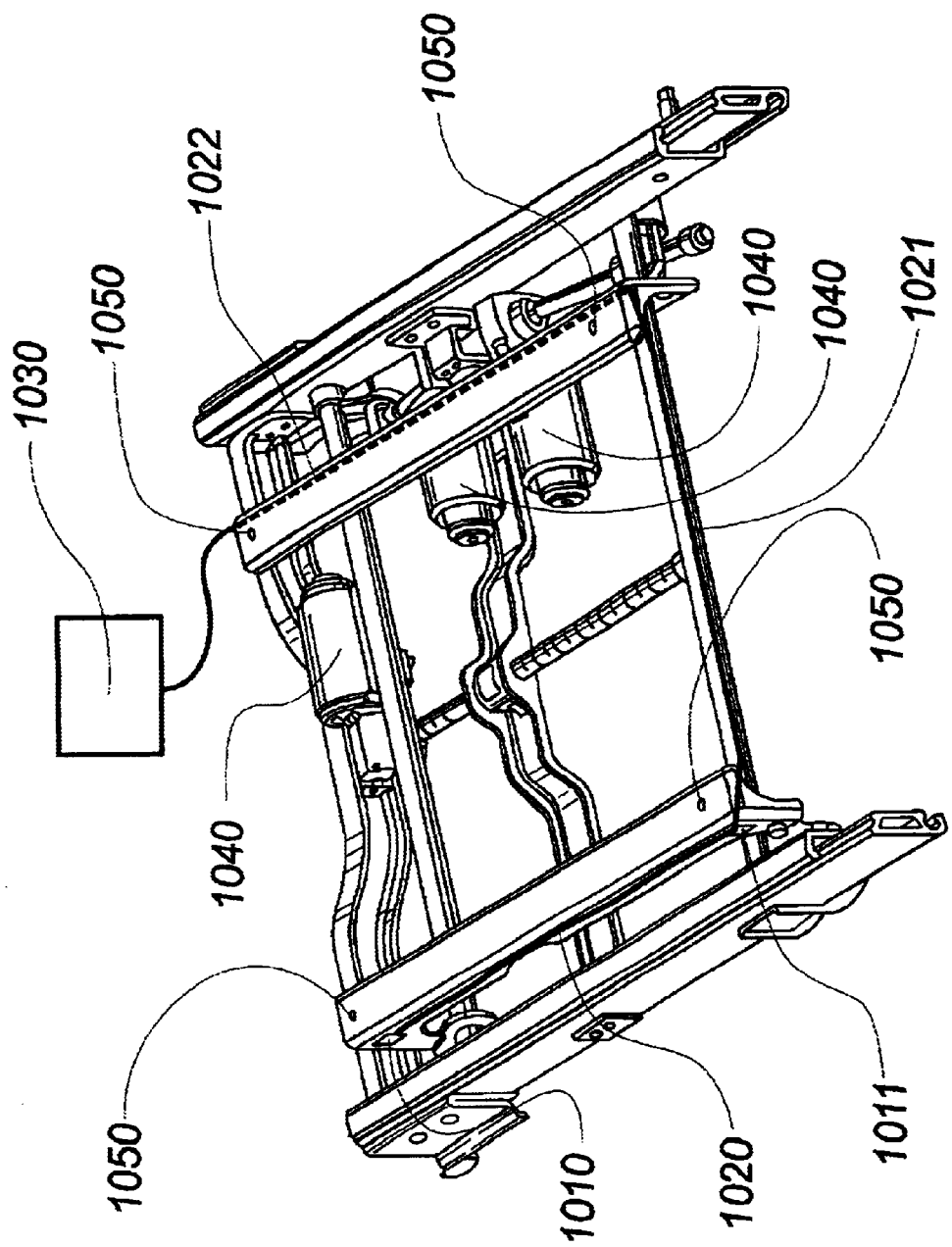
FIG. 18 is a perspective view of a one embodiment of an apparatus for measuring the weight of an occupying item of a seat illustrating weight sensing transducers mounted on a seat control mechanism portion which is attached directly to the seat.

In a first embodiment of a weight measuring apparatus shown in FIG. 18, four strain gage weight sensors or transducers are used, two being illustrated at 1010 and 1011 on one side of a bracket of the support structure of the seat and the other two being at the same locations on another bracket of the support (i.e., hidden on the corresponding locations on the other side of the support). The support structure of the seat supports the seat on a substrate such as a floor pan of the vehicle. Each of the strain gage transducers 1010,1011 also contains electronic signal conditioning apparatus, e.g., amplifiers, analog to digital converters, filters etc., which is associated such that output from the transducers is a digital signal. This electronic signal travels from transducer 1010 to transducer 1011 through a wire 1020. Similarly, wire 1021 transmits the output from transducers 1010 and 1011 to the next transducer in the sequence (one of the hidden transducers). Additionally, wire 1022 carries the output from these three transducers toward the fourth transducer (the other hidden transducer) and wire 1023 finally carries all four digital signals to an electronic control system or module 1030. These signals from the transducers 1010,1011 are time or frequency division multiplexed as is well known in the art. The seat position is controlled by motors 1040 as described in detail in U.S. Pat. No. 5,179,576, which is incorporated herein by reference. Finally, the seat is bolted onto the support structure through bolts not shown which attach the seat through holes 1050 in the brackets.

By placing the signal conditioning electronics, analog to digital converters, and other appropriate electronic circuitry adjacent the strain gage element, the four transducers can be daisy chained or otherwise attach together and only a single wire is required to connect all of the transducers to the control module 1030 as well as provide the power to run the transducers and their associated electronics.

The control system 1030, e.g., a microprocessor, is arranged to receive the digital signals from the transducers 1010,1011 and determine the weight of the occupying item of the seat based thereon. In other words, the signals from the transducers 1010,1011 are processed by the control system 1030 to provide an indication of the weight of the occupying item of the seat, i.e., the force exerted by the occupying item on the seat support structure.

Figure 19:
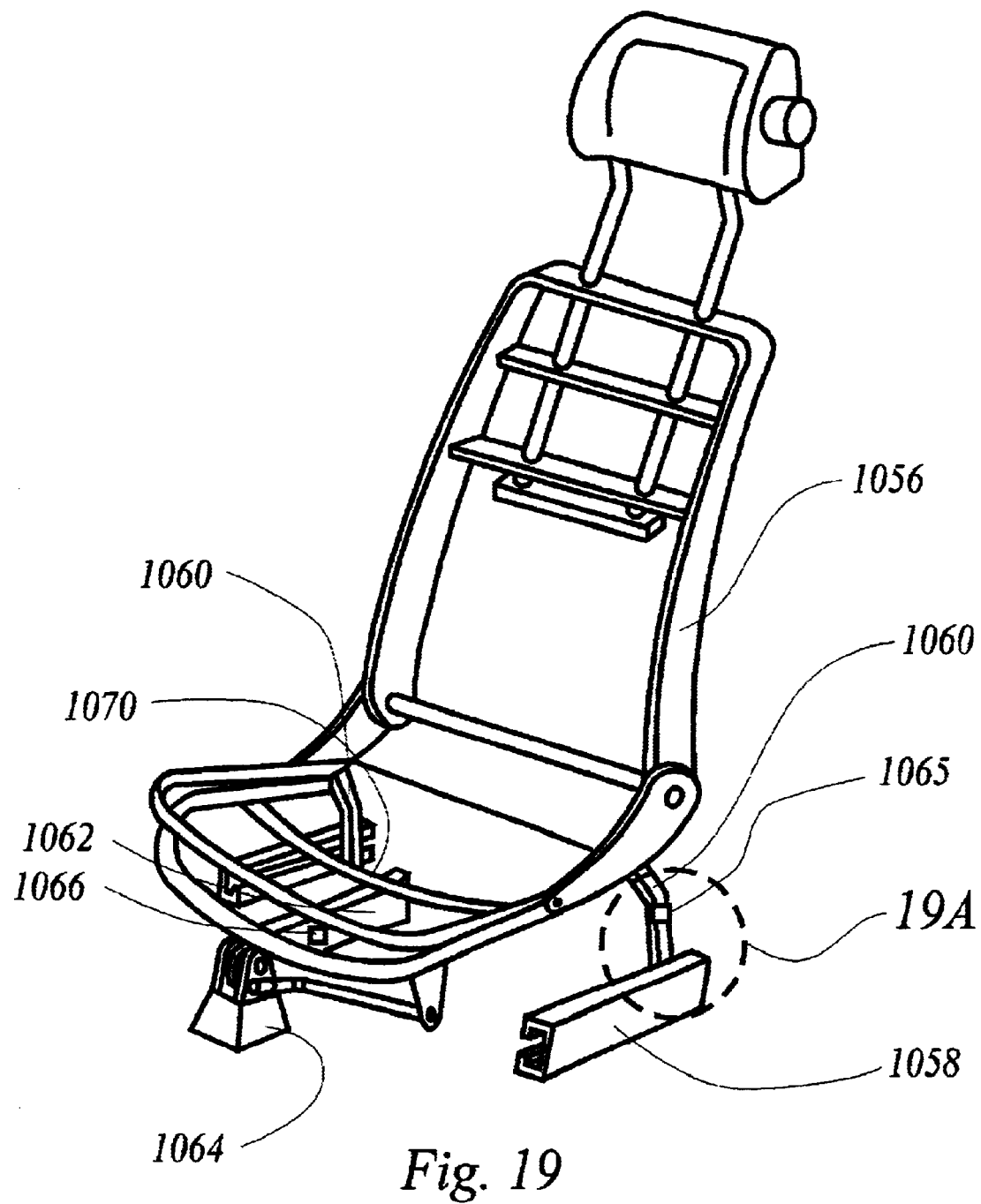
FIG. 19 illustrates a seat structure with the seat cushion and back cushion removed illustrating a three-slide attachment of the seat to the vehicle and preferred mounting locations on the seat structure for strain measuring weight sensors of an apparatus for measuring the weight of an occupying item of a seat in accordance with the invention.

A typical manually controlled seat structure is illustrated in FIG. 19 and described in greater detail in U.S. Pat. No. 4,285,545. The seat 1056 (only the frame of which is shown) is attached to a pair of slide mechanisms 1058 in the rear thereof through support members such as rectangular tubular structures 1060 angled between the seat 1056 and the slide mechanisms 1058. The front of the seat 1056 is attached to the vehicle (more particularly to the floor pan) through another support member such as a slide member 1062, which is engaged with a housing 1064. Slide mechanisms 1058, support members 1060, slide member 1062 and housing 1064 constitute the support structure for mounting the seat on a substrate, i.e., the floor pan. Strain gage transducers are located for this implementation at 1065 and 1066, strain gage transducer 1065 being mounted on each tubular structure 1060 (only one of which is shown) and strain gage transducer 1066 being mounted on slide member 1062. When an occupying item is situated on the seat cushion (not shown), each of the support members 1060 and 1062 are deformed or strained. This strain is measured by transducers 1065 and 1066, respectively, to enable a determination of the weight of the item occupying the seat. More specifically, a control system or module or other compatible processing unit (not shown) is coupled to the strain gage transducers 1065,1066, e.g., via electrical wires (not shown), to receive the measured strain and utilize the measured strain to determine the weight of the occupying item of the seat. The determined weight, or the raw measured strain, may be used to control a vehicular component such as the airbag.

Support members 1060 are substantially vertically oriented and are preferably made of a sufficiently rigid, non-bending component.

Figure 19A:
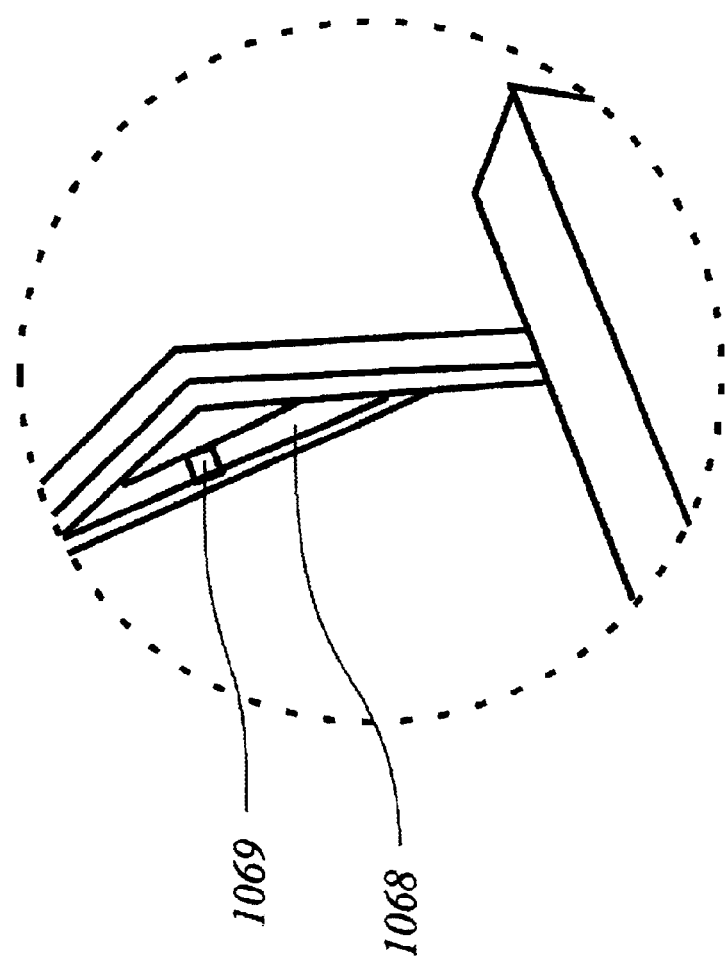
FIG. 19A illustrates an alternate view of the seat structure transducer mounting location taken in the circle A of FIG. 19 with the addition of a gusset and where the strain gage is mounted onto the gusset.

FIG. 19A illustrates an alternate arrangement for the seat support structures wherein a gusset 1068 has been added to bridge the angle on the support member 1060. Strain gage transducer 1069 is placed on this gusset 1068. Since the gusset 1068 is not a supporting member, it can be made considerably thinner than the seat support member 1060. As the seat is loaded by an occupying item, the seat support member 1060 will bend. Since the gusset 1068 is relatively weak, greater strain will occur in the gusset 1068 than in the support member 1060. The existence of this greater strain permits more efficient use of the strain gage dynamic range thus improving the accuracy of the weight measurement.

Figure 19B:
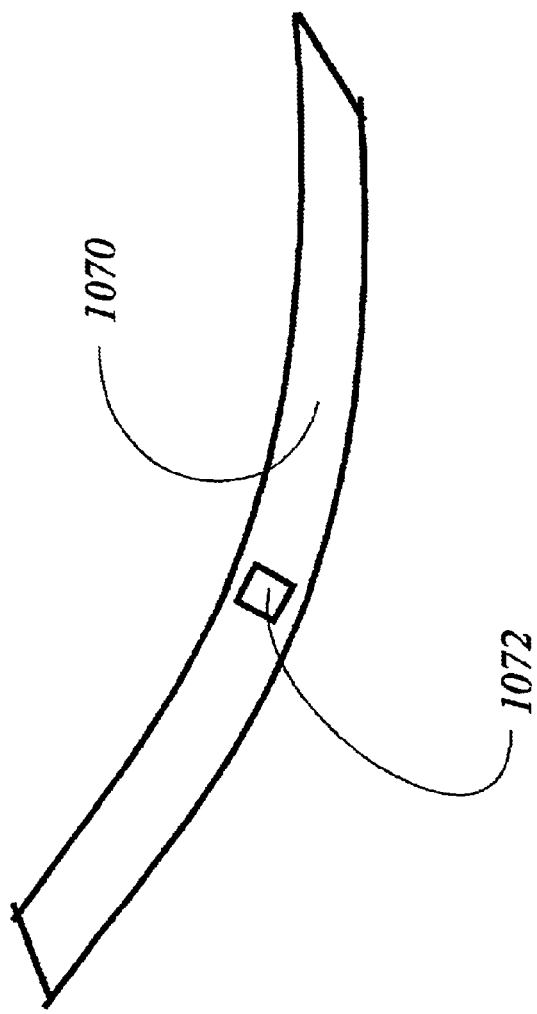
FIG. 19B illustrates a mounting location for a weight sensing transducer on a centralized transverse support member in an apparatus for measuring the weight of an occupying item of a seat in accordance with the invention.

FIG. 19B illustrates a seat transverse support member 1070 of the seat shown in FIG. 19, which is situated below the base cushion and extends between opposed lateral sides of the seat. This support member 1070 will be directly loaded by the vehicle seat and thus will provide an average measurement of the force exerted or weight of the occupying item. The deflection or strain in support member 1070 is measured by a strain gage transducer 1072 mounted on the support member 1070 for this purpose. In some applications, the support member 1070 will occupy the entire space fore and aft below the seat cushion. Here it is shown as a relatively narrow member. The strain gage transducer 1072 is coupled, e.g., via an electrical wire (not shown), to a control module or other processing unit (not shown) which utilizes the measured strain to determine the weight of the occupying item of the seat.

In FIG. 19, the support members 1060 are shown as rectangular tubes having an end connected to the seat 1056 and an opposite end connected to the slide mechanisms 1058. In the constructions shown in FIGS. 20A–20C, the rectangular tubular structure has been replaced by a circular tube where only the lower portion of the support is illustrated. FIGS. 20A–20C show three alternate ways of improving the accuracy of the strain gage system, i.e., the accuracy of the measurements of strain by the strain gage transducers. Generally, a reduction in the stiffness of the support member to which the strain gage transducer is mounted will concentrate the force and thereby improve the strain measurement. There are several means disclosed below to reduce the stiffness of the support member. These means are not exclusive and other ways to reduce the stiffness of the support member are included in the invention and the interpretation of the claims.

In each illustrated embodiment, the transducer is represented by 1065 and the substantially vertically oriented support member corresponding to support member 1060 in FIG. 19 has been labeled 1060A. In FIG. 20A, the tube support member 1060A has been cut to thereby form two separate tubes having longitudinally opposed ends and an additional tube section 1074 is connected, e.g., by welding, to end portions of the two tubes. In this manner, a more accurate tube section 1074 can be used to permit a more accurate measurement of the strain by transducer 1065, which is mounted on tube section 1074.

In FIG. 20B, a small circumferential cut has been made in tube support member 1060A so that a region having a smaller circumference than a remaining portion of the tube support member 1060A is formed. This cut is used to control the diameter of the tube support member 1060A at the location where strain gage transducer 1065 is measuring the strain. In other words, the strain gage transducer 1065 is placed at a portion wherein the diameter thereof is less than the diameter of remaining portions of the tube support member 1060A. The purpose of this cut is to correct for manufacturing variations in the diameter of the tube support member 1060A. The magnitude of the cut is selected so as to not significantly weaken the structural member but instead to control the diameter tolerance on the tube so that the strain from one vehicle to another will be the same for a particular loading of the seat.

In FIG. 20C, a small hole 1078 is made in the tube support member 1060A adjacent the transducer 1065 to compensate for manufacturing tolerances on the tube support member 1060A.

From this discussion, it can be seen that all three techniques have as their primary purpose to provide increase the accuracy of the strain in the support member corresponding to weight on the vehicle seat. Naturally, the preferred approach would be to control the manufacturing tolerances on the support structure tubing so that the variation from vehicle to vehicle is minimized. For some applications where accurate measurements of weight are desired, the seat structure will be designed to optimize the ability to measure the strain in the support members and thereby to optimize the measurement of the weight of the occupying item. The inventions disclosed herein, therefore, are intended to cover the entire seat when the design of the seat is such as to be optimized for the purpose of strain gage weight sensing and alternately for the seat structure when it is so optimized.

Figure 21:
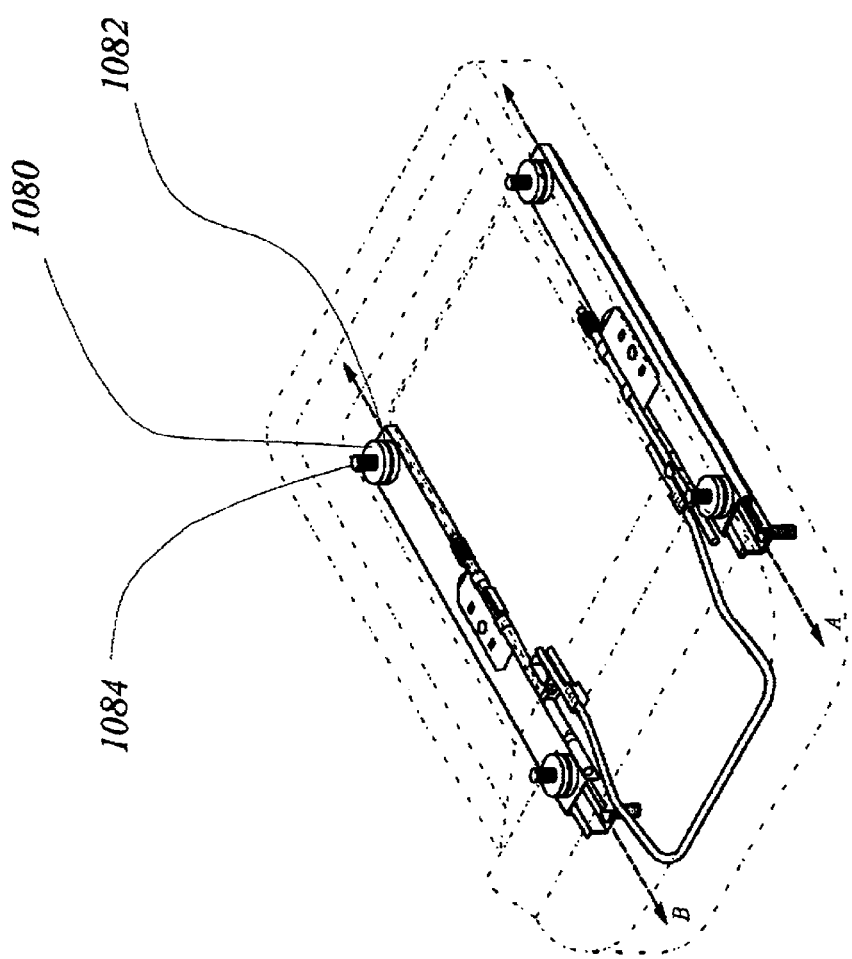
FIG. 21 illustrates an alternate weight sensing transducer utilizing pressure sensitive transducers.

Although strain measurement devices have been discussed above, pressure measurement systems can also be used in the seat support structure to measure the weight on the seat. Such a system is illustrated in FIG. 21. A general description of the operation of this apparatus is disclosed in U.S. Pat. No. 5,785,291, which is incorporated herein by reference. In that patent, the vehicle seat is attached to the slide mechanism by means of bolts 1084. Between the seat and the slide mechanism, a shock-absorbing washer has been used for each bolt. In the present invention, this shock-absorbing washer has been replaced by a sandwich construction consisting of two washers of shock absorbing material 1080 with a pressure sensitive material 1082 sandwiched in between. A variety of materials can be used for the pressure sensitive material 1082, which generally work on either the capacitance or resistive change of the material as it is compressed. The wires from this material leading to the electronic control system are not shown in this view. The pressure sensitive material is coupled to the control system, e.g., a microprocessor, and provides the control system with an indication of the pressure applied by the seat on the slide mechanism which is related to the weight of the occupying item of the seat. Generally, material 1082 is constructed with electrodes on the opposing faces such that as the material is compressed, the spacing between the electrodes is decreased. This spacing change thereby changes both the resistive and the capacitance of the sandwich which can be measured and which is a function of the compressive force on the material. Measurement of the change in capacitance of the sandwich, i.e., two spaced apart conductive members, is obtained by any method known to those skilled in the art, e.g., connecting the electrodes in a circuit with a source of alternating or direct current. The conductive members may be made of a metal. The use of such a pressure sensor is not limited to the illustrated embodiment wherein the shock absorbing material 1080 and pressure sensitive material 1082 are placed around bolt 1084. It is also not limited to the use or incorporation of shock absorbing material in the implementation.

Figure 21A:
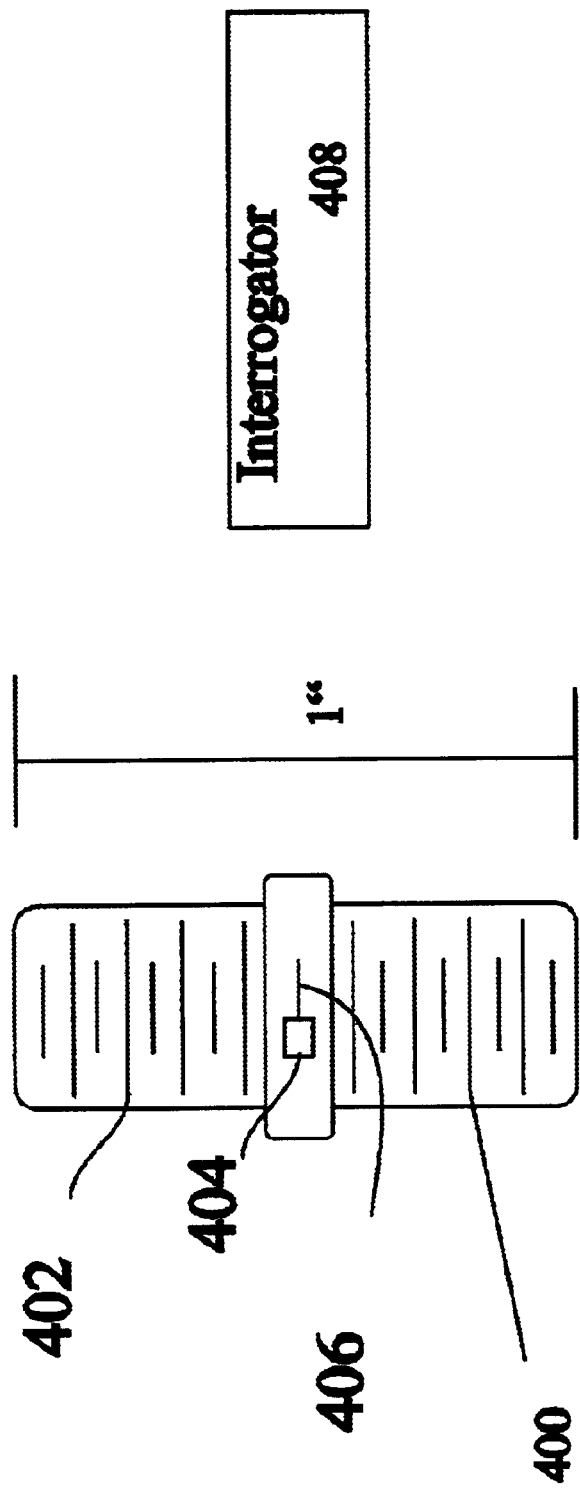
FIG. 21A illustrates a part of another alternate weight sensing system for a seat.

FIG. 21A shows a substitute construction for the bolt 1084 in FIG. 21 and which construction is preferably arranged in connection with the seat and the adjustment slide mechanism or between the slide mechanism and the floor. A bolt-like member, hereinafter referred to as a stud 400, is threaded 402 on both ends with a portion remaining unthreaded between the ends. A SAW strain measuring device including a SAW strain gage 404 and antenna 406 is arranged on the center unthreaded section of the stud 400 and the stud 400 is attached at its ends to the seat and the slide mechanism using appropriate threaded nuts. Based on the particular geometry of the SAW device used, the stud 400 can result in as little as a 3 mm upward displacement of the seat compared to a normal bolt mounting system. No wires are required to attach the SAW device to the stud 400. The total length of stud 400 may be as little as 1 inch. In operation, an interrogator 408 transmits a radio frequency pulse at for example, 925 MHz which excites the antenna 406 associated with the SAW strain gage 404. After a delay caused by the time required for the wave to travel the length of the SAW device, a modified wave is re-transmitted to the interrogator 408 providing an indication of the strain and thus a representative value of the weight of an object occupying the seat. For a seat which is normally bolted to the slide mechanism with four bolts, at least four SAW strain measuring devices or sensors would be used. Each conventional bolt could thus be replaced by a stud as described above. Naturally, since the individual SAW devices are very small, multiple such devices can be placed on the stud to provide multiple redundant measurements or to permit the stud to be arbitrarily located with at least one SAW device always within direct view of the interrogator antenna.

To avoid potential problems with electromagnetic interference, the stud 400 may be made of a non-metallic, possibly composite, material which would not likely cause or contribute to any possible electromagnetic wave interference. The stud 400 could also be modified for use as an antenna.

If the seat is unoccupied then the frequency of interrogation can be substantially reduced in comparison to when the seat is occupied. For an occupied seat, information as to the identity and/or category and position of an occupying item of the seat can be obtained through the use of multiple weight sensors. For this reason, and due to the fact that during pre-crash event the position of an occupying item of the seat may be changing rapidly, interrogations as frequently as once every 10 milliseconds or even faster can be desirable. This would also enable a distribution of the weight being applied to the seat being obtained which provides an estimation of the position of the object occupying the seat. Using pattern recognition technology, e.g., a trained neural network, sensor fusion, fuzzy logic, etc., the identification of the object can be ascertained based on the determined weight and/or determined weight distribution.

Although each of the SAW devices can be interrogated and/or powered using wireless means, in some cases, it may be desirable to supply power to and or obtained information from such devices using wires.

Figure 22:
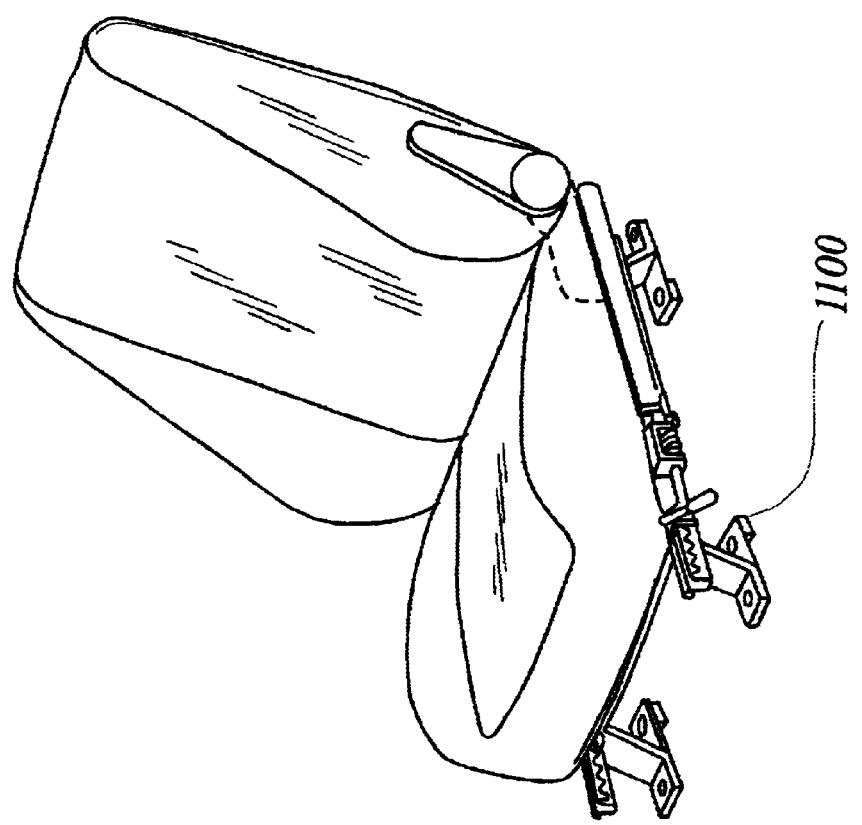
FIG. 22 illustrates an alternate seat structure assembly utilizing strain transducers.

In FIG. 22, which is a view of a seat attachment structure described in U.S. Pat. No. 5,531,503, where a more conventional strain gage load cell design designated 1100 is utilized. One such load cell design 1100 is illustrated in detail in FIG. 22A.

Figure 22A:
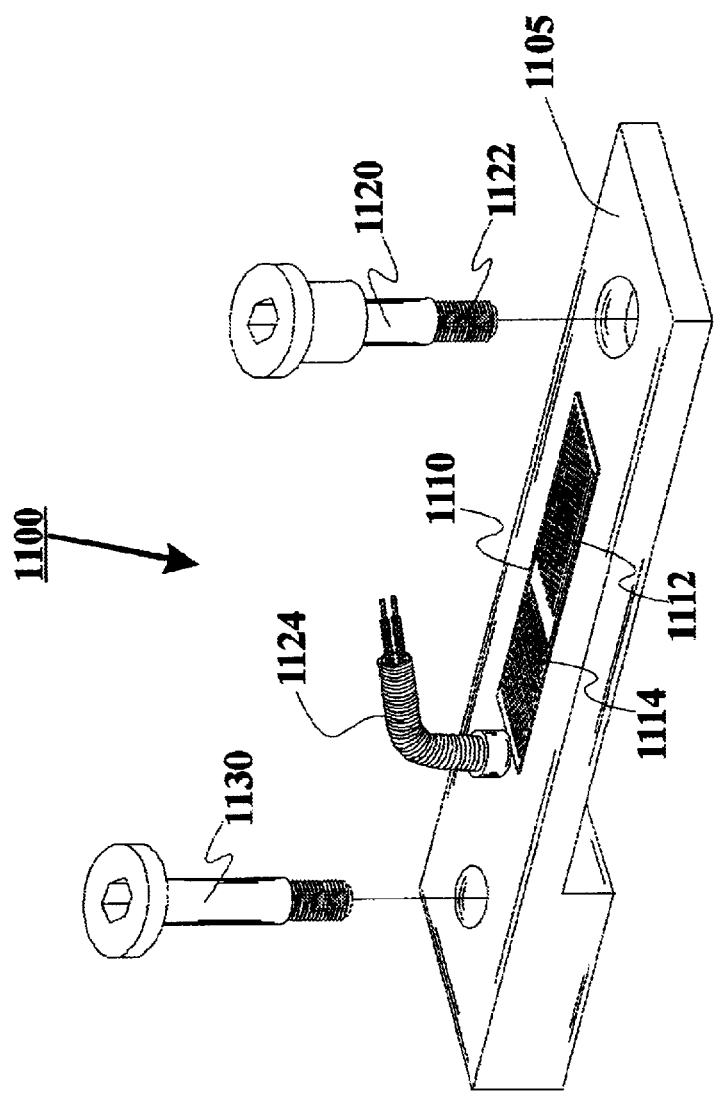
FIG. 22A is a perspective view of a cantilevered beam type load cell for use with the weight measurement system of this invention for mounting locations of FIG. 22, for example.

A cantilevered beam load cell design using a half bridge strain gage system 1110 is shown in FIG. 22A. Fixed resistors mounted within the electronic package, which is not shown in this drawing, provide the remainder of the whetstone bridge system. The half bridge system is frequently used for economic reasons and where some sacrifice in accuracy is permissible. The load cell 110 includes a member on which the strain gage 1110 is situated. The strain gage 1100 includes strain-measuring elements 1112 and 1114 arranged on the load cell. The longitudinal element 1112 measures the tensile strain in the beam when it is loaded by the seat and its contents, not shown, which is attached to end 1122 of bolt 1120. The load cell is mounted to the vehicle or other substrate using bolt 1130. Temperature compensation is achieved in this system since the resistance change in strain elements 1112 and 1114 will vary the same amount with temperature and thus the voltage across the portions of the half bridge will remain the same. The strain gage 1100 is coupled to a control system (e.g., a microprocessor-not shown) via wires 1124 and receives the measured tensile strain and determines the weight of an occupying item of the seat based thereon.

One problem with using a cantilevered load cell is that it imparts a torque to the member on which it is mounted. One preferred mounting member on an automobile is the floor-pan which will support significant vertical loads but is poor at resisting torques since floor-pans are typically about 1 mm (0.04 inches) thick. This problem can be overcome through the use of a simply supported load cell design designated 1200 as shown in FIG. 22B.

In FIG. 22B, a full bridge strain gage system 1210 is used with all four elements 1212,1214 mounted on the top of a beam 1205. Elements 1212 are mounted parallel to the beam 1205 and elements 1214 are mounted perpendicular to it. Since the maximum strain is in the middle of the beam 1205, strain gage 1210 is mounted close to that location. The load cell, shown generally as 1200, is supported by the floor pan, not shown, at supports 1230 that are formed by bending the beam 1205 downward at its ends. Fasteners 1220 fit through holes 1222 in the beam 1205 and serve to hold the load cell 1200 to the floor pan without putting significant forces on the load cell 1200. Holes are provided in the floor-pan for bolt 1240 and for fasteners 1220. Bolt 1240 is attached to the load cell 1200 through hole 1250 of the beam 1205 which serves to transfer the force from the seat to the load cell 1200. Although this design would place the load cell between the slide mechanism and the floor, in many applications it would be placed between the seat and the slide mechanism. In the first case, the evaluation algorithm may also require a seat position input if the weight distribution is to be determined.

The electronics package can be potted within hole 1262 using urethane potting compound 1244 and includes signal conditioning circuits, a microprocessor with integral ADCs 1280 and a flex circuit 1275 (FIG. 22C). The flex circuit 1275 terminates at an electrical connector 1290 for connection to other vehicle electronics, e.g., a control system. The beam 1205 is slightly tapered at location 1232 so that the strain is constant in the strain gage.

Figure 22D:
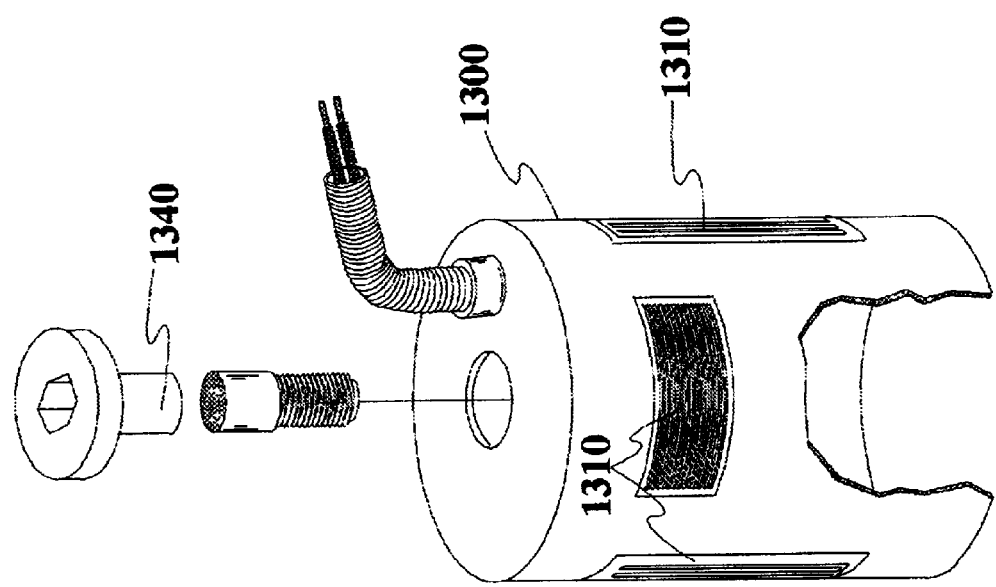
FIG. 22D is a perspective view of a tubular load cell for use with the weight measurement system of this invention as an alternate to the cantilevered load cell of FIG. 22A.

Although thus far only beam type load cells have been described, other geometries can also be used. One such geometry is a tubular type load cell. Such a tubular load cell is shown generally at 1300 in FIG. 22D and instead of an elongate beam, it includes a tube. It also comprises a plurality of strain sensing elements 1310 for measuring tensile and compressive strains in the tube as well as other elements, not shown, which are placed perpendicular to the elements 1310 to provide for temperature compensation. Temperature compensation is achieved in this manner, as is well known to those skilled in the art of the use of strain gages in conjunction with a whetstone bridge circuit, since temperature changes will affect each of the strain gage elements identically and the total effect thus cancels out in the circuit. The same bolt 1340 can be used in this case for mounting the load cell to the floor-pan or slide mechanism and for attaching the seat or slide mechanism respectively to the load cell.

Figure 22E:
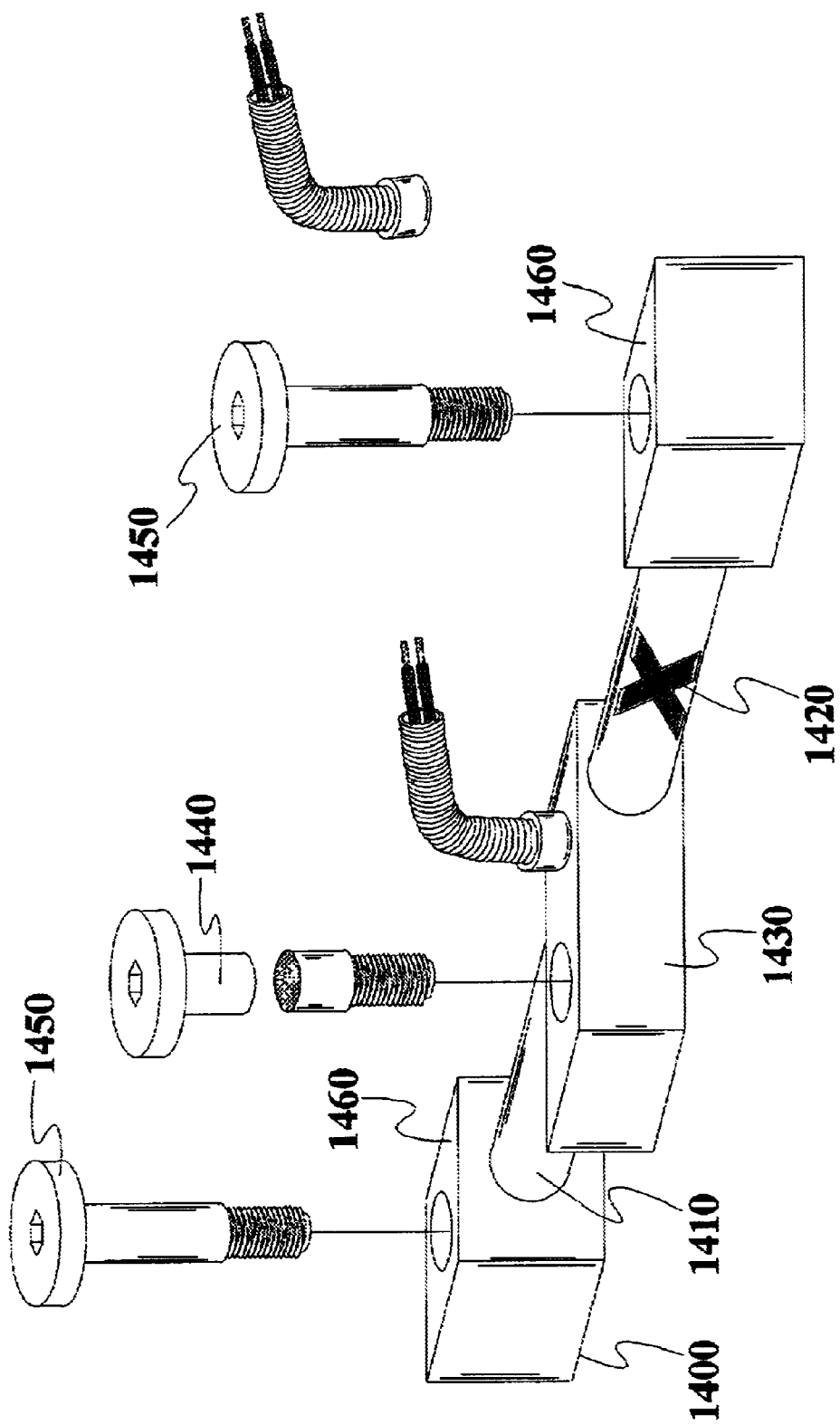
FIG. 22E is a perspective view of a torsional beam load cell for use with the weight measurement apparatus in accordance with the invention as an alternate to the cantilevered load cell of FIG. 22A.

Another alternate load cell design shown generally in FIG. 22E as 1400 makes use of a torsion bar 1410 and appropriately placed torsional strain sensing elements 1420. A torque is imparted to the bar 1410 by means of lever 1430 and bolt 1440 which attaches to the seat structure not shown. Bolts 1450 attach the mounting blocks 1460 at ends of the torsion bar 1410 to the vehicle floor-pan.

The load cells illustrated above are all preferably of the foil strain gage type. Other types of strain gages exist which would work equally which include wire strain gages and strain gages made from silicon. Silicon strain gages have the advantage of having a much larger gage factor and the disadvantage of greater temperature effects. For the high-volume implementation of this invention, silicon strain gages have an advantage in that the electronic circuitry (signal conditioning, ADCs, etc.) can be integrated with the strain gage for a low cost package. Other strain gage materials and load cell designs may, of course, be incorporated within the teachings of this invention.

In particular, a surface acoustical wave (SAW) strain gage can be used in place of conventional wire, foil or silicon strain gages and the strain measured either wirelessly or by a wire connection. For SAW strain gages, the electronic signal conditioning can be associated directly with the gage or remotely in an electronic control module as desired. For SAW strain gages, the problems discussed above with low signal levels requiring bridge structures and the methods for temperature compensation may not apply. Generally, SAW strain gages are more accurate that other technologies but may require a separate sensor to measure the temperature for temperature compensation depending on the material used. Materials that can be considered for SAW strain gages are quartz, lithium niobate, lead zirconate, lead titenate, zinc oxide, polyvinylidene fluoride and other piezoelectric materials.

Many seat designs have four attachment points for the seat structure to attach to the vehicle. Since the plane of attachment is determined by three points, the potential exists for a significant uncertainty or error to be introduced. This problem can be compounded by the method of attachment of the seat to the vehicle. Some attachment methods using bolts, for example, can introduce significant strain in the seat supporting structure. Some compliance therefore must be introduced into the seat structure to reduce these attachment induced stresses to a minimum. Too much compliance, on the other hand, can significantly weaken the seat structure and thereby potentially cause a safety issue. This problem can be solved by rendering the compliance section of the seat structure highly nonlinear or significantly limiting the range of the compliance. One of the support members, for example, can be attached to the top of the seat structure through the use of the pinned joint wherein the angular rotation of the joint is severely limited. Methods will now be obvious to those skilled in the art to eliminate the attachment induced stress and strain in the structure which can cause inaccuracies in the strain measuring system.

In the examples illustrated above, strain measuring elements have been shown at each of the support members.

This of course is necessary if an accurate measurement of the weight of the occupying item of the seat is to be determined. For this case, typically a single value is inputted into the neural network representing weight. Experiments have shown, however, for the four strain gage transducer system, that most of the weight and thus most of the strain occurs in the strain elements mounted on the rear seat support structural members. In fact, about 85 percent of the load is typically carried by the rear supports. Little accuracy is lost therefore if the forward strain measuring elements are eliminated. Similarly, for most cases, the two rear mounted support strain elements measure approximately the same strain. Thus, the information represented by the strain in one rear seat support is sufficient to provide a reasonably accurate measurement of the weight of the occupying item of the seat.

If a system consisting of eight transducers is considered, four ultrasonic transducers and four weight transducers, and if cost considerations require the choice of a smaller total number of transducers, it is a question of which of the eight transducers should be eliminated. Fortunately, the neural network technology provides a technique for determining which of the eight transducers is most important, which is next most important, etc. If the six most critical transducers are chosen, that is the six transducers which contain the most useful information as determined by the neural network, and a neural network can be trained using data from those six transducers and the overall accuracy of the system can be determined. Experience has determined, for example, that typically there is almost no loss in accuracy by eliminating two of the eight transducers, that is two of the strain gage weight sensors. A slight loss of accuracy occurs when one of the ultrasonic transducers is then eliminated.

This same technique can be used with the additional transducers described above. A transducer space can be determined with perhaps twenty different transducers comprised of ultrasonic, optical, electromagnetic, motion, heartbeat, weight, seat track, seatbelt payout, seatback angle etc. transducers. The neural network can then be used in conjunction with a cost function to determine the cost of system accuracy. In this manner, the optimum combination of any system cost and accuracy level can be determined.

In many situations where the four strain measuring weight sensors are applied to the vehicle seat structure, the distribution of the weight among the four strain gage sensors, for example, well very significantly depending on the position of the seat in the vehicle and particularly the fore and aft and secondarily the seatback angle position. A significant improvement to the accuracy of the strain gage weight sensors, particularly if less than four such sensors are used, can result by using information from a seat track position and/or a seatback angle sensor. In many vehicles, such sensors already exist and therefore the incorporation of this information results in little additional cost to the system and results in significant improvements in the accuracy of the weight sensors.

There have been attempts to use seat weight sensors to determine the load distribution of the occupying item and thereby reach a conclusion about the state of seat occupancy. For example, if a forward facing human is out of position, the weight distribution on the seat will be different than if the occupant is in position. Similarly a rear facing child seat will have a different weight distribution than a forward facing child seat. This information is useful for determining the seated state of the occupying item under static or slowly changing conditions. For example, even when the vehicle is traveling on moderately rough roads, a long term averaging or filtering technique can be used to determine the total weight and weight distribution of the occupying item. Thus, this information can be useful in differentiating between a forward facing and rear facing child seat.

It is much less useful however for the case of a forward facing human or forward facing child seat that becomes out of position during a crash. Panic braking prior to a crash, particularly on a rough road surface, will cause dramatic fluctuations in the output of the weight sensing elements. Filtering algorithms, which require a significant time slice of data, will also not be particularly useful. A neural network or other pattern recognition system, however, can be trained to recognize such situations and provide useful information to improve system accuracy.

Other dynamical techniques can also provide useful information especially if combined with data from various vehicle accelerometers. By studying the average weight over a few cycles, as measured by each transducer independently, a determination can be made that the weight distribution is changing. Depending on the magnitude of the change a determination can be made as to whether the occupant is being restrained by a seatbelt. It a seatbelt restraint is not being used, the output from the crash accelerometer can be used to accurately project the position of the occupant during pre crash braking and eventually the impact itself providing his or her initial position is known.

In this manner, a weight sensor with provides weight distribution information can provide useful information to improve the accuracy of the occupant position sensing system for dynamic out of position determination. Naturally, even without the weight sensor information, the use of the vehicle crash sensor data in conjunction with any means of determining the belted state of the occupant will dramatically improve the dynamic determination of the position of a vehicle occupant.

It should be mentioned that the adjustment system may be used in conjunction with each vehicle seat. In this case, if a seat is determined to be unoccupied, then the processor means may be designed to adjust the seat for the benefit of other occupants, i.e., if a front passenger side seat is unoccupied but the rear passenger side seat is occupied, then adjustment system might adjust the front seat for the benefit of the rear-seated passenger, e.g., move the seat base forward.

Figure 23:
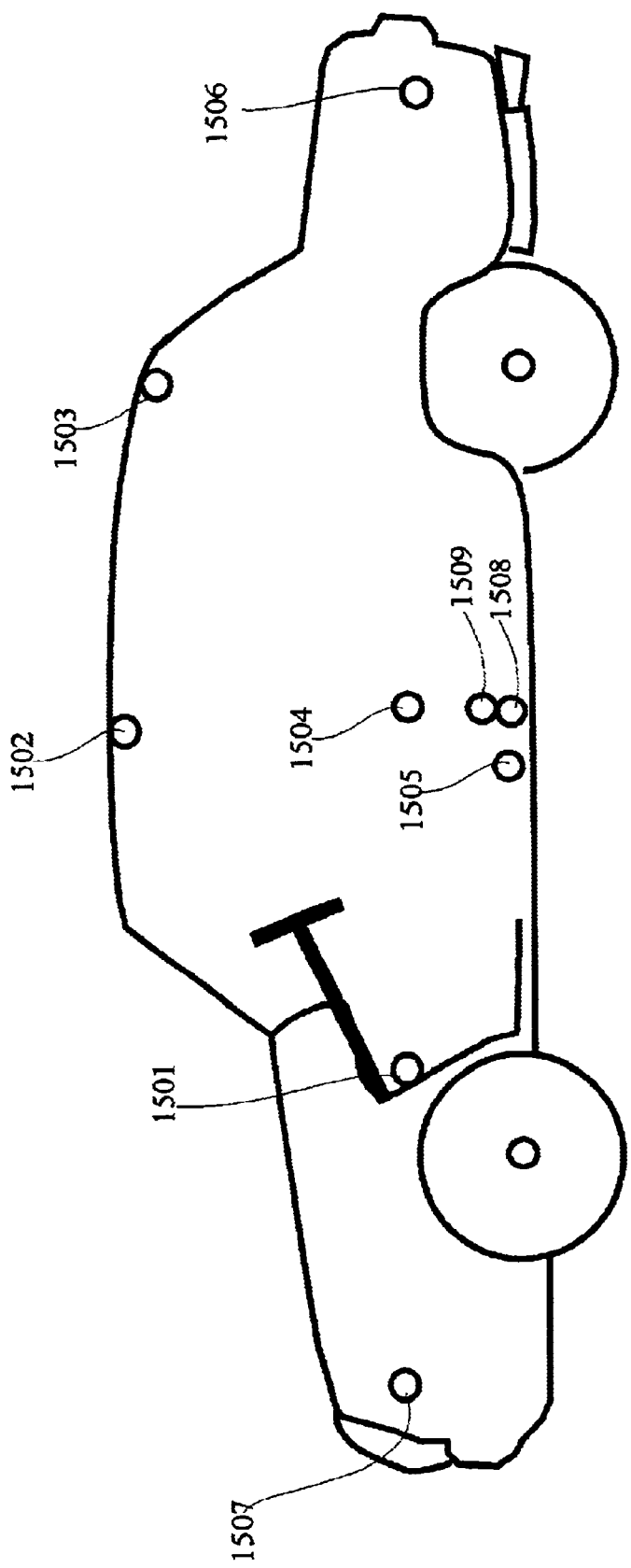
FIG. 23 is a schematic of a vehicle with several accelerometers and/or gyroscopes at preferred locations in the vehicle.

FIG. 23 illustrates the placement of a variety of sensors, primarily accelerometers and/or gyroscopes, which can be used to diagnose the state of the vehicle itself. Sensor 1501 can measure the acceleration of the firewall or instrument panel and is located thereon generally midway between the two sides of the vehicle. Sensor 1502 can be located in the headliner or attached to the vehicle roof above the side door. Typically, there will be two such sensors one on either side of the vehicle. Sensor 1503 is shown in a typical mounting location midway between the sides of the vehicle attached to or near the vehicle roof above the rear window. Sensor 1506 is shown in a typical mounting location in the vehicle trunk adjacent the rear of the vehicle. One, two or three such sensors can be used depending on the application. If three such sensors are use one would be adjacent each side of vehicle and one in the center. Sensor 1504 is shown in a typical mounting location in the vehicle door and sensor 1505 is shown in a typical mounting location on the sill or floor below the door. Finally, sensor 1507, which can be also multiple sensors, is shown in a typical mounting location forward in the crush zone of the vehicle. If three such sensors are used, one would be adjacent each vehicle side and one in the center. Additionally, sensor 1508 can be mounted on the floor or base of the seat structure to measure the seat base acceleration or "forcing function" on the seat.

In general, sensors 1501–1508 measure a physical property of the location at which they are mounted. For example, the physical property would be the acceleration of the mounting location if the sensor is an accelerometer and would be angular inclination if the sensor is a gyroscope. Another way of looking at would be to consider that sensors 1501–1508 provide a measurement of the state of the sensor, such as its velocity, acceleration, angular orientation or temperature, or a state of the location at which the sensor is mounted. Thus, measurements related to the state of the sensor would include measurements of the acceleration of the sensor, measurements of the temperature of the mounting location as well as changes in the state of the sensor and rates of changes of the state of the sensor. However, any described use or function of the sensors 1501–1508 above is merely exemplary and is not intended to limit the form of the sensor or its function.

Each of the sensors 1501–1508 may be single axis, double axis or triaxial accelerometers and/or gyroscopes typically of the MEMS type. These sensors 1501–1508 can either be wired to the central control module or processor directly wherein they would receive power and transmit information, or they could be connected onto the vehicle bus or, in some cases, using RFID or SAW technology, the sensors can be wireless and would receive their power through RF from one or more interrogators located in the vehicle. In this case, the interrogators can be connected either to the vehicle bus or directly to control module. Alternately, an inductive or capacitive power and information transfer system can be used.

One particular implementation will now be described. In this case, each of the sensors 1501–1508 is a single or dual axis accelerometer. They are made using silicon micromachined technology such as disclosed in U.S. Pat. Nos. 5,121,180 and 5,894,090. These are only representative patents of these devices and there exist more than 100 other relevant U.S. patents describing this technology. Commercially available MEMS gyroscopes such as from Systron Doner have accuracies of approximately one degree per second. In contrast, optical gyroscopes typically have accuracies of approximately one degree per hour. Unfortunately, the optical gyroscopes are prohibitively expensive for automotive applications. On the other hand, typical MEMS gyroscopes are not sufficiently accurate for many control applications.

The angular rate function can be obtained through placing accelerometers at two separated, non-co-located points in a vehicle and using the differential acceleration to obtain an indication of angular motion and angular acceleration. From the variety of accelerometers shown on FIG. 23, it can be readily appreciated that not only will all accelerations of key parts of the vehicle be determined, but the pitch, yaw and roll angular rates can also be determined based on the accuracy of the accelerometers. By this method, low cost systems can be developed which, although not as accurate as the optical gyroscopes, are considerably more accurate than conventional MEMS gyroscopes.

Instead of using two accelerometers at separate locations on the vehicle, a single conformal MEMS-IDT gyroscope may be used. Such a conformal MEMS-IDT gyroscope is described in a paper by V. K. Karadan, "Conformal MEMS-IDT Gyroscopes and Their Comparison With Fiber Optic Gyro", incorporated in its entirety herein. The MEMS-IDT gyroscope is based on the principle of surface acoustic wave (SAW) standing waves on a piezoelectric substrate. A surface acoustic wave resonator is used to create standing waves inside a cavity and the particles at the anti-nodes of the standing waves experience large amplitude of vibrations, which serves as the reference vibrating motion for the gyroscope. Arrays of metallic dots are positioned at the anti-node locations so that the effect of Coriolis force due to rotation will acoustically amplify the magnitude of the waves. Unlike other MEMS gyroscopes, the MEMS-IDT gyroscope has a planar configuration with no suspended resonating mechanical structures.

The system of FIG. 23 using dual axis accelerometers, therefore provide a complete diagnostic system of the vehicle itself and its dynamic motion. Such a system is far more accurate than any system currently available in the automotive market. This system provides very accurate crash discrimination since the exact location of the crash can be determined and, coupled with a knowledge of the force deflection characteristics of the vehicle at the accident impact site, an accurate determination of the crash severity and thus the need for occupant restraint deployment can be made. Similarly, the tendency of a vehicle to roll over can be predicted in advance and signals sent to the vehicle steering, braking and throttle systems to attempt to ameliorate the rollover situation or prevent it. In the event that it cannot be prevented, the deployment side curtain airbags can be initiated in a timely manner.

Similarly, the tendency of the vehicle to the slide or skid can be considerably more accurately determined and again the steering, braking and throttle systems commanded to minimize the unstable vehicle behavior.

Thus, through the sample deployment of inexpensive accelerometers and MEMS gyroscopes, particularly MEMS-IDT gyroscopes, at a variety of locations in the vehicle, significant improvements are many in the vehicle stability control, crash sensing, rollover sensing, and resulting occupant protection technologies.

Finally, as mentioned above, the combination of the outputs from these accelerometer sensors and the output of strain gage or bladder weight sensors in a vehicle seat, or in or on a support structure of the seat, can be used to make an accurate assessment of the occupancy of the seat and differentiate between animate and inanimate occupants as well as determining where in the seat the occupants are sitting and the state of the seatbelt use.

This can be done by observing the acceleration signals from the sensors (accelerometers) of FIG. 23 and simultaneously measuring, detecting or determining the dynamic strain or pressure gage measurements from the seat-mounted strain or pressure gages. The accelerometers provide the input function to the seat and the strain or pressure gages measure the reaction of the occupying item to the vehicle acceleration and thereby provide a method for determining dynamically the mass and other inertial properties of the occupying item and its location and seatbelt usage. This is particularly important during occupant position sensing during a crash event.

By combining the outputs of the accelerometers and the strain or pressure gages and appropriately processing the same, the mass and weight of an object occupying the seat can be determined as well as the gross motion of such an object so that an assessment can be made as to whether the object is a life form such as a human being.

Several ways to process the acceleration signal and the strain or pressure signal are discussed below with reference to FIG. 24. In general, the dynamic load applied to the seat is measured or a forcing function of the seat is measured, as a function of the acceleration signal. This represents the effect of the movement of the vehicle on the occupant which is reflected in the measurement of weight by the strain or pressure gages. Thus, the measurement obtained by the strain or pressure gages can be considered to have two components, one component resulting from the weight applied by the occupant in a stationary state of the vehicle and the other arising or resulting from the movement of the vehicle. The vehicle-movement component can be separated from the total strain or pressure gage measurement to provide a more accurate indication of the weight of the occupant.

For this embodiment, sensor 1509 represents one or more strain or bladder pressure gage weight sensors mounted on the seat or in connection with the seat or its support structure. Suitable mounting locations and forms of weight sensors are discussed in the current assignee's U.S. Pat. No. 6,242,701 and contemplated for use in this invention as well. The mass or weight of the occupying item of the seat can thus be measured based on the dynamic measurement of the strain gages with optional consideration of the measurements of accelerometers on the vehicle, which are represented by any of sensors 1501–1508.

To provide a feeling for the implementation of this invention, consider the following approximate analysis.

To begin with, the seatbelt is a one-way spring in that the force is high for upward motion and low for downward motion. This however introduces non-linearity into the analysis making an exact solution difficult. Therefore for the purposes of this simplified analysis, an assumption is made that the force from the seatbelt is the same in both directions. Although the stiffness of the seat will vary significantly from vehicle to vehicle, assume here that it is about 30 kg per cm. Also assume that the input from the road is 1 Hz with a magnitude of 10 cm for the vertical motion of the vehicle wheels (axel) on the road. The motion of the seat will be much less due to the vehicle suspension system.

The problem is to find is the weight of an occupant from the response of the seat (as measured by strain or pressure gages) to the road displacement acting through the vehicle suspension. The intent here is only to show that it is possible to determine the weight of the occupant and the use of a seatbelt by measuring the dynamic strain or pressure due to the seat motion as a function of the weight of the occupant and the seatbelt force. The functions and equations used below and the solution to them can be implemented in a processor.

Figure 24:
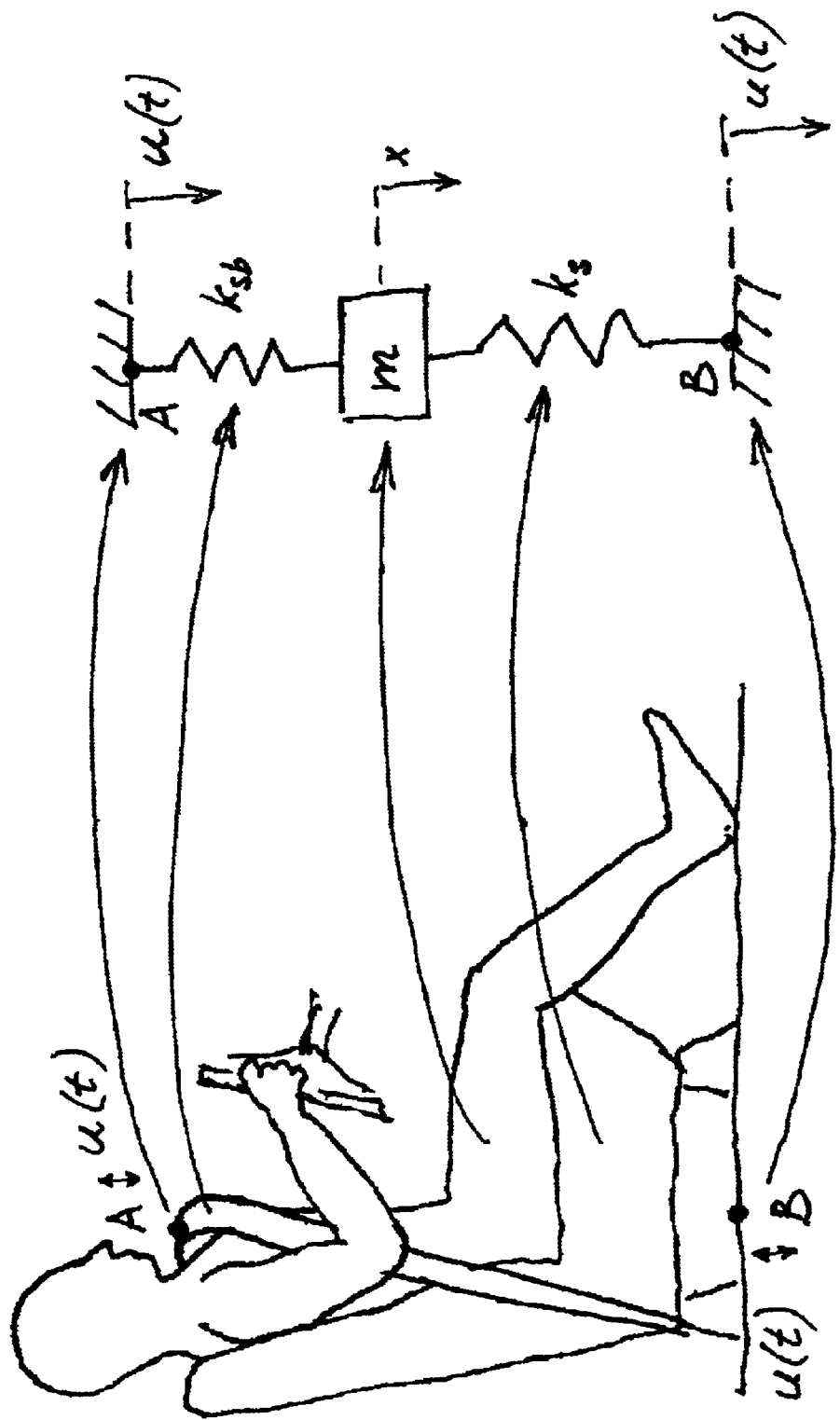
FIG. 24 is a schematic showing the manner in which dynamic forces of the vehicle can be compensated for in a weight measurement of the occupant.

Looking now at FIG. 24, suppose that point A (the point where a seatbelt is fixed to the seat) and point B are subjected to harmonic displacements $u(t)=U_0 \cos \omega t$ caused by a car's vertical movements on the road. As a result, springs modeling a seat and a seatbelt (their corresponding stiffness are $k_s$ and $k_{sb}$) affect a passenger mass m with forces $-k_{sb}(u-x)$ and $k_s(u-x)$. (Minus in the first force is taken because the seatbelt spring contracts when the seat spring stretches and vice versa). Under the forces action, the mass gets acceleration $d^2x/dt^2$, so the initial equation to be solved will be $$m\frac{d^2x}{dt^2} = -k_{sb}(u-x) + k_s(u-x). \tag{1}$$

This equation can be rewritten in the form $$m\frac{d^2x}{dt^2} + (k_s - k_{sb})x = u(t)(k_s - k_{sb}). \tag{2}$$

or $$m\frac{d^2x}{dt^2} + (k_s - k_{sb})x = U_0(k_s - k_{sb})\cos\omega t \tag{3}$$

This is a differential equation of a harmonic oscillator under action of a harmonic external force $f(t)=U_0(t)(k_s-K_{sb})\cos \omega t$. If there is no seatbelt ($k_{sb}=0$), the solution of this equation in the case of a harmonic external force $f(t)=F_0 \cos \omega t$ is well known [Strelkov S. P. *Introduction in the theory of oscillations*, Moscow, "Nauka", 1964, p. 56]:

$$x(t) = \frac{U_0}{\left(1-\frac{\omega^2}{\omega_0^2}\right)}\cos\omega t + C_1\cos\omega_0 t + C_2\sin\omega_0 t, \tag{4}$$

where the oscillator natural frequency.

$$\omega_0 = \sqrt{\frac{k_s}{m}}. \tag{5}$$

The second and third terms in equation (4) describe natural oscillations of the oscillator, which decay if there is any, even very small, friction in the system. Having assumed such small friction to be present, for steady forced oscillation, the equation is thus:

$$x(t) = \frac{U_0}{1-\frac{\omega^2}{\omega_0^2}}\cos\omega t. \tag{6}$$

Thus, in steady mode the system oscillates with the external force frequency $\omega$. Now, it is possible to calculate acceleration of the mass:

$$\frac{d^2x}{dt^2} = -\frac{\omega^2 U_0}{1-\frac{\omega^2}{\omega_0^2}}\cos\omega t, \tag{7}$$

and the amplitude of the force acting in the system $$F_m = \left|m\frac{d^2x}{dt^2}\right| = \left|-\frac{m\omega^2 U_0}{1-\frac{\omega^2}{\omega_0^2}}\right|. \tag{8}$$

In the situation where a seatbelt is present, it is not possible to use the same formulae because the seatbelt stiffness is always greater than stiffness of a seat, and $(k_s-k_{sb})<0$. Therefore, instead of equation (3) we should consider the equation $$\frac{d^2x}{dt^2} - \omega_0^2 x = -\omega_0^2 U_0 \cos\omega t, \tag{9}$$

where $$\omega_0^2 = |k_s - k_{sb}|/m > 0.$$

Following the same procedure (Strelkov S. P., ibid.), one can find a particular solution of inhomogeneous equation (9):

$$x(t) = \frac{U_0}{1 + \frac{\omega^2}{\omega_0^2}} \cos\omega t. \quad (10)$$

Then its general solution will be [as per Korn G. A., Korn T. M. *Mathematical handbook for scientists and engineers.* Russian translation: Moscow, "Nauka", 1970, pp. 268–270]:

$$x(t) = \frac{U_0}{\left(1 + \frac{\omega^2}{\omega_0^2}\right)} \cos\omega t + C_1 \cos\omega_0 t + C_2 \sin\omega_0 t. \quad (11)$$

Thus, in a steady mode, the amplitude of the acting force is:

$$F_m = \left| -\frac{m\omega^2 U_0}{1 + \frac{\omega^2}{\omega_0^2}} \right|, \quad (12)$$

and the natural frequency of the system is:

$$\omega_0 = \sqrt{\frac{|k_s - k_{sb}|}{m}}. \quad (13)$$

Using the formulae (5), (8) (the "no seatbelt case"), (12) and (13) (the "seatbelt present case"), a table can be created as shown below. In the table, pm denotes amplitude of pressure acting on the seat surface. The initial data used in calculations are as follows:

$k_s$=30 Kg/cm=3×10$^4$ N/m (the seat stiffness);
$k_{sb}$=600 N/0.3 cm=2×10$^5$ N/m (the seatbelt stiffness);
$U_0$=0.1 m (the acting displacement amplitude);
f=1 Hz (the acting frequency).
S=0.05 m$^2$ (the seat surface square that the passenger acting upon).

Naturally, where the frequency f=$\omega$/2$\pi$, $f_0$ is natural frequency of the system. Columns "No seatbelt" is calculated when $k_{sb}$=0.

| The passenger | No seatbelt | | | There is a seatbelt | | |
|---|---|---|---|---|---|---|
| mass, kg | $f_0$, Hz | $F_m$, N | $p_m$, Pa | $f_0$, Hz | $F_m$, N | $p_m$, Pa |
| 20 | 6.2 | 81.1 | 1.62 × 10$^3$ | 14.7 | 78.6 | 1.57 × 10$^3$ |
| 40 | 4.4 | 166.7 | 3.33 × 10$^3$ | 10.4 | 156.5 | 3.13 × 10$^3$ |
| 60 | 3.6 | 257.2 | 5.14 × 10$^3$ | 8.5 | 233.6 | 4.67 × 10$^3$ |
| 100 | 2.8 | 454.6 | 9.09 × 10$^3$ | 6.6 | 385.8 | 7.72 × 10$^3$ |

From the above table, it can be seen that there is a different combination of seat structure force (as can be measured by strain gages), or pressure (as can be measured by a bladder and pressure sensor) and natural frequency for each combination of occupant weight and seatbelt use. Indeed, it can easily be seen that use of a seatbelt significantly affects the weight measurement of the weight sensors. By using the acceleration data, e.g., a forcing function, it is possible to eliminate the effect of the seatbelt and the road on the weight measurement. Thus, by observing the response of the seat plus occupant and knowing the input from the road, an estimate of the occupant weight and seatbelt use can be made without even knowing the static forces or pressures in the strain or pressure gages. By considering the dynamic response of the seat to road-induced input vibrations, the occupant weight and seatbelt use can be determined.

In an actual implementation, the above problem can be solved more accurately by using a pattern recognition system that compares the pattern of the seat plus occupant response (pressure or strain gage readings) to the pattern of input accelerations. This can be done through the training of a neural network, modular neural network or other trainable pattern recognition system. Naturally, many other mathematical techniques can be used to solve this problem including various simulation methods where the coefficients of dynamical equations are estimated from the response of the seat and occupant to the input acceleration. Thus, although the preferred implementation of the present invention is to use neural networks to solve this problem, the invention is not limited thereby.

One embodiment of a weight sensor and method for determining the weight of an occupant of a seat, which may be used in the methods and apparatus for adjusting a vehicle component and identifying an occupant of a seat, comprises a bladder having at least one chamber adapted to be arranged in a seat portion of the seat, and at least one transducer for measuring the pressure in a respective chamber. The bladder may comprises a plurality of chambers, each adapted to be arranged at a different location in the seat portion of the seat. Thus, it is possible to determine the weight distribution of the occupant using this weight sensor with several transducers whereby each transducer is associated with one chamber and the weight distribution of the occupant is obtained from the pressure measurements of the transducers. The position of the occupant and the center of gravity of the occupant can also be determined based on the weight distribution.

A novel occupant position sensor for a vehicle, for determining the position of the occupant, comprises a weight sensor for determining the weight of an occupant of a seat as described immediately above and processor means for receiving the determined weight of the occupant from the weight sensor and determining the position of the occupant based at least on part on the determined weight of the occupant. The position of the occupant could also be determined based in part on waves received from the space above the seat, data from seat position sensors, reclining angle sensors, etc.

In an apparatus for adjusting the stiffness of a seat in a vehicle, at least two containers are arranged in or near a bottom portion of the seat, the first container substantially supports the load of a seat occupant and the second container is relatively unaffected by this load. The two containers are in flow communication with each other through a variable flow passage. Insertion means, e.g., an air compressor, are provided for directing a medium into one of the container and monitoring means, e.g., a pressure transducer, measuring the pressure in one or both containers. A control circuit is coupled to the medium insertion means and the monitoring means for regulating flow of medium into the first container via the medium insertion means until the pressure in the first container as measured by the monitoring means is indicative of a desired stiffness for the seat. The control circuit may also be arranged to adjust the flow passage to thereby control flow of medium between the two containers and thus damping the motion of on object on the seat. The flow passage may be an orifice in a peripheral wall of the inner container.

A method for adjusting the stiffness of a seat in a vehicle comprises the steps of arranging a first container in a bottom portion of the seat and subjected to the load on the seat, arranging a second container in a position where it is relatively unaffected by the load on the seat, coupling interior volumes of the two containers through a variable flow passage, measuring the pressure in the first container, and introducing medium into the first container until the measured pressure in the first container is indicative of a desired stiffness for the seat.

One embodiment of a seated-state detecting unit and method for ascertaining the identity of an object in a seat in a passenger compartment of a vehicle in accordance with the invention comprises a wave-receiving sensor arranged to receive waves from a space above the seat and generate an output representative of the received waves, weight measuring means associated with the seat for measuring the weight applied onto the seat (such as described above) and generating an output representative of the measured weight applied onto the seat, and processor means for receiving the outputs from the wave-receiving sensor and the weight measuring means and for evaluating the seated-state of the seat based thereon to determine whether the seat is occupied by an object and when the seat is occupied by an object, to ascertain the identity of the object in the seat based on the outputs from the wave-receiving sensor and the weight measuring means. If necessary depending on the type of wave-receiving sensor, waves are transmitted into the passenger compartment toward the seat to enable reception of the same by the wave-receiving sensor. The wave-receiving sensor may be an ultrasonic sensor structured and arranged to receive ultrasonic waves, an electromagnetic sensor structured and arranged to receive electromagnetic waves or a capacitive or electric field sensor for generating an output representative of the object based on the object's dielectric properties. The processor means may comprise a microcomputer into which a function correlating the outputs from the wave-receiving sensor and the weight measuring means and the seated-state of the seat is incorporated or a neural network which generates a function correlating the outputs from the wave-receiving sensor and the weight measuring means and the seated-state of the seat and executes the function using the outputs from the wave-receiving sensor and the weight measuring means as input to determine the seated-state of the seat.

Additional sensors may be provided to enhance the procedure for ascertaining the identity of the object. Such sensors, e.g., a seat position detecting sensor, reclining angle detecting sensor, heartbeat or other animal life state sensor, motion sensor, etc., provide output directly or indirectly related to the object which is considered by the processor means when evaluating the seated-state of the seat.

The weight measuring means may comprise one or more weight sensors such as strain gage bases sensors, possibly arranged in connection with the seat, for measuring the force or pressure applied onto at least a portion of the seat. In the alternative, a bladder having at least one chamber may be arranged in a seat portion of the seat for measuring the force or pressure applied onto at least a portion of the seat.

The adjustment system and method for adjusting a component of a vehicle based on the presence of an object on a seat include a wave-receiving sensor as described immediately above, weight measuring means as described above, adjustment means arranged in connection with the component for adjusting the component, and processor means for receiving the outputs from the wave-receiving sensor and the weight measuring means and for evaluating the seated-state of the seat based thereon to determine whether the seat is occupied by an object and when the seat is occupied by an object, to ascertain the identity of the object in the seat based on the outputs from the wave-receiving sensor and the weight measuring means. The processor means also direct the adjustment means to adjust the component based at least on the identity of the object.

If the component is an airbag system, the processor means may be designed to direct the adjustment means to suppress deployment of the airbag when the object is identified as an object for which deployment of the airbag is unnecessary or would be more likely to harm the object than protect the object, depowering the deployment of the airbag or affect any deployment parameter, e.g., the inflation rate, deflation rate, number of deploying airbags, deployment rate, etc. Thus, the component may be a valve for regulating the flow of gas into or out of an airbag.

Another embodiment of the apparatus in accordance with invention includes a first measuring system for measuring a first morphological characteristic of the occupying item of the seat and a second measuring system for measuring a second morphological characteristic of the occupying item. Morphological characteristic include the weight of the occupying item, the height of the occupying item from the bottom portion of the seat and if the occupying item is a human, the arm length, head diameter, facial features, fingerprint, handprint, voiceprint, iris pattern, leg length and dielectric properties. The apparatus also includes processor means for receiving the output of the first and second measuring systems and for processing the outputs to evaluate a seated-state based on the outputs. The measuring systems described herein, as well as any other conventional measuring systems, may be used in the invention to measure the morphological characteristics of the occupying item.

One preferred embodiment of an adjustment system in accordance with the invention includes a plurality of wave-receiving sensors for receiving waves from the seat and its contents, if any, and one or more weight sensors for detecting weight of an occupant in the seat or an absence of weight applied onto the seat indicative of a vacant seat. The apparatus also includes processor means for receiving the output of the wave-receiving sensors and the weight sensor(s) and for processing the outputs to evaluate a seated-state based on the outputs. The processor means then adjust a part of the component or the component in its entirety based at least on the evaluation of the seated-state of the seat. The wave-receiving sensors may be ultrasonic sensors, optical sensors or electromagnetic sensors operating at other than optical frequencies. If the wave-receiving sensors are ultrasonic or optical sensors, then they may also include transmitter means for transmitting ultrasonic or optical waves toward the seat. For the purposes herein, optical is used to include the infrared, visible and ultraviolet parts of the electromagnetic spectrum.

If the component is a seat, the system includes power means for moving at least one portion of the seat relative to the passenger compartment and control means connected to the power means for controlling the power means to move the portion(s) of the seat. In this case, the processor means may direct the control means to affect the power means based at least in part on the evaluation of the seated-state of the seat. With respect to the direction or regulation of the control means by the processor means, this may take the form of a regulation signal to the control means that no seat adjustment is needed, e.g., if the seat is occupied by a bag of groceries or a child seat in a rear or forward-facing position as determined by the evaluation of the output from the ultrasonic or optical and weight sensors. On the other hand, if the processor means determines that the seat is occupied by an adult or child for which adjustment of the seat is beneficial or desired, then the processor means may direct the control means to affect the power means accordingly. For example, if a child is detected on the seat, the processor means may be designed to lower the headrest.

In certain embodiments, the apparatus may include one or more sensors each of which measures a morphological characteristic of the occupying item of the seat, e.g., the height, weight or dielectric properties of the occupying item, and the processor means are arranged to obtain the input from these sensors and adjust the component accordingly. Thus, once the processor means evaluates the occupancy of the seat and determines that the occupancy is by an adult or child, then the processor means may additionally use either the obtained weight measurement or conduct additional measurements of morphological characteristics of the adult or child occupant and adjust the component accordingly. The processor means may be a single microprocessor for performing all of the functions described above. In the alternative, one microprocessor may be used for evaluating the occupancy of the seat and another for adjusting the component.

The processor means may comprise an evaluation circuit implemented in hardware as an electronic circuit or in software as a computer program or a combination thereof.

In certain embodiments, a correlation function or state between the output of the various sensors and the desired result (i.e., seat occupancy identification and categorization) is determined, e.g., by a neural network that may be implemented in hardware as a neural computer or in software as a computer program. The correlation function or state that is determined by employing this neural network may also be contained in a microcomputer. In this case, the microcomputer can be employed as an evaluation circuit. The word circuit herein will be used to mean both an electronic circuit and the functional equivalent implemented on a microcomputer using software.

In enhanced embodiments, a heartbeat or animal life state sensor may be provided for detecting the heartbeat of the occupant if present or animal life state and generating an output representative thereof The processor means additionally receives this output and evaluates the seated-state of the seat based in part thereon. In addition to or instead of such a heartbeat or animal life state sensor, a capacitive or electric field sensor and/or a motion sensor may be provided. The capacitive sensor is a particular implementation of an electromagnetic wave sensor that detects the presence of the occupant and generates an output representative of the presence of the occupant based on its dielectric properties. The motion sensor detects movement of the occupant and generates an output representative thereof. These outputs are provided to the processor means for possible use in the evaluation of the seated-state of the seat.

The portion of the apparatus which includes the ultrasonic, optical or non-optical electromagnetic sensors, weight measuring means and processor means which evaluate the occupancy of the seat based on the measured weight of the seat and its contents and the returned waves from the ultrasonic, optical or non-optical electromagnetic sensors may be considered to constitute a seated-state detecting unit.

The seated-state detecting unit may further comprise a seat position-detecting sensor. This sensor determines the position of the seat in the forward and aft direction. In this case, the evaluation circuit evaluates the seated-state, based on a correlation function obtained from outputs of the ultrasonic sensors, an output of the one or more weight sensors, and an output of the seat position detecting sensor. With this structure, there is the advantage that the identification between the flat configuration of a detected surface in a state where a passenger is not sitting in the seat and the flat configuration of a detected surface which is detected when a seat is slid backwards by the amount of the thickness of a passenger, that is, of identification of whether a passenger seat is vacant or occupied by a passenger, can be reliably performed.

Furthermore, the seated-state detecting unit may also comprise a seat back reclining angle detecting sensor, and the evaluation circuit may also evaluate the seated-state based on a correlation function obtained from outputs of the ultrasonic, optical or non-optical electromagnetic sensors, an output of the weight sensor(s), and an output of the seat back reclining angle detecting sensor. In this case, if the tilted angle information of the back portion of the seat is added as evaluation information for the seated-state, identification can be clearly performed between the flat configuration of a surface detected when a passenger is in a slightly slouching state and the configuration of a surface detected when the back portion of a seat is slightly tilted forward and similar difficult-to-discriminate cases. This embodiment may even be combined with the output from a seat position-detecting sensor to further enhance the evaluation circuit.

Moreover, the seated-state detecting unit may further comprise a comparison circuit for comparing the output of the weight sensor(s) with a reference value. In this case, the evaluation circuit identifies an adult and a child based on the reference value.

The seated-state detecting unit may comprise a plurality of ultrasonic, optical or non-optical electromagnetic sensors for transmitting ultrasonic or electromagnetic waves toward a seat and receiving reflected waves from the seat; one or more weight sensors for detecting weight of a passenger in the seat; a seat position detecting sensor; a reclining angle detecting sensor; and a neural network to which outputs of the ultrasonic or electromagnetic sensors and the weight sensor(s), an output of the seat position detecting sensor, and an output of the reclining angle detecting sensor are inputted and which evaluates several kinds of seated-states, based on a correlation function obtained from the outputs.

The kinds of seated-states that can be evaluated and categorized by the neural network include the following categories, among others, (i) a normally seated passenger and a forward facing child seat, (ii) an abnormally seated passenger and a rear-facing child seat, and (iii) a vacant seat.

The seated-state detecting unit may further comprise a comparison circuit for comparing the output of the weight sensor(s) with a reference value and a gate circuit to which the evaluation signal and a comparison signal from the comparison circuit are input. This gate circuit, which may be implemented in software or hardware, outputs signals which evaluates several kinds of seated-states. These kinds of seated-states can include a (i) normally seated passenger, (ii) a forward facing child seat, (iii) an abnormally seated passenger, (iv) a rear facing child seat, and (v) a vacant seat. With this arrangement, the identification between a normally seated passenger and a forward facing child seat, the identification between an abnormally seated passenger and a rear facing child seat, and the identification of a vacant seat can be more reliably performed.

The outputs of the ultrasonic or electromagnetic sensors, the output of the weight sensor(s), the outputs of the seat position detecting sensor, and the outputs of the reclining angle detecting sensor are inputted to the neural network or other pattern recognition circuit, and the neural network determines the correlation function, based on training thereof during a training phase. The correlation function is then typically implemented in or incorporated into a microcomputer. For the purposes herein, neural network will be used to include both a single neural network, a plurality of neural networks (including serial and parallel modular neural networks, ensemble neural networks, vector support machines etc.), and other similar pattern recognition circuits or algorithms and combinations thereof.

For the ultrasonic implementation, to provide the input from the ultrasonic sensors to the neural network (circuit), it is preferable that an initial reflected wave portion and a last reflected wave portion are removed from each of the reflected waves of the ultrasonic sensors and then the output data is processed. The neural network determines the correlation function by performing a weighting process, based on output data from the plurality of ultrasonic sensors, output data from the weight sensor(s), output data from the seat position detecting sensor if present, and/or on output data from the reclining angle detecting sensor if present and any other relevant sensors.

With this arrangement, the portions of the reflected ultrasonic wave that do not contain useful information are removed from the analysis and the presence and recognition of an object on the passenger seat can be more accurately performed. Similar data pruning can take place with electromagnetic sensors.

In a disclosed method for determining the occupancy of a seat in a passenger compartment of a vehicle in accordance with the invention, waves such as ultrasonic or electromagnetic waves are transmitted into the passenger compartment toward the seat, reflected or modified waves from the passenger compartment are received by a component which then generates an output representative thereof, the weight applied onto the seat is measured and an output is generated representative thereof and then the seated-state of the seat is evaluated based on the outputs from the sensors and the weight measuring means.

The evaluation the seated-state of the seat may be accomplished by generating a function correlating the outputs representative of the received waves and the measured weight and the seated-state of the seat, and incorporating the correlation function into a microcomputer. In the alternative, it is possible to generate a function correlating the outputs representative of the received waves and the measured weight and the seated-state of the seat in a neural network (circuit), and execute the function using the outputs representative of the received waves and the measured weight as input into the neural network.

To enhance the seated-state determination, the position of a seat is measured and an output representative thereof is generated, and then the seated-state of the seat is evaluated based on the outputs representative of the received reflected waves, the measured weight and the measured seat position. In addition to or instead of measuring the seat position, it is possible to measure the reclining angle of the seat, i.e., the angle between the seat portion and the back portion of the seat, and generate an output representative thereof, and then evaluate the seated-state of the seat based on the outputs representative of the received waves, the measured weight and the measured reclining angle of the seat (and seat position, if measured).

Furthermore, the output representative of the measured weight may be compared with a reference value, and the occupying object of the seat identified, e.g., as an adult or a child, based on the comparison of the measured weight with the reference value.

In additional embodiments, the present invention involves the measurement of one or more morphological characteristics of a vehicle occupant and the use of these measurements to classify the occupant as to size and weight, and then to use this classification to position a vehicle component, such as the seat, to a near optimum position for that class of occupant. Additional information concerning occupant preferences can also be associated with the occupant class so that when a person belonging to that particular class occupies the vehicle, the preferences associated with that class are implemented. These preferences and associated component adjustments include the seat location after it has been manually adjusted away from the position chosen initially by the system, the mirror location, temperature, radio station, steering wheel and steering column positions, pedal positions etc. The preferred morphological characteristics used are the occupant height from the vehicle seat, weight of the occupant and facial features. The height is determined by sensors, usually ultrasonic or electromagnetic, located in the headrest, headliner or another convenient location. The weight is determined by one of a variety of technologies that measure either pressure on or displacement of the vehicle seat or the force in the seat supporting structure. The facial features are determined by image analysis comprising an imager such as a CCD or CMOS camera plus additional hardware and software.

The preferred system of measuring weight on the occupancy seat is disclosed in co-pending U.S. patent application Ser. No. 09/193,209, filed Nov. 17, 1988, which is incorporated herein by reference. This patent application describes a weighing system based on the force or strain imparted to the seat structure by the seat occupant. Preferably, the invention is implemented by placing strain gage sensors on the main supporting structures of the vehicle seat. An alternate approach, which will be described in more detail below, utilizes a bladder, which can have one or more chambers, wherein at least one chamber has a pressure sensor capable of measuring the pressure of the fluid in the chamber. The chambers may be filled with air or other gas, liquid or a jell. The chambers may be fluid connected or isolated. A single chamber is sufficient if the overall weight of the occupant is desired. If the weight distribution of the occupant is required, then multiple chambers become necessary. If the bladder is properly designed, then the total weight of the occupant can be determined by summing the forces on the individual chambers (pressure×area). One example of the system will be described in more detail below.

Accordingly, in order to achieve one or more of the objects above, a vehicle seat structure comprises a seat defining a surface adapted to contact an occupying item and a weight sensor arrangement arranged in connection with the seat for providing an indication of the weight applied by the occupying item to the surface of the seat. The weight sensor arrangement includes conductive members spaced apart from one another such that a capacitance develops between opposed ones of conductive members upon incorporation of the conductive members in an electrical circuit. The capacitance is based on the space between the conductive members which varies in relation to the weight applied by the occupying item to the surface of the seat. The weight sensor arrangement may include a pair of non-metallic substrates and a layer of material situated between the non-metallic substrates, possibly a compressible material. The conductive members may comprise a first electrode arranged on a first side of the material layer and a second electrode arranged on a second side of the material layer. The weight sensor arrangement may be arranged in connection with slide mechanisms adapted to support the seat on a substrate of the vehicle while enabling movement of the seat, possibly between the slide mechanisms and the seat or between the floor and the slide mechanism. If bolts attach the seat to the slide mechanisms, the conductive members may be annular and placed on the bolts.

Another embodiment of a seat structure comprises a seat defining a surface adapted to contact an occupying item, slide mechanisms adapted to support the seat on a substrate of the vehicle while enabling movement of the seat and a weight sensor arrangement interposed between the seat and the slide mechanisms for measuring displacement of the seat which provides an indication of the weight applied by the occupying item to the seat. The weight sensor arrangement can include a capacitance sensor which measures a capacitance which varies in relation to the displacement of the seat. The capacitance sensor can include conductive members spaced apart from one another such that a capacitance develops between opposed ones of the conductive members upon incorporation of the members in an electrical circuit, the capacitance being based on the space between the members which varies in relation to the weight applied by the occupying item to the seat.

The weight sensor arrangement can comprise a spring system arranged underneath a seat cushion and a sensor arranged in association with the spring system for generating a signal based on downward movement of the cushion caused by occupancy of the seat which is indicative of the weight of the occupying item. The sensor may be a displacement sensor structured and arranged to measure displacement of the spring system caused by occupancy of the seat. Such a sensor can comprise a spring retained at both ends and which is tensioned upon downward movement of the spring system and measuring means for measuring a force in the spring indicative of weight of the occupying item. The measuring means can comprise a strain gage for measuring strain of the spring or a force-measuring device.

The sensor may also comprise a support, a cable retained at one end by the support and a length-measuring device arranged at an opposite end of the cable for measuring elongation of the cable indicative of weight of the occupying item. The sensor can also comprises one or more SAW strain gages and/or structured and arranged to measure a physical state of the spring system. If a bladder weight sensor is used, the pressure sensor can be a SAW based pressure sensor.

In one weight measuring method in accordance with the invention disclosed above, at least one strain gage transducer is mounted at a respective location on the support structure and provides a measurement of the strain of the support structure at that location, and the weight of the occupying item of the seat is determined based on the strain of the support structure measured by the strain gage transducer(s). In another method, the seat includes the slide mechanisms for mounting the seat to a substrate and bolts for mounting the seat to the slide mechanisms, the pressure exerted on the seat is measured by at least one pressure sensor arranged between one of the slide mechanisms and the seat. Each pressure sensor typically comprises first and second layers of shock absorbing material spaced from one another and a pressure sensitive material interposed between the first and second layers of shock absorbing material. The weight of the occupying item of the seat is determined based on the pressure measured by the at least one pressure sensor.

In still another method for measuring the weight of an occupying item of a seat, a load cell is mounted between the seat and a substrate on which the seat is supported. The load cell includes a member and a strain gage arranged thereon to measure tensile strain therein caused by weight of an occupying item of the seat. The weight of the occupying item of the seat is determined based on the strain in the member measured by the strain gage. Naturally, the load cell can be incorporated at other locations in the seat support structure and need not be between the seat and substrate. In such a case, however, the seat would need to be especially designed for that particular mounting location. The seat would then become the weight measuring device.

Furthermore, although the weight measuring system and apparatus described above are described for particular use in a vehicle, it is of course possible to apply the same constructions to measure the weight of an occupying item on other seats in non-vehicular applications, if a weight measurement is desired for some purpose.

Thus, disclosed above are apparatus for measuring the weight of an occupying item of a seat including at least one strain gage transducer, each mounted at a respective location on a support structure of the seat and arranged to provide a measurement of the strain of the support structure thereat. A control system is coupled to the strain gage transducer(s) for determining the weight of the occupying item of the seat based on the strain of the support structure measured by the strain gage transducer(s). The support structure of the seat is mounted to a substrate such as a floor pan of a motor vehicle. Electrical connection means such as wires connect the strain gage transducer(s) to the control system. Each strain gage transducer may incorporate signal conditioning circuitry and an analog to digital converter such that the measured strain is output as a digital signal. The positioning of the strain gage transducer(s) depends in large part on the actual construction of the support structure of the seat. Thus, when the support structure comprises two elongate slide mechanisms adapted to be mounted on the substrate and support members for coupling the seat to the slide mechanisms, several strain gage transducers may be used, each arranged on a respective support member. If the support structure further includes a slide member, another strain gage transducer may be mounted thereon. Means for increasing the accuracy of the strain gage transducers and/or concentrating the strain caused by occupancy of the seat are advantageous and include, for example, forming a support member from first and second tubes having longitudinally opposed ends and a third tube overlying the opposed ends of the first and second tubes and connected to the first and second tubes whereby a strain gage transducer is arranged on the third tube. Naturally, other structural shapes may be used in place of one or more of the tubes.

Another disclosed embodiment of an apparatus for measuring the weight of an occupying item of a seat includes slide mechanisms for mounting the seat to a substrate and bolts for mounting the seat to the slide mechanisms, the apparatus comprises at least one pressure sensor arranged between one of the slide mechanisms and the seat, and/or between the slide mechanism and the floor pan, for measuring pressure exerted on the seat. Each pressure sensor may comprise first and second layers of shock absorbing material spaced from one another and a pressure sensitive material interposed between the first and second layers of shock absorbing material. A control system is coupled to the pressure sensitive material for determining the weight of the occupying item of the seat based on the pressure measured by the at least one pressure sensor. The pressure sensitive material may include an electrode on upper and lower faces thereof.

Another disclosed embodiment of an apparatus for measuring the weight of an occupying item of a seat includes a load cell adapted to be mounted to the seat and to a substrate on which the seat is supported. The load cell includes a member and a strain gage arranged thereon to measure tensile strain in the member caused by weight of an occupying item of the seat. A control system is coupled to the strain gage for determining the weight of an occupying item of the seat based on the strain in the member measured by the strain gage. If the member is a beam and the strain gage includes two strain sensing elements, then one strain-sensing element is arranged in a longitudinal direction of the beam and the other is arranged in a transverse direction of the beam. If four strain sensing elements are present, a first pair is arranged in a longitudinal direction of the beam and a second pair is arranged in a transverse direction of the beam. The member may be a tube in which case, a strain-sensing element is arranged on the tube to measure compressive strain in the tube and another strain sensing element is arranged on the tube to measure tensile strain in the tube. The member may also be an elongate torsion bar mounted at its ends to the substrate. In this case, the load cell includes a lever arranged between the ends of the torsion bar and connected to the seat such that a torque is imparted to the torsion bar upon weight being exerted on the seat. The strain gage thus includes a torsional strain-sensing element.

Furthermore, disclosed herein is, a vehicle seat comprises a cushion defining a surface adapted to support an occupying item, a spring system arranged underneath the cushion and a sensor arranged in association with the spring system for generating a signal based on downward movement of the cushion and/or spring system caused by occupancy of the seat which is indicative of the weight of the occupying item. The spring system may be in contact with the sensor. The sensor may be a displacement sensor structured and arranged to measure displacement of the spring system caused by occupancy of the seat. In the alternative, the sensor may be designed to measure deflection of a bottom of the cushion, e.g., placed on the bottom of the cushion. Instead of a displacement sensor, the sensor can comprise a spring retained at both ends and which is tensioned upon downward movement of the spring system and measuring means for measuring a force in the spring indicative of weight of the occupying item. Non-limiting constructions of the measuring means include a strain gage for measuring strain of the spring or measuring means comprise a force measuring device. The sensor can also comprises a support, a cable retained at one end by the support and a length-measuring device arranged at an opposite end of the cable for measuring elongation of the cable indicative of weight of the occupying item. In this case, the length measuring device may comprises a cylinder, a rod arranged in the cylinder and connected to the opposite end of the cable, a spring arranged in the cylinder and connected to the rod to resist elongation of the cable and windings arranged in the cylinder. The amount of coupling between the windings provides an indication of the extent of elongation of the cable. A strain gage can also be used to measure the change in length of the cable. In one particular embodiment, the sensor comprises one or more strain gages structured and arranged to measure a physical state of the spring system or the seat. Electrical connection means such as wires connect the strain gage(s) to the control system. Each strain gage transducer may incorporate signal conditioning circuitry and an analog to digital converter such that the measured strain is output as a digital signal. Alternately, a surface acoustical wave (SAW) strain gage can be used in place of conventional wire, foil or silicon strain gages and the strain measured either wirelessly or by a wire connection. For SAW strain gages, the electronic signal conditioning can be associated directly with the gage or remotely in an electronic control module as desired.

In a method for measuring weight of an occupying item on a seat cushion of a vehicle, a spring system is arranged underneath the cushion and a sensor is arranged in association with the cushion for generating a signal based on downward movement of the cushion and/or spring system caused by the occupying item which is indicative of the weight of the occupying item. The particular constructions of the spring system and sensor discussed above can be implemented in the method.

Another embodiment of a weight sensor system comprises a spring system adapted to be arranged underneath the cushion and extend between the supports and a sensor arranged in association with the spring system for generating a signal indicative of the weight applied to the cushion based on downward movement of the cushion and/or spring system caused by the weight applied to the seat. The particular constructions of the spring system and sensor discussed above can be implemented in this embodiment.

An embodiment of a vehicle including an arrangement for controlling a component based on an occupying item of the vehicle comprises a cushion defining a surface adapted to support the occupying item, a spring system arranged underneath the cushion, a sensor arranged in association with the spring system for generating a signal indicative of the weight of the occupying item based on downward movement of the cushion and/or spring system caused by occupancy of the seat and a processor coupled to the sensor for receiving the signal indicative of the weight of the occupying item and generating a control signal for controlling the component. The particular constructions of the spring system and sensor discussed above can be implemented in this embodiment. The component may be an airbag module or several airbag modules, or any other type of occupant protection or restraint device.

A method for controlling a component in a vehicle based on an occupying item comprises the steps of arranging a spring system arranged underneath a cushion on which the occupying item may rest, arranging a sensor in association with the cushion for generating a signal based on downward movement of the cushion and/or spring system caused by the occupying item which is indicative of the weight of the occupying item, and controlling the component based on the signal indicative of the weight of the occupying item. The particular constructions of the spring system and sensor discussed above can be implemented in this method.

Further, disclosed above is a vehicle seat structure which comprises a seat or cushion defining a surface adapted to contact an occupying item, slide mechanisms coupled to the seat for enabling movement of the seat, support members for supporting the seat on the slide mechanisms such that at least a portion of the weight of the occupying item passes through the support members. At least one of the support members has a region with a lower stiffness than a remaining region of the support member. The remaining regions of the support member are not necessarily the entire remaining portions of the support member and they may be multiple regions with a lower stiffness than other regions. A strain gage measurement system generates a signal indicative of the weight of the occupying item. The strain gage measurement system includes at least one strain gage transducer arranged in a lower stiffness region of the support member to measure strain thereof. The support member(s) may be tubular whereby the lower stiffness region has a smaller diameter than a diameter of the remaining region. If the support member is not tubular, the lower stiffness region may have a smaller circumference than a circumference of a remaining region of the support member. Each support member may have a first end connected to one of the slide mechanisms and a second end connected to the seat. Electrical connection means, such as wires or electromagnetic waves which transfer power wirelessly, connect the strain gage transducer(s) to the control system. Each strain gage transducer may incorporate signal conditioning circuitry and an analog to digital converter such that the measured strain is output as a digital signal. Alternately, a surface acoustical wave (SAW) strain gage can be used in place of conventional wire, foil or silicon strain gages and the strain transmitted either wirelessly or by a wire connection. For SAW strain gages, the electronic signal conditioning can be associated directly with the gage or remotely in an electronic control module as desired. The strain gage measurement system preferably includes at least one additional strain gage transducer arranged on another support member and a control system coupled to the strain gage transducers for receiving the strain measured by the strain gage transducers and providing the signal indicative of the weight of the occupying item.

In a method for measuring weight of an occupying item in a vehicle seat disclosed above, support members are interposed between the seat and slide mechanisms which enable movement of the seat and such that at least a portion of the weight of the occupying item passes through the support members, at least one of the support members is provided with a region having a lower stiffness than a remaining region, at least one strain gage transducer is arranged in the lower stiffness region of the support member to measure strain thereof and an indication of the weight of the occupying item is obtained based at least in part on the strain of the lower stiffness region of the support member measured by the strain gage transducer(s). The support member(s) may be formed by providing an elongate member and cutting around the circumference of the elongate member to thereby obtain the lower stiffness region or by other means.

A vehicular arrangement for controlling a component based on an occupying item of the vehicle disclosed herein comprises a seat defining a surface adapted to contact the occupying item, slide mechanisms coupled to the seat for enabling movement of the seat, support members for supporting the seat on the slide mechanisms such that at least a portion of the weight of the occupying item passes through the support members. At least one of the support members has a region with a lower stiffness than a remaining region of the support member. A strain gage measurement system generates a signal indicative of the weight of the occupying item, and a processor coupled to the strain gage measurement system receives the signal indicative of the weight of the occupying item and generates a control signal for controlling the component. The strain gage measurement system includes at least one strain gage transducer arranged in the lower stiffness region of the support member to measure strain thereof. The component can be any vehicular component, system or subsystem which can utilize the weight of the occupying item of the seat for control, e.g., an airbag system.

Another method for controlling a component in a vehicle based on an occupying item disclosed herein comprises the steps of interposing support members between a seat on which the occupying item may rest and slide mechanisms which enable movement of the seat and such that at least a portion of the weight of the occupying item passes through the support members, providing at least one of the support members with a region having a lower stiffness than a remaining region, arranging at least one strain gage transducer in the lower stiffness region of the support member to measure strain thereof, and controlling the component based at least in part on the strain of the lower stiffness region of the support member measured by the strain gage transducer(s). If the component is an airbag, the step of controlling the component can entail controlling the rate of deployment of the airbag, the start time of deployment, the inflation rate of the airbag, the rate of gas removal from the airbag and/or the maximum pressure in the airbag. In another weight measuring system, one or more of the connecting members which connect the seat to the slide mechanisms comprises an elongate stud having first and second threaded end regions and an unthreaded intermediate region between the first and second threaded end regions, the first threaded end region engaging the seat and the second threaded end region engaging one of the slide mechanisms, and a strain gage measurement system arranged on the unthreaded intermediate region for measuring strain in the connecting member at the unthreaded intermediate region which is indicative of weight being applied by an occupying item in the seat. The strain gage measurement system may comprises a SAW strain gage and associated circuitry and electric components capable of receiving a wave and transmitting a wave modified by virtue of the strain in the connecting member, e.g., an antenna. The connecting member can be made of a non-metallic, composite material to avoid problems with the electromagnetic wave propagation. An interrogator may be provided for communicating wirelessly with the SAW strain gage measurement system.

The weight measuring apparatus described above may be used in apparatus and methods for adjusting a vehicle component, although other weight measuring apparatus may also be used in the vehicle component adjusting systems and methods described immediately below.

One embodiment of such an apparatus in accordance with invention includes a first measuring system for measuring a first morphological characteristic of the occupying item of the seat and a second measuring system for measuring a second morphological characteristic of the occupying item. Morphological characteristics include the weight of the occupying item, the height of the occupying item from the bottom portion of the seat and if the occupying item is a human, the arm length, head diameter, facial features and leg length. The apparatus also includes processor means for receiving the output of the first and second measuring systems and for processing the outputs to evaluate a seated-state based on the outputs. The measuring systems described herein, as well as any other conventional measuring systems, may be used in the invention to measure the morphological characteristics of the occupying item.

One preferred embodiment of an adjustment system in accordance with the invention includes a plurality of wave-receiving sensors for receiving waves from the seat and its contents, if any, and one or more weight sensors for detecting weight of an occupant in the seat or an absence of weight applied onto the seat indicative of a vacant seat. The weight sensing apparatus may include strain sensors mounted on or associated with the seat structure such that the strain measuring elements respond to the magnitude of the weight of the occupying item. The apparatus also includes processor means for receiving the output of the wave-receiving sensors and the weight sensor(s) and for processing the outputs to evaluate a seated-state based on the outputs. The processor means then adjusts a part of the component or the component in its entirety based at least on the evaluation of the seated-state of the seat. The wave-receiving sensors may be ultrasonic sensors, optical sensors or electromagnetic sensors. If the wave-receiving sensors are ultrasonic or optical sensors, then they may also include transmitter means for transmitting ultrasonic or optical waves toward the seat. If the component is a seat, the system includes power means for moving at least one portion of the seat relative to the passenger compartment and control means connected to the power means for controlling the power means to move the portion(s) of the seat. In this case, the processor means may direct the control means to affect the power means based at least in part on the evaluation of the seated-state of the seat. With respect to the direction or regulation of the control means by the processor means, this may take the form of a regulation signal to the control means that no seat adjustment is needed, e.g., if the seat is occupied by a bag of groceries or a child seat in a rear or forward-facing position as determined by the evaluation of the output from the ultrasonic or optical and weight sensors. On the other hand, if the processor means determines that the seat is occupied by an adult or child for which adjustment of the seat is beneficial or desired, then the processor means may direct the control means to affect the power means accordingly. For example, if a child is detected on the seat, the processor means may be designed to lower the headrest. In certain embodiments, the apparatus may include one or more sensors each of which measures a morphological characteristic of the occupying item of the seat, e.g., the height or weight of the occupying item, and the processor means are arranged to obtain the input from these sensors and adjust the component accordingly. Thus, once the processor means evaluates the occupancy of the seat and determines that the occupancy is by an adult or child, then the processor means may additionally use either the obtained weight measurement or conduct additional measurements of morphological characteristics of the adult or child occupant and adjust the component accordingly. The processor means may be a single microprocessor for performing all of the functions described above. In the alternative, one microprocessor may be used for evaluating the occupancy of the seat and another for adjusting the component. The processor means may comprise an evaluation circuit implemented in hardware as an electronic circuit or in software as a computer program. In certain embodiments, a correlation function or state between the output of the various sensors and the desired result (i.e., seat occupancy identification and categorization) is determined, e.g., by a neural network that may be implemented in hardware as a neural computer or in software as a computer program. The correlation function or state that is determined by employing this neural network may also be contained in a microcomputer. In this case, the microcomputer can be employed as an evaluation circuit. The word circuit herein will be used to mean both an electronic circuit and the functional equivalent implemented on a microcomputer using software. In enhanced embodiments, a heartbeat sensor may be provided for detecting the heartbeat of the occupant and generating an output representative thereof. The processor means additionally receive this output and evaluate the seated-state of the seat based in part thereon. In addition to or instead of such a heartbeat sensor, a capacitive or electric field sensor and/or a motion sensor may be provided. The capacitive or electric field sensor detects the presence of the occupant and generates an output representative of the presence of the occupant. The motion sensor detects movement of the occupant and generates an output representative thereof. These outputs are provided to the processor means for possible use in the evaluation of the seated-state of the seat.

The portion of the apparatus which includes the ultrasonic, optical or electromagnetic sensors, weight measuring means and processor means which evaluate the occupancy of the seat based on the measured weight of the seat and its contents and the returned waves from the ultrasonic, optical or electromagnetic sensors may be considered to constitute a seated-state detecting unit. The seated-state detecting unit may further comprise a seat track position-detecting sensor. This sensor determines the position of the seat on the seat track in the forward and aft direction. In this case, the evaluation circuit evaluates the seated-state, based on a correlation function obtained from outputs of the ultrasonic sensors, an output of the one or more weight sensors, and an output of the seat track position detecting sensor. With this structure, there is the advantage that the identification between the flat configuration of a detected surface in a state where a passenger is not sitting in the seat and the flat configuration of a detected surface which is detected when a seat is slid backwards by the amount of the thickness of a passenger, that is, of identification of whether a passenger seat is vacant or occupied by a passenger, can be reliably performed. Furthermore, the seated-state detecting unit may also comprise a reclining angle detecting sensor, and the evaluation circuit may also evaluate the seated-state based on a correlation function obtained from outputs of the ultrasonic, optical or electromagnetic sensors, an output of the weight sensor(s), and an output of the reclining angle detecting sensor. In this case, if the tilted angle information of the back portion of the seat is added as evaluation information for the seated-state, identification can be clearly performed between the flat configuration of a surface detected when a passenger is in a slightly slouching state and the configuration of a surface detected when the back portion of a seat is slightly tilted forward and similar difficult-to-discriminate cases.

This embodiment may even be combined with the output from a seat track position-detecting sensor to further enhance the evaluation circuit. Moreover, the seated-state detecting unit may further comprise a comparison circuit for comparing the output of the weight sensor(s) with a reference value. In this case, the evaluation circuit identifies an adult and a child based on the reference value. Preferably, the seated-state detecting unit comprises: a plurality of ultrasonic, optical or electromagnetic sensors for transmitting ultrasonic or electromagnetic waves toward a seat and receiving reflected waves from the seat; one or more weight sensors for detecting weight of a passenger in the seat; a seat track position detecting sensor; a reclining angle detecting sensor; and a neural network circuit to which outputs of the ultrasonic or electromagnetic sensors and the weight sensor(s), an output of the seat track position detecting sensor, and an output of the reclining angle detecting sensor are inputted and which evaluates several kinds of seated-states, based on a correlation function obtained from the outputs. The kinds of seated-states that can be evaluated and categorized by the neural network include the following categories, among others, (i) a normally seated passenger and a forward facing child seat, (ii) an abnormally seated passenger and a rear-facing child seat, and (iii) a vacant seat. The seated-state detecting unit may further comprise a comparison circuit for comparing the output of the weight sensor(s) with a reference value and a gate circuit to which the evaluation signal and a comparison signal from the comparison circuit are input. This gate circuit, which may be implemented in software or hardware, outputs signals which evaluates several kinds of seated-states. These kinds of seated-states can include a (i) normally seated passenger, (ii) a forward facing child seat, (iii) an abnormally seated passenger, (iv) a rear facing child seat, and (v) a vacant seat. With this arrangement, the identification between a normally seated passenger and a forward facing child seat, the identification between an abnormally seated passenger and a rear facing child seat, and the identification of a vacant seat can be more reliably performed. The outputs of the plurality of ultrasonic or electromagnetic sensors, the output of the weight sensor(s), the outputs of the seat track position detecting sensor, and the outputs of the reclining angle detecting sensor are inputted to the neural network or other pattern recognition circuit, and the neural network circuit determines the correlation function, based on training thereof during a training phase. The correlation function is then typically implemented in or incorporated into a microcomputer. For the purposes herein, neural network will be used to include both a single neural network, a plurality of neural networks, and other similar pattern recognition circuits or algorithms and combinations thereof including the combination of neural networks and fuzzy logic systems such as neural-fuzzy systems. To provide the input from the ultrasonic or electromagnetic sensors to the neural network circuit, it is preferable that an initial reflected wave portion and a last reflected wave portion are removed from each of the reflected waves of the ultrasonic or electromagnetic sensors and then the output data is processed. This is a form of range gating. With this arrangement, the portions of the reflected ultrasonic or electromagnetic wave that do not contain useful information are removed from the analysis and the presence and recognition of an object on the passenger seat can be more accurately performed. The neural network circuit determines the correlation function by performing a weighting process, based on output data from the plurality of ultrasonic or electromagnetic sensors, output data from the weight sensor(s), output data from the seat track position detecting sensor if present, and/or on output data from the reclining angle detecting sensor if present. Additionally, in advanced systems, outputs from the heartbeat and occupant motion sensors may be included.

In a disclosed method for determining the occupancy of a seat in a passenger compartment of a vehicle in accordance with the invention, waves such as ultrasonic or electromagnetic waves are transmitted into the passenger compartment toward the seat, reflected waves from the passenger compartment are received by a component which then generates an output representative thereof, the weight applied onto the seat is measured and an output is generated representative thereof and then the seated-state of the seat is evaluated based on the outputs from the sensors and the weight measuring means. The evaluation the seated-state of the seat may be accomplished by generating a function correlating the outputs representative of the received reflected waves and the measured weight and the seated-state of the seat, and incorporating the correlation function into a microcomputer. In the alternative, it is possible to generate a function correlating the outputs representative of the received reflected waves and the measured weight and the seated-state of the seat in a neural network circuit, and execute the function using the outputs representative of the received reflected waves and the measured weight as input into the neural network circuit. To enhance the seated-state determination, the position of a seat track of the seat is measured and an output representative thereof is generated, and then the seated-state of the seat is evaluated on the outputs representative of the received reflected waves, the measured weight and the measured seat track position. In addition to or instead of measuring the seat track position, it is possible to measure the reclining angle of the seat, i.e., the angle between the seat portion and the back portion of the seat, and generate an output representative thereof, and then evaluate the seated-state of the seat based on the outputs representative of the received reflected waves, the measured weight and the measured reclining angle of the seat (and seat track position, if measured). Furthermore, the output representative of the measured weight may be compared with a reference value, and the occupying object of the seat identified, e.g., as an adult or a child, based on the comparison of the measured weight with the reference value.

In additional embodiments, the present invention involves the measurement of one or more morphological characteristics of a vehicle occupant and the use of these measurements to classify the occupant as to size and weight, and then to use this classification to position a vehicle component, such as the seat, to a near optimum position for that class of occupant. Additional information concerning occupant preferences can also be associated with the occupant class so that when a person belonging to that particular class occupies the vehicle, the preferences associated with that class are implemented. These preferences and associated component adjustments include the seat location after it has been manually adjusted away from the position chosen initially by the system, the mirror location, temperature, radio station, visor, steering wheel and steering column positions, etc. The preferred morphological characteristics used are the occupant height from the vehicle seat and weight of the occupant. The height is determined by sensors, usually ultrasonic or electromagnetic, located in the headrest or another convenient location. The weight is determined by one of a variety of technologies that measure either pressure on or displacement of the vehicle seat or the force or strain in the seat supporting structure.

Although several preferred embodiments are illustrated and described above, there are possible combinations using other geometries, sensors, materials and different dimensions for the components that perform the same functions. This invention is not limited to the above embodiments and should be determined by the following claims. For example, the weight measuring apparatus and methods described above could be used in conjunction with a seat position sensor to provide for an accurate determination of the identification and location of the occupying item of the seat.

What is claimed is:

1. An arrangement for determining weight of an occupying item in a seat in a vehicle and whether the occupying item is alive while the seat is moving, comprising:

at least one force sensor arranged to obtain a measurement of the force applied to the seat by the occupying item;

measuring means for measuring dynamic forces applied to the seat resulting from motion of the vehicle; and a processor coupled to said at least one weight sensor and said measuring means for receiving the measurement of the force applied to the seat from said at least one force sensor and the dynamic forces from said measuring means, said processor being arranged to determine the weight of the occupying item based thereon, said processor being arranged to differentiate between animate and inanimate objects by analyzing the measurements from said at least one force sensor over time and the dynamic forces applied to the seat from said measuring means over time.

2. The arrangement of claim 1, wherein said measuring means comprises at least one accelerometer.

3. The arrangement of claim 2, wherein said at least one accelerometer includes a vertical accelerometer.

4. The arrangement of claim 1, wherein said at least one force sensor comprises a bladder having at least one chamber and at least one transducer for measuring the pressure in a respective one of said at least one chamber.

5. The arrangement of claim 1, wherein said measuring means are arranged to measure effects on the seat of road roughness, steering maneuvers, and a vehicle suspension system.

6. The arrangement of claim 1, wherein said processor is arranged to determine whether the occupying item is belted by analyzing measurements from said at least one force sensor over time and the dynamic forces applied to the seat from said measuring means over time.

7. The arrangement of claim 1, wherein said processor is arranged to determine the position of the occupying item on the seat by analyzing the measurements from said at least one force sensor over time and the dynamic forces applied to the seat from said measuring means over time.

8. A method for classifying an occupying item in a seat, comprising the steps of:
 measuring the force applied to the seat by the occupying item at time intervals; and
 identifying the existence of patterns in the measurements of the force applied to the seat over time and analyzing any identified pattern to determine if it approximates a known pattern indicative of an animate object or an inanimate object,
 the step of identifying the existence of patterns comprising the step of utilizing a pattern recognition algorithm to identify patterns in the measurements of the force applied to the seat over time.

9. The method of claim 8, wherein the step of identifying the existence of patterns further comprises the step of training the pattern recognition algorithm by conducting tests in which different occupying items are placed in the seat and measuring the force applied to the seat before, during and after placement of the occupying item in the seat.

10. The method of claim 8, further comprising the step of measuring a function representative of forces which affect the weight of the occupying item, the step of identifying the existence of patterns further comprising the step of identifying the existence of patterns in the measurements of the force applied to the seat and the function.

11. The method of claim 8, further comprising the step of measuring dynamic forces applied to the seat, the step of identifying the existence of patterns further comprising the step of identifying the existence of patterns in the measurements of the force applied to the seat and the measurements of the dynamic forces applied to the seat.

12. An arrangement for determining weight of an occupying item in a seat and whether the occupying item is alive while the seat is moving, comprising:
 at least one force sensor arranged to obtain a measurement of the force applied to the seat by the occupying item;
 a determination arrangement arranged to determine a function representative of forces which affect the weight of the occupying item; and
 a processor coupled to said at least one force sensor and said determination arrangement for receiving the measurement of the force applied to the seat from said at least one force sensor and the function from said determination arrangement and determining the weight of the occupying item based thereon,
 said processor being arranged to differentiate between animate and inanimate objects by analyzing measurements from said at least one force sensor over time and the function from said determination arrangement over time in order to determine whether the occupying item is alive.

13. An arrangement for determining weight and position of an occupying item in a seat while the seat is moving, comprising:
 at least one force sensor arranged to obtain a measurement of the force applied to the seat by the occupying item;
 a determination arrangement arranged to determine a function representative of forces which affect the weight of the occupying item; and
 a processor coupled to said at least one force sensor and said determination arrangement for receiving the measurement of the force applied to the seat from said at least one force sensor and the function from said determination arrangement and determining the weight of the occupying item based thereon,
 said processor being arranged to determine the position of the occupying item on the seat by analyzing the measurements from said at least one force sensor over time and the function from said determination arrangement over time.

14. The arrangement of claim 12, wherein said determination arrangement comprises at least one accelerometer.

15. The arrangement of claim 14, wherein said at least one accelerometer includes a vertical accelerometer.

16. The arrangement of claim 12, wherein said at least one force sensor comprises a bladder having at least one chamber and at least one transducer for measuring the pressure in a respective one of said at least one chamber.

17. The arrangement of claim 12, wherein said at least one force sensor comprises a pressure sensor.

18. The arrangement of claim 12, wherein said at least one force sensor comprises a strain gage sensor.

19. The arrangement of claim 12, wherein said determination arrangement is arranged to measure effects on the seat caused by load of a seatbelt associated with the seat whereby the function is dependent on the load caused by the seatbelt.

20. The arrangement of claim 12, wherein said processor is arranged to determine whether the occupying item is belted by analyzing the measurements from by said at least one force sensor over time and the function from said determination arrangement over time.

21. The arrangement of claim 12, wherein said determination arrangement is arranged to measure effects on the seat of road roughness, steering maneuvers, and a vehicle suspension system whereby die function is dependent on the road roughness, steering maneuvers and the vehicle suspension system.

22. The arrangement of claim 13, wherein said determination arrangement comprises at least one accelerometer.

23. The arrangement of claim 22, wherein said at least one accelerometer includes a vertical accelerometer.

24. The arrangement of claim 13, wherein said at least one force sensor comprises a bladder having at least one chamber and at least one transducer for measuring the pressure in a respective one of said at least one chamber.

25. The arrangement of claim 13, wherein said at least one force sensor comprises a pressure sensor.

26. The arrangement of claim 13, wherein said at least one force sensor comprises a strain gage sensor.

27. The arrangement of claim 13, wherein said determination arrangement is arranged to measure effects on the seat caused by load of a seatbelt associated with the seat whereby the function is dependent on the load caused by the seatbelt.

28. The arrangement of claim 13, wherein said processor is arranged to determine whether the occupying item is bolted by analyzing the measurements from by said at least one force sensor over time and the function from said determination arrangement over time.

29. The arrangement of claim 13, wherein said determination arrangement is arranged to measure effects on the seat of road roughness, steering maneuvers, and a vehicle suspension system whereby the function is dependent on the road toughness, steering maneuvers and the vehicle suspension system.

30. The arrangement of claim 1, wherein said at least one force sensor comprises a pressure sensor.

31. The arrangement of claim 1, wherein said at least one force sensor comprises a strain gage sensor.

32. An arrangement for determining weight and position of an occupying item in a seat in a vehicle while the seat is moving, comprising:

at least one force sensor arranged to obtain a measurement of the force applied to the seat by the occupying item;

measuring means for measuring dynamic forces applied to the seat resulting from motion of the vehicle; and a processor coupled to said at least one force sensor and said measuring means for receiving the measurement of the force applied to the seat from said at least one force sensor and the dynamic forces from said measuring means, said processor being arranged to determine the weight of the occupying item based thereon, said processor being arranged to determine the position of the occupying item on the seat by analyzing the measurements from said at least one force sensor over time and the dynamic forces applied to the seat from said measuring means over time.

33. The arrangement of claim 32, wherein said measuring means comprises at least one vertical accelerometer.

34. The arrangement of claim 32, wherein said at least one force sensor comprises a bladder having at least one chamber and at least one transducer for measuring the pressure in a respective one of said at least one chamber.

35. The arrangement of claim 32, wherein said at least one force sensor comprises a pressure sensor.

36. The arrangement of claim 32, wherein said at least one force sensor comprises a strain gage sensor.

37. The arrangement of claim 32, wherein said measuring means are arranged to measure effects an the seat of road roughness, steering maneuvers, and a vehicle suspension system.

38. The arrangement of claim 32, wherein said processor is arranged to determine whether the occupying item is belted by analyzing measurements from said at least one force sensor over time and the dynamic forces applied to the seat from said measuring means over time.

39. The arrangement of claim 32, wherein said processor is arranged to determine the position of the occupying item on the seat by analyzing the measurements from said at least one force sensor over time and the dynamic forces applied to the seat from said measuring means over time.

* * * * *

UNITED STATES PATENT AND TRADEMARK OFFICE
CERTIFICATE OF CORRECTION

PATENT NO. : 6,958,451 B2
DATED : October 25, 2005
INVENTOR(S) : Breed et al.

It is certified that error appears in the above-identified patent and that said Letters Patent is hereby corrected as shown below:

<u>Column 62,</u>
Line 55, change "weight" to -- force --.

<u>Column 64,</u>
Line 47, change "die" to -- the --.

<u>Column 65,</u>
Line 1, change "bolted" to -- belted --.
Line 8, change "toughness" to -- roughness --.

<u>Column 66,</u>
Line 15, change "an" to -- on --.

Signed and Sealed this

Third Day of January, 2006

JON W. DUDAS
*Director of the United States Patent and Trademark Office*